US012295893B2

(12) United States Patent
Lim et al.

(10) Patent No.: US 12,295,893 B2
(45) **Date of Patent: *May 13, 2025**

(54) HEAD SUPPORT AND METHOD FOR USE OF THE HEAD SUPPORT FOR POSITIONING A PATIENT RELATIVE TO A SURGICAL FRAME

(71) Applicant: Warsaw Orthopedic, Inc., Warsaw, IN (US)

(72) Inventors: Roy K. Lim, Germantown, TN (US); Richard A. Hynes, Melbourne Beach, FL (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,969

(22) Filed: Dec. 15, 2023

(65) Prior Publication Data

US 2024/0108525 A1 Apr. 4, 2024

Related U.S. Application Data

(62) Division of application No. 16/855,331, filed on Apr. 22, 2020, now Pat. No. 11,850,191.

(51) Int. Cl.

| | |
|---|---|
| ***A61G 13/00*** | (2006.01) |
| ***A42B 3/32*** | (2006.01) |
| ***A61G 13/12*** | (2006.01) |

(52) U.S. Cl.

CPC .............. *A61G 13/121* (2013.01); *A42B 3/32* (2013.01); *A61G 13/122* (2013.01); (Continued)

(58) Field of Classification Search

CPC ................ A61G 13/121; A61G 13/128; A61G 13/1285; A61G 15/12; A61G 15/125; (Continued)

(56) References Cited

U.S. PATENT DOCUMENTS

| | | | | |
|---|---|---|---|---|
| 1,060,220 A | 4/1913 | White | | |
| 4,404,690 A * | 9/1983 | Farquharson | ............ A42B 3/28 2/420 | |

(Continued)

FOREIGN PATENT DOCUMENTS

| | | |
|---|---|---|
| EP | 2724701 | 4/2014 |
| EP | 3007754 | 4/2016 |
| EP | 3449888 | 3/2019 |

OTHER PUBLICATIONS

Extended European Search Report for EP Application No. 21164218.6 dated Sep. 21, 2021.

(Continued)

*Primary Examiner* — Adam Baker

(57) ABSTRACT

A lift, a head support, and methods for use thereof for use with a surgical frame are provided. The lift and the head support can be used with the surgical frame that is capable of reconfiguration before, during, or after surgery. The surgical frame can include a main beam that can be rotated, raised/lowered, and tilted upwardly/downwardly to afford positioning and repositioning of a patient supported thereon, and the lift and the head support can be used in lifting the patient from a table/gurney and positioning the patient with respect to the main beam.

20 Claims, 50 Drawing Sheets

(52) U.S. Cl.
CPC ....... *A61G 13/123* (2013.01); *A61G 13/1235* (2013.01); *A61G 13/1245* (2013.01); *A61G 2200/325* (2013.01)

(58) Field of Classification Search
CPC ....... A61G 15/121; A61F 5/37; A61F 5/3707; A61F 5/3769
USPC .......................................................... 128/845
See application file for complete search history.

(56) References Cited

U.S. PATENT DOCUMENTS

| | | | | |
|---|---|---|---|---|
| 4,700,691 | A | 10/1987 | Tari et al. | |
| 5,012,533 | A * | 5/1991 | Raffler | A42B 3/066 2/420 |
| 5,220,699 | A | 6/1993 | Farris | |
| 5,570,482 | A | 11/1996 | Asakawa | |
| 5,592,936 | A | 1/1997 | Thomas, Jr. et al. | |
| 6,112,333 | A | 9/2000 | Mazzei | |
| 6,381,760 | B1 | 5/2002 | Lampe et al. | |
| 6,481,019 | B2 | 11/2002 | Diaz | |
| 6,490,737 | B1 | 12/2002 | Mazzei et al. | |
| 6,973,677 | B2 | 12/2005 | Diaz et al. | |
| 6,990,691 | B2 | 1/2006 | Klotz et al. | |
| 7,200,873 | B2 | 4/2007 | Klotz et al. | |
| 7,752,682 | B2 | 7/2010 | VanDerWoude et al. | |
| 7,869,858 | B2 | 1/2011 | Calderon et al. | |
| 10,037,754 | B1 | 7/2018 | Hollmann | |
| 10,470,502 | B2 | 11/2019 | Rosati et al. | |
| 10,470,959 | B2 | 11/2019 | Le | |
| 10,687,568 | B2 | 6/2020 | Pavalarajan et al. | |
| 10,709,911 | B2 | 7/2020 | Pavalarajan et al. | |
| 11,850,191 | B2 * | 12/2023 | Lim | A61G 13/1245 |
| 2007/0270683 | A1 | 11/2007 | Meloy | |
| 2016/0106508 | A1 | 4/2016 | Lathrop et al. | |
| 2019/0000702 | A1 | 1/2019 | Lim | |

OTHER PUBLICATIONS

Extended European Search Report for EP Application No. 23210310.1 dated Feb. 1, 2024.

* cited by examiner

HEAD SUPPORT AND METHOD FOR USE OF THE HEAD SUPPORT FOR POSITIONING A PATIENT RELATIVE TO A SURGICAL FRAME

The present application is a divisional of U.S. application Ser. No. 16/855,331, filed Apr. 22, 2020; all of which is incorporated by reference herein.

FIELD

The present technology generally relates to a head support and a method for use of the head support facilitating positioning and orienting a head of a patient relative to support components of a surgical frame.

BACKGROUND

Access to a patient is of paramount concern during surgery. Surgical frames have been used to position and reposition patients during surgery. For example, surgical frames have been configured to manipulate the rotational position of the patient before, during, and even after surgery. Such surgical frames can include main beams supported at either end thereof for rotational movement, and various support components attached to the main beam for contacting and supporting the patient relative to the main beam. However, transferring the patient from a table or a gurney to the surgical frame can be difficult. Therefore, there is a need for a lift and a method for using the lift and/or a need for a head support and a method for using the head support that facilitates lifting of the patient from the table/gurney into contact with the various support components attached to the main beam. The lift and the method for using the lift can be used to position and orient the patient relative to the various support components attached to the main beam before the patient is brought into contact with these components, and the head support and the method for using the head support can be used to position and orient the head of the patient relative to the main beam.

SUMMARY

The techniques of this disclosure generally relate to a head support and a method for using the head support for positioning and orienting a head of a patient relative to support components of a surgical frame.

In one aspect, the present disclosure provides a helmet for protecting and supporting a head of a patient during surgery, the helmet including a posterior portion including a first body portion, a first lateral rim portion on a first lateral side of the first body portion, a second lateral rim portion on a second lateral side of the first body portion, and an upper rim portion extending between the first lateral rim portion and the second lateral rim portion; a first lateral portion including a second body portion, a first mating rim portion for positioning adjacent the first lateral rim portion of the posterior portion, a second mating rim portion for positioning adjacent the anterior portion, and the first lateral portion being hingedly connected to the posterior portion along the first lateral rim portion and the first mating rim portion, and being moveable between an open position and a closed position relative to the posterior portion; a second lateral portion including a third body portion, a third mating rim portion for positioning adjacent the second lateral rim portion of the posterior portion, and a fourth mating rim portion for positioning adjacent the anterior portion, and the first lateral portion being hingedly connected to the posterior portion along the second lateral rim portion and the third mating rim portion, and being moveable between an open position and a closed position relative to the posterior portion; and an anterior portion including a fourth body portion, an opening formed in the fourth body portion, a fifth mating rim portion for positioning adjacent the upper rim portion of the posterior portion, the second mating rim portion of the first lateral portion, and the fourth mating rim portion of the second lateral portion, and the anterior portion being hingedly connected to the posterior portion along the fifth mating rim portion and the upper rim portion, and being moveable between an open position and closed position relative to the posterior portion; where the helmet can be assembled around the head of the patient by placing the posterior portion adjacent a posterior portion of the head of the patient, moving the first lateral portion from the open position to the closed position to position the first lateral portion adjacent a first lateral side of the head of the patient, moving the second lateral portion from the open position to the closed position to position the second lateral portion adjacent a second lateral side of the head of the patient, and moving the anterior portion from the open position to the closed position to position the anterior portion adjacent a face of the patient such that a nasal cavity and an oral cavity of the patient are accessible through the opening in the anterior portion.

In one aspect, the present disclosure provides a helmet for protecting and supporting a head of a patient during surgery, the helmet including a posterior portion including a first body portion, a first lateral rim portion on a first lateral side of the first body portion, a second lateral rim portion on a second lateral side of the first body portion, and an upper rim portion extending between the first lateral rim portion and the second lateral rim portion, the first body portion including an inner surface for positioning adjacent the head of the patient; a first lateral portion including a second body portion and a first mating rim portion for positioning adjacent the first lateral rim portion of the posterior portion, the second body portion including an inner surface for positioning adjacent the head of the patient, and the first lateral portion being hingedly connected to the posterior portion along the first lateral rim portion and the first mating rim portion, and being moveable between an open position and a closed position relative to the posterior portion; a second lateral portion including a third body portion and a second mating rim portion for positioning adjacent the second lateral rim portion of the posterior portion, the third body portion including an inner surface for positioning adjacent the head of the patient, and the first lateral portion being hingedly connected to the posterior portion along the second lateral rim portion and the second mating rim portion, and being moveable between an open position and a closed position relative to the posterior portion; and an anterior portion including a fourth body portion, an opening formed in the fourth body portion, a third mating rim portion for positioning adjacent the upper rim portion of the posterior portion, and portions of the first lateral portion and the second lateral portion, the fourth body portion including an inner surface for positioning adjacent the head of the patient, and the anterior portion being hingedly connected to the posterior portion along the third mating rim portion and the upper rim portion, and being moveable between an open position and closed position relative to the posterior portion; where the helmet can be assembled around the head of the patient by placing the posterior portion adjacent a posterior portion of the head of the patient, moving the first lateral portion from the open position to the closed position to position the first lateral portion adjacent a first lateral side of the head of the patient, moving the second lateral portion from the open position to the closed position to position the second lateral portion adjacent a second lateral side of the head of the patient, and moving the anterior portion from the open position to the closed position to position the anterior portion adjacent a face of the patient such that a nasal cavity and an oral cavity of the patient are accessible through the opening in the anterior portion.

In one aspect, the present disclosure provides a helmet for protecting and supporting a head of a patient during surgery, the helmet including a posterior portion including a first body portion, a first lateral rim portion on a first lateral side of the first body portion, a second lateral rim portion on a second lateral side of the first body portion, and an upper rim portion extending between the first lateral rim portion and the second lateral rim portion; a first lateral portion including a second body portion, a first mating rim portion for positioning adjacent the first lateral rim portion of the posterior portion, and a second mating rim portion for positioning adjacent the anterior portion, and the first lateral portion being hingedly connected to the posterior portion along the first lateral rim portion and the first mating rim portion, and being moveable between an open position and a closed position relative to the posterior portion; a second lateral portion including a third body portion, a third mating rim portion for positioning adjacent the second lateral rim portion of the posterior portion, and a fourth mating rim portion for positioning adjacent the anterior portion, and the first lateral portion being hingedly connected to the posterior portion along the second lateral rim portion and the third mating rim portion, and being moveable between an open position and a closed position relative to the posterior portion; and an anterior portion including a fourth body portion, an opening formed in the fourth body portion, a fifth mating rim portion for positioning adjacent the upper rim portion of the posterior portion, the second mating rim portion of the first lateral portion, and the fourth mating rim portion of the second lateral portion, and the anterior portion being hingedly connected to the posterior portion along the fifth mating rim portion and the upper rim portion, and being moveable between an open position and closed position relative to the posterior portion.

The details of one or more aspects of the disclosure are set forth in the accompanying drawings and the description below. Other features, objects, and advantages of the techniques described in this disclosure will be apparent from the description and drawings, and from the claims.

Figure 1:
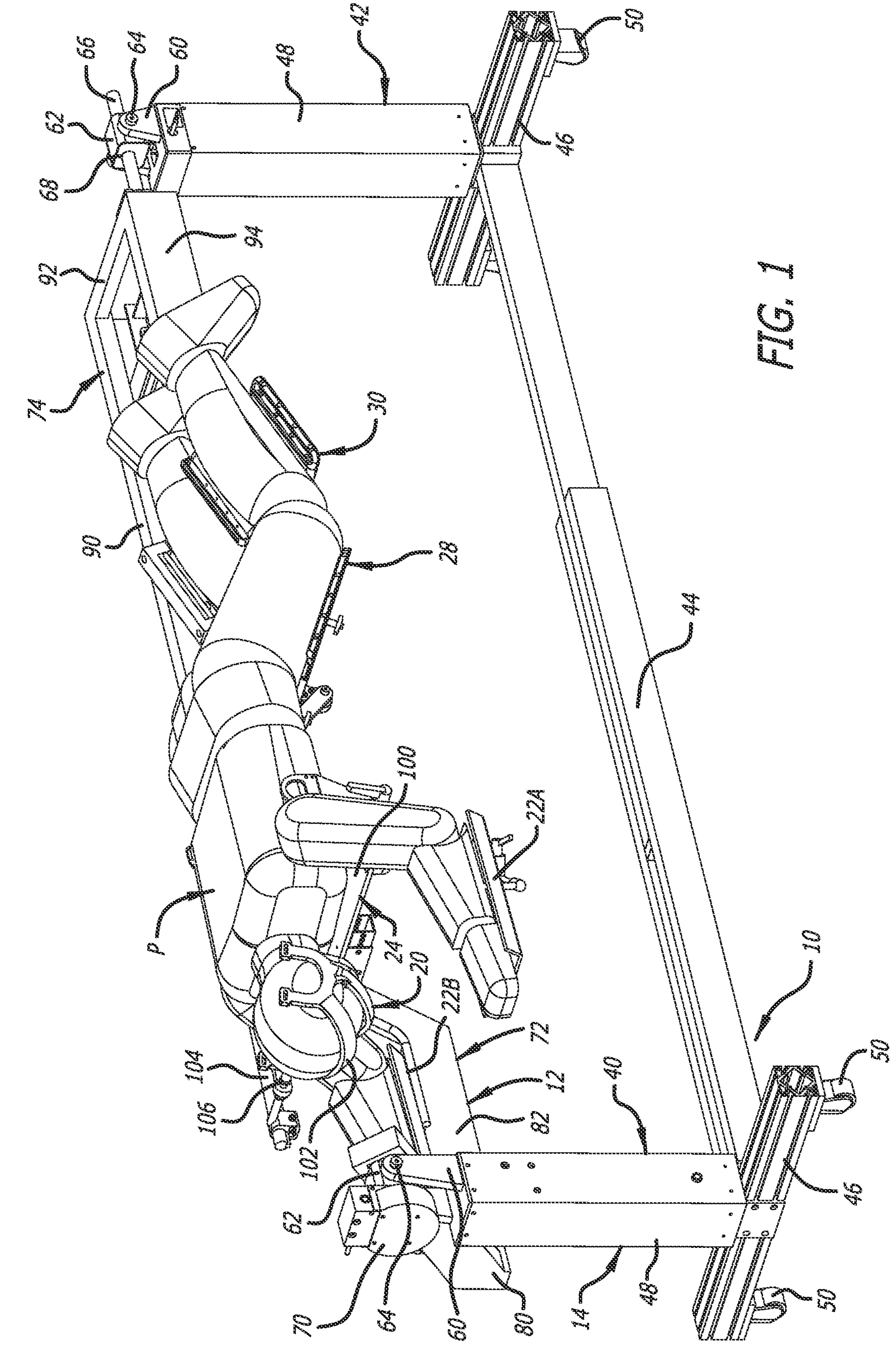
FIG. 1 is a top perspective view that illustrates a prior art surgical frame with a patient positioned thereon in a prone position.
Figure 2:
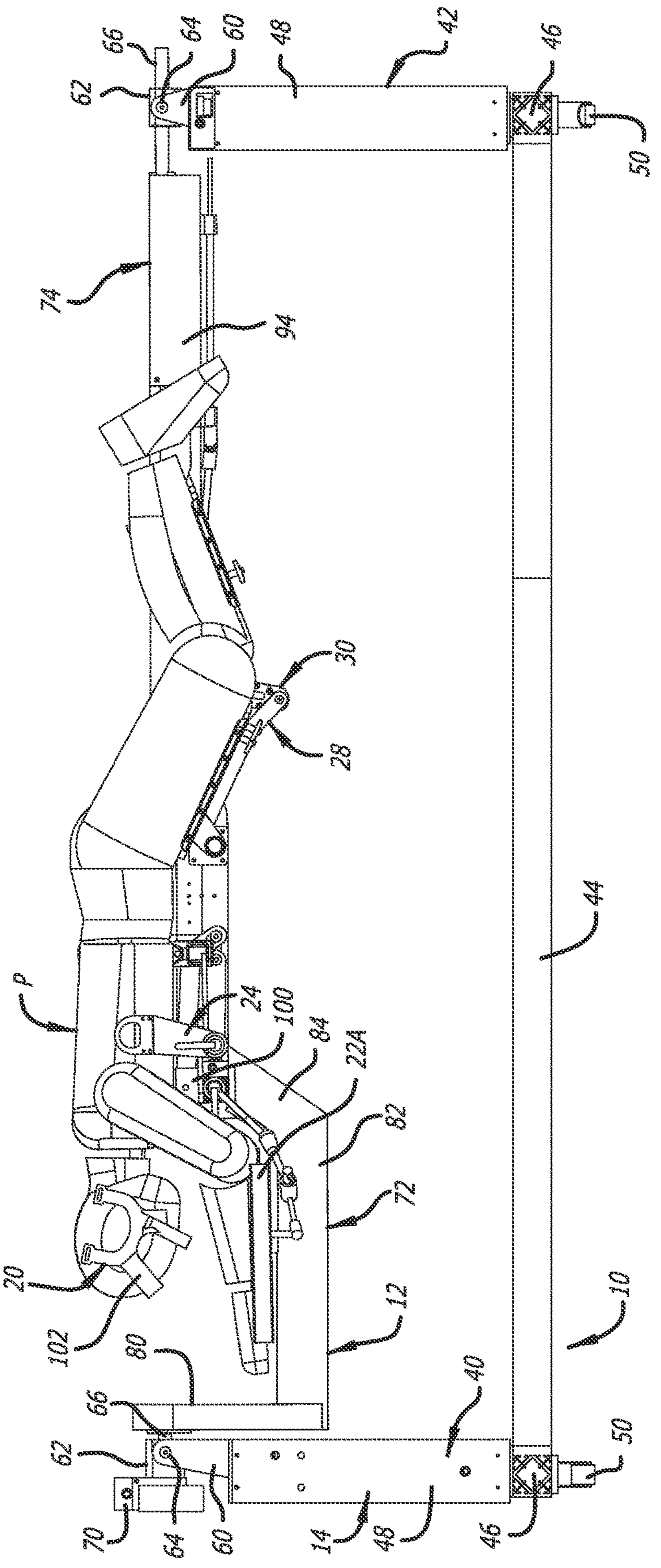
FIG. 2 is a side elevational view that illustrates the surgical frame of FIG. 1 with the patient positioned thereon in a prone position.
Figure 3:
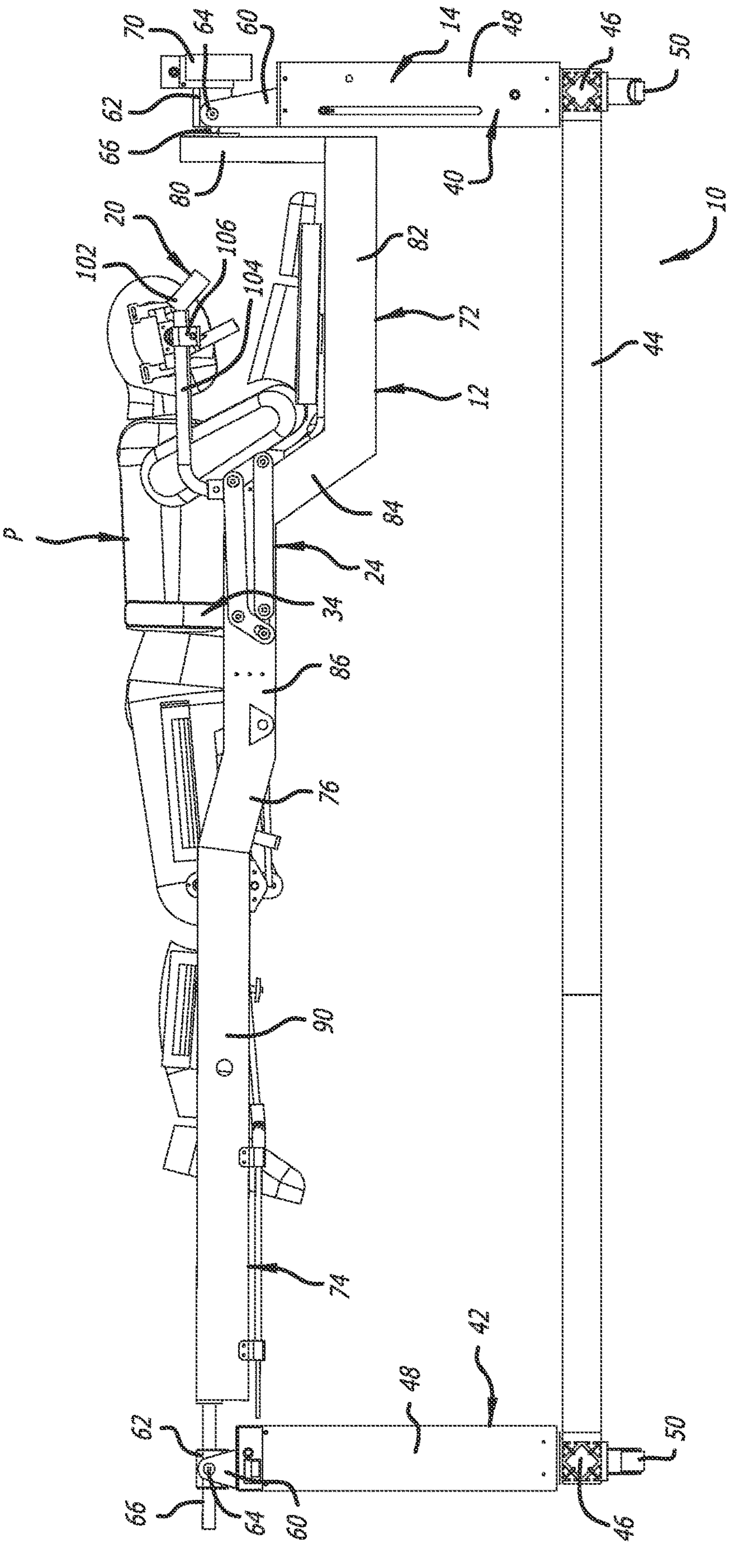
FIG. 3 is another side elevational view that illustrates the surgical frame of FIG. 1 with the patient positioned thereon in a prone position.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

FIGS. 1-26 depict a prior art embodiment and components of a surgical support frame generally indicated by the numeral 10. FIGS. 1-26 were previously described in U.S. Ser. No. 15/239,256, which is hereby incorporated by reference herein in its entirety. Furthermore, FIGS. 27-30 were previously described in U.S. Ser. No. 15/639,080, which is hereby incorporated by reference herein in its entirety. Furthermore, U.S. Ser. Nos. 15/638,802, 16/395,821, 16/513,422,16/395,734, and 16/395,903 are also hereby incorporated by reference herein in its entirety.

As discussed below, the surgical frame 10 serves as an exoskeleton to support the body of the patient P as the patient's body is manipulated thereby, and, in doing so, serves to support the patient P such that the patient's spine does not experience unnecessary torsion.

The surgical frame 10 is configured to provide a relatively minimal amount of structure adjacent the patient's spine to facilitate access thereto and to improve the quality of imaging available before and during surgery. Thus, the surgeon's workspace and imaging access are thereby increased. Furthermore, radio-lucent or low magnetic susceptibility materials can be used in constructing the structural components adjacent the patient's spine in order to further enhance imaging quality.

The surgical frame 10 has a longitudinal axis and a length therealong. As depicted in FIGS. 1-5, for example, the surgical frame 10 includes an offset structural main beam 12 and a support structure 14. The offset main beam 12 is spaced from the ground by the support structure 14. As discussed below, the offset main beam 12 is used in supporting the patient P on the surgical frame 10 and various support components of the surgical frame 10 that directly contact the patient P (such as a head support 20, arm supports 22A and 22B, torso-lift supports 24 and 160, a sagittal adjustment assembly 28 including a pelvic-tilt mechanism 30 and a leg adjustment mechanism 32, and a coronal adjustment assembly 34). As discussed below, an operator such as a surgeon can control actuation of the various support components to manipulate the position of the patient's body. Soft straps (not shown) are used with these various support components to secure the patient P to the frame and to enable either manipulation or fixation of the patient P. Reusable soft pads can be used on the load-bearing areas of the various support components.

Figure 4:
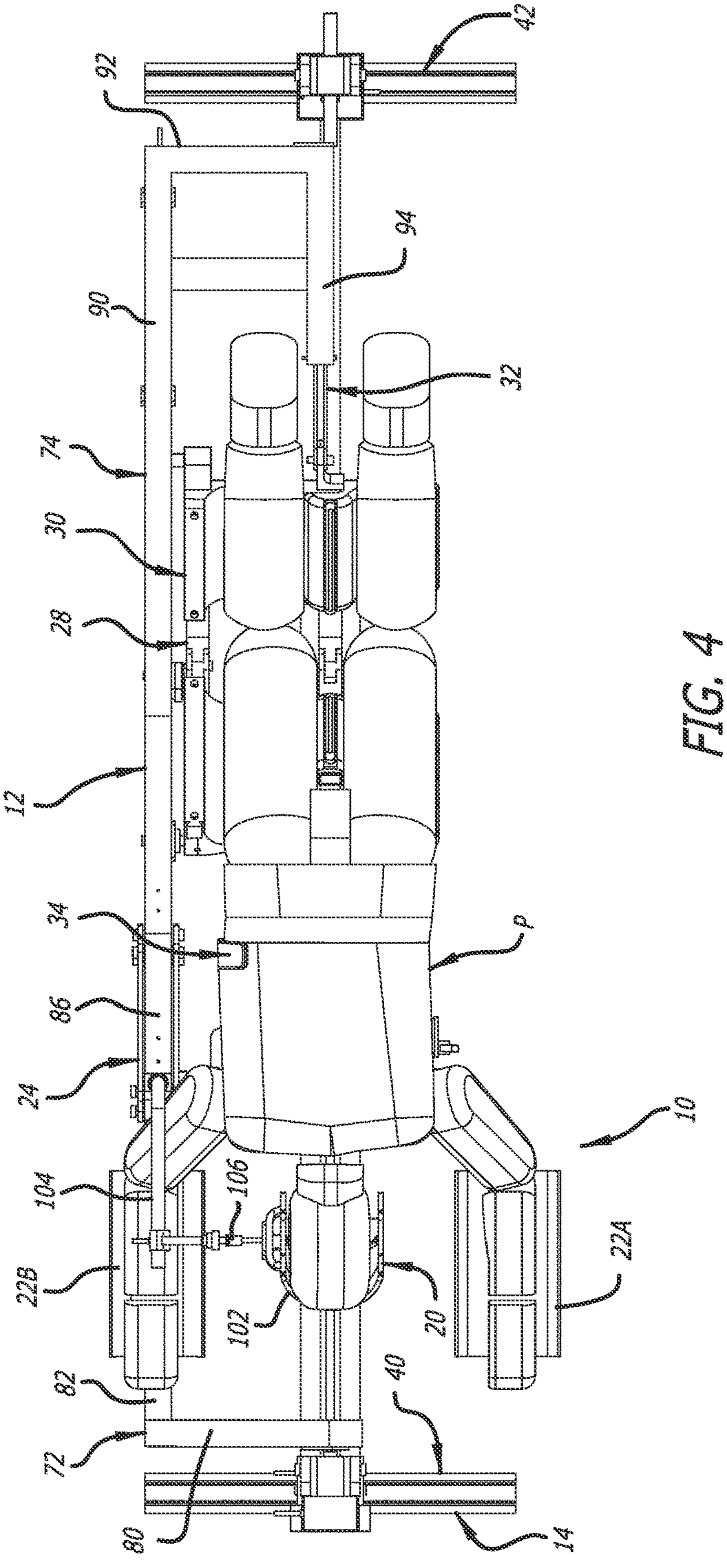
FIG. 4 is a top plan view that illustrates the surgical frame of FIG. 1 with the patient positioned thereon in a prone position.
Figure 5:
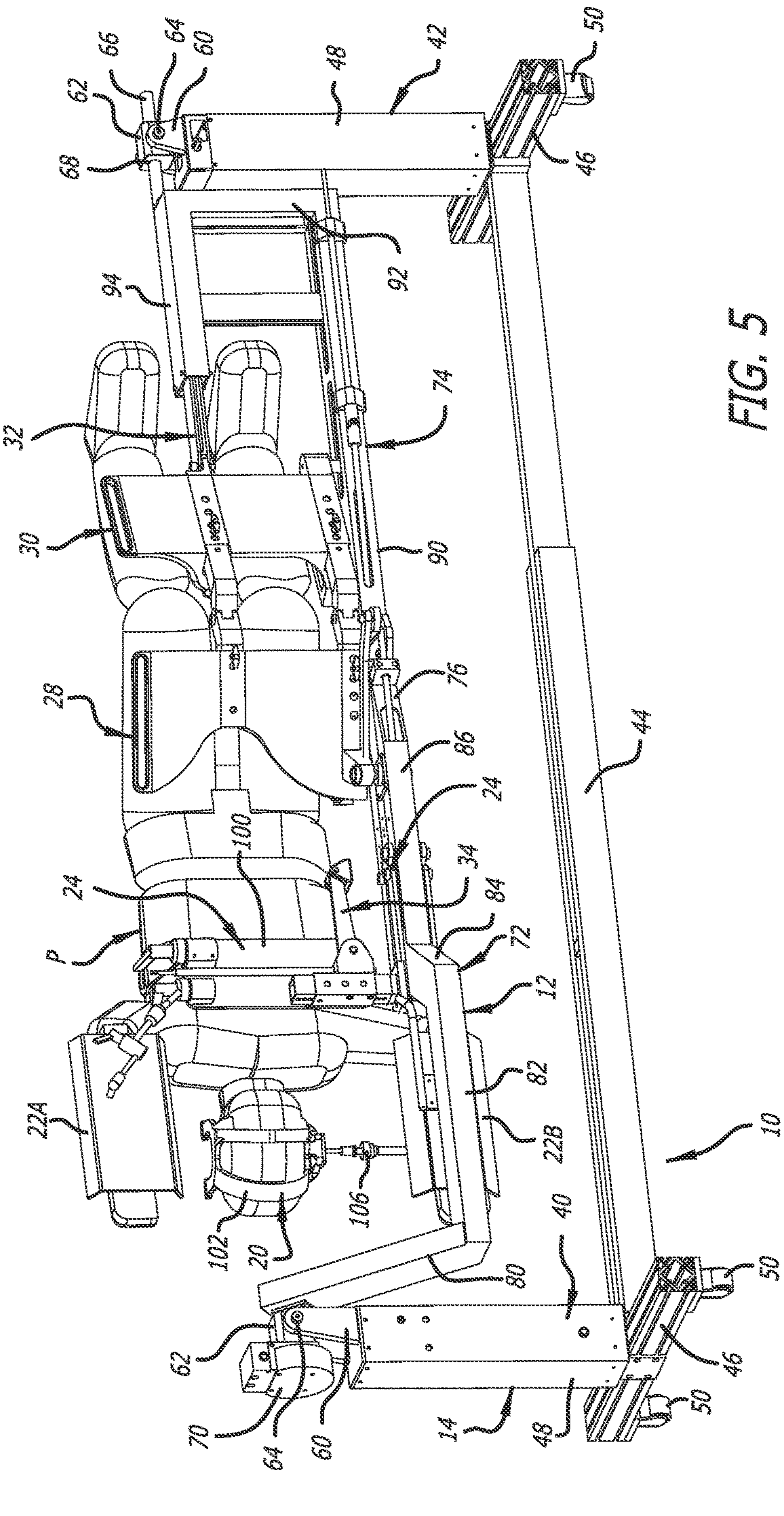
FIG. 5 is a top perspective view that illustrates the surgical frame of FIG. 1 with the patient positioned thereon in a lateral position.

The offset main beam 12 is used to facilitate rotation of the patient P. The offset main beam 12 can be rotated a full 360° before and during surgery to facilitate various positions of the patient P to afford various surgical pathways to the patient's spine depending on the surgery to be performed. For example, the offset main beam 12 can be positioned to place the patient P in a prone position (e.g., FIGS. 1-4), a lateral position (e.g., FIG. 5), and in a position 45° between the prone and lateral positions. Furthermore, the offset main beam 12 can be rotated to afford anterior, posterior, lateral, anterolateral, and posterolateral pathways to the spine. As such, the patient's body can be flipped numerous times before and during surgery without compromising sterility or safety. The various support components of the surgical frame 10 are strategically placed to further manipulate the patient's body into position before and during surgery. Such intraoperative manipulation and positioning of the patient P affords a surgeon significant access to the patient's body. To illustrate, when the offset main beam 12 is rotated to position the patient P in a lateral position, as depicted in FIG. 5, the head support 20, the arm supports 22A and 22B, the torso-lift support 24, the sagittal adjustment assembly 28, and/or the coronal adjustment assembly 34 can be articulated such that the surgical frame 10 is OLIF-capable or DLIF-capable.

As depicted in FIG. 1, for example, the support structure 14 includes a first support portion 40 and a second support portion 42 interconnected by a cross member 44. Each of the first and second support portions 40 and 42 include a horizontal portion 46 and a vertical support post 48. The horizontal portions 46 are connected to the cross member 44, and casters 50 can be attached to the horizontal portions 46 to facilitate movement of the surgical frame 10.

The vertical support posts 48 can be adjustable to facilitate expansion and contraction of the heights thereof. Expansion and contraction of the vertical support posts 48 facilitates raising and lowering, respectively, of the offset main beam 12. As such, the vertical support posts 48 can be adjusted to have equal or different heights. For example, the vertical support posts 48 can be adjusted such that the vertical support post 48 of the second support portion 42 is raised 12 inches higher than the vertical support post 48 of the first support portion 40 to place the patient P in a reverse Trendelenburg position.

Furthermore, cross member 44 can be adjustable to facilitate expansion and contraction of the length thereof. Expansion and contraction of the cross member 44 facilitates lengthening and shortening, respectively, of the distance between the first and second support portions 40 and 42.

The vertical support post 48 of the first and second support portions 40 and 42 have heights at least affording rotation of the offset main beam 12 and the patient P positioned thereon. Each of the vertical support posts 48 include a clevis 60, a support block 62 positioned in the clevis 60, and a pin 64 pinning the clevis 60 to the support block 62. The support blocks 62 are capable of pivotal movement relative to the clevises 60 to accommodate different heights of the vertical support posts 48. Furthermore, axles 66 extending outwardly from the offset main beam 12 are received in apertures 68 formed the support blocks 62. The axles 66 define an axis of rotation of the offset main beam 12, and the interaction of the axles 66 with the support blocks 62 facilitate rotation of the offset main beam 12.

Furthermore, a servomotor 70 can be interconnected with the axle 66 received in the support block 62 of the first support portion 40. The servomotor 70 can be computer controlled and/or operated by the operator of the surgical frame 10 to facilitate controlled rotation of the offset main beam 12. Thus, by controlling actuation of the servomotor 70, the offset main beam 12 and the patient P supported thereon can be rotated to afford the various surgical pathways to the patient's spine.

As depicted in FIGS. 1-5, for example, the offset main beam 12 includes a forward portion 72 and a rear portion 74. The forward portion 72 supports the head support 20, the arm supports 22A and 22B, the torso-lift support 24, and the coronal adjustment assembly 34, and the rear portion 74 supports the sagittal adjustment assembly 28. The forward and rear portions 72 and 74 are connected to one another by connection member 76 shared therebetween. The forward portion 72 includes a first portion 80, a second portion 82, a third portion 84, and a fourth portion 86. The first portion 80 extends transversely to the axis of rotation of the offset main beam 12, and the second and fourth portions 82 and 86 are aligned with the axis of rotation of the offset main beam 12. The rear portion 74 includes a first portion 90, a second portion 92, and a third portion 94. The first and third portions 90 and 94 are aligned with the axis of rotation of the offset main beam 12, and the second portion 92 extends transversely to the axis of rotation of the offset main beam 12.

The axles 66 are attached to the first portion 80 of the forward portion 72 and to the third portion 94 of the rear portion 74. The lengths of the first portion 80 of the forward portion 72 and the second portion 92 of the rear portion 74 serve in offsetting portions of the forward and rear portions 72 and 74 from the axis of rotation of the offset main beam 12. This offset affords positioning of the cranial-caudal axis of patient P approximately aligned with the axis of rotation of the offset main beam 12.

Programmable settings controlled by a computer controller (not shown) can be used to maintain an ideal patient height for a working position of the surgical frame 10 at a near-constant position through rotation cycles, for example, between the patient positions depicted in FIGS. 1 and 5. This allows for a variable axis of rotation between the first portion 40 and the second portion 42.

Figure 6:
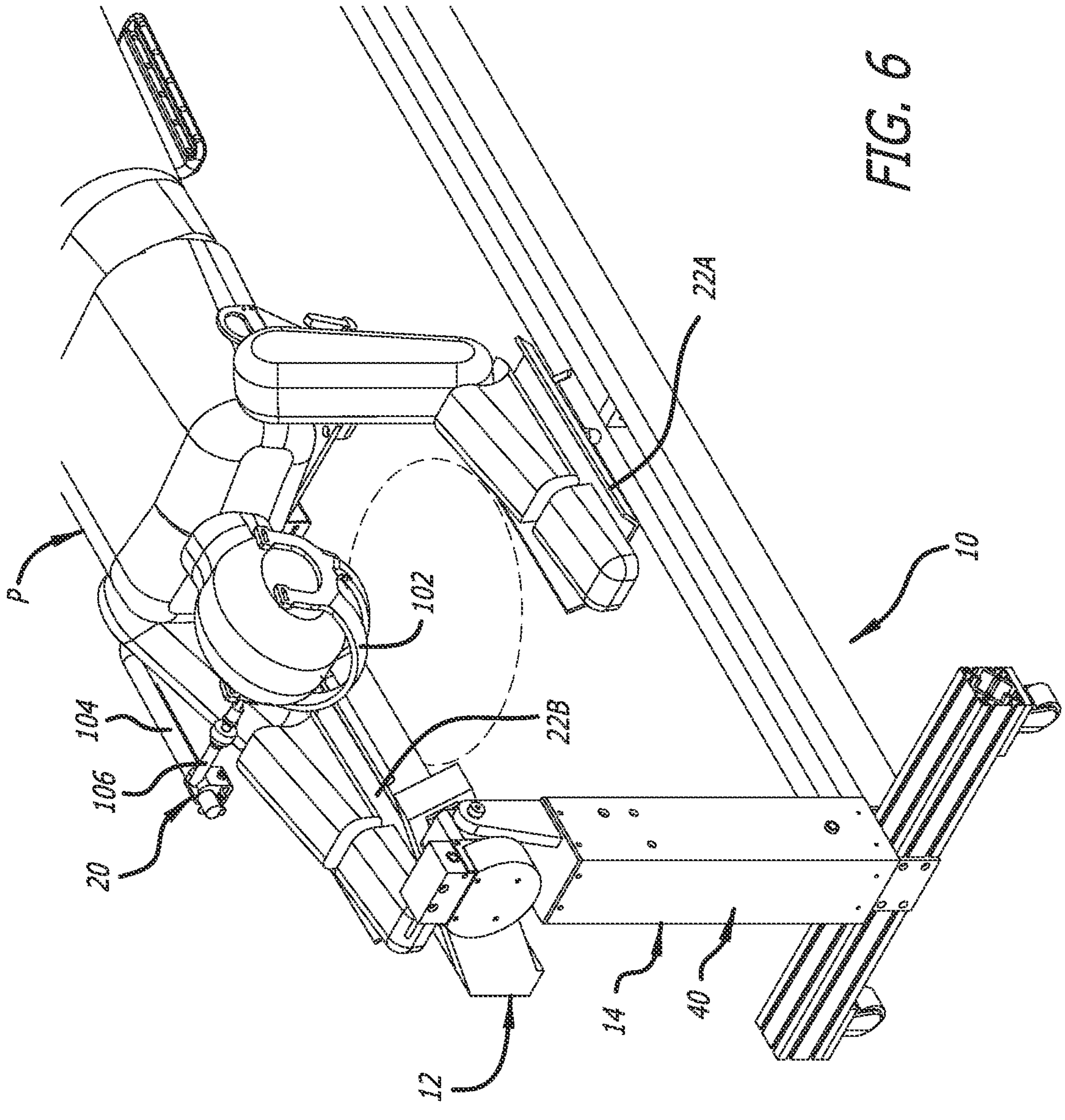
FIG. 6 is a top perspective view that illustrates portions of the surgical frame of FIG. 1 showing an area of access to the head of the patient positioned thereon in a prone position.

As depicted in FIG. 5, for example, the head support 20 is attached to a chest support plate 100 of the torso-lift support 24 to support the head of the patient P. If the torso-lift support 24 is not used, the head support 20 can be directly attached to the forward portion 72 of the offset main beam 12. As depicted in FIGS. 4 and 6, for example, the head support 20 further includes a facial support cradle 102, an axially adjustable head support beam 104, and a temple support portion 106. Soft straps (not shown) can be used to secure the patient P to the head support 20. The facial support cradle 102 includes padding across the forehead and cheeks, and provides open access to the mouth of the patient P. The head support 20 also allows for imaging access to the cervical spine. Adjustment of the head support 20 is possible via adjusting the angle and the length of the head support beam 104 and the temple support portion 106.

As depicted in FIG. 5, for example, the arm supports 22A and 22B contact the forearms and support the remainder of the arms of the patient P, with the first arm support 22A and the second arm support 22B attached to the chest support plate 100 of the torso-lift support 24. If the torso-lift support 24 is not used, the arm supports 22A and 22B can both be directly attached to the offset main beam 12. The arm supports 22A and 22B are positioned such that the arms of the patient P are spaced away from the remainder of the patient's body to provide access (FIG. 6) to at least portions of the face and neck of the patient P, thereby providing greater access to the patient.

Figure 7:
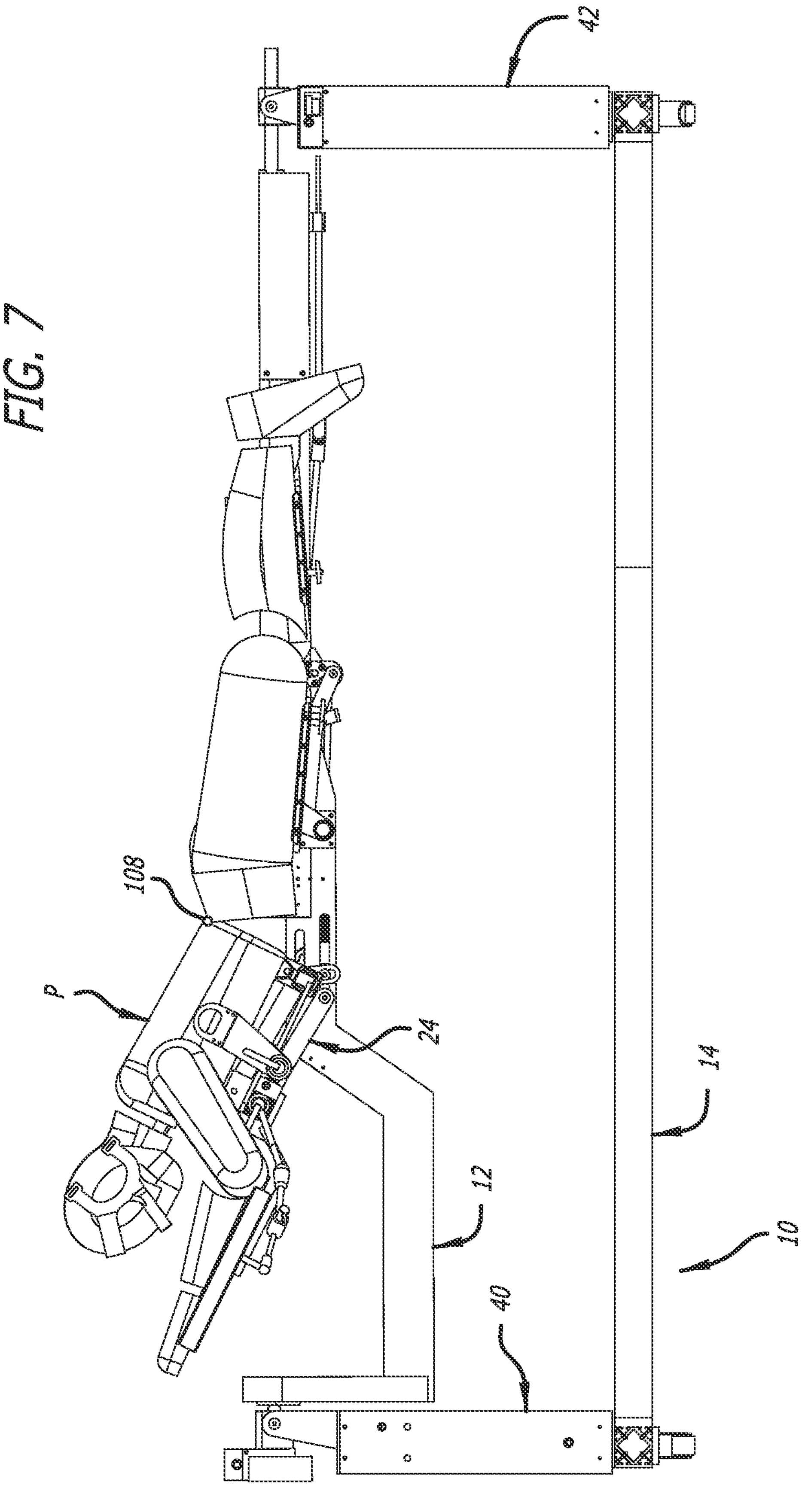
FIG. 7 is a side elevational view that illustrates the surgical frame of FIG. 1 showing a torso-lift support supporting the patient in a lifted position.
Figure 8:
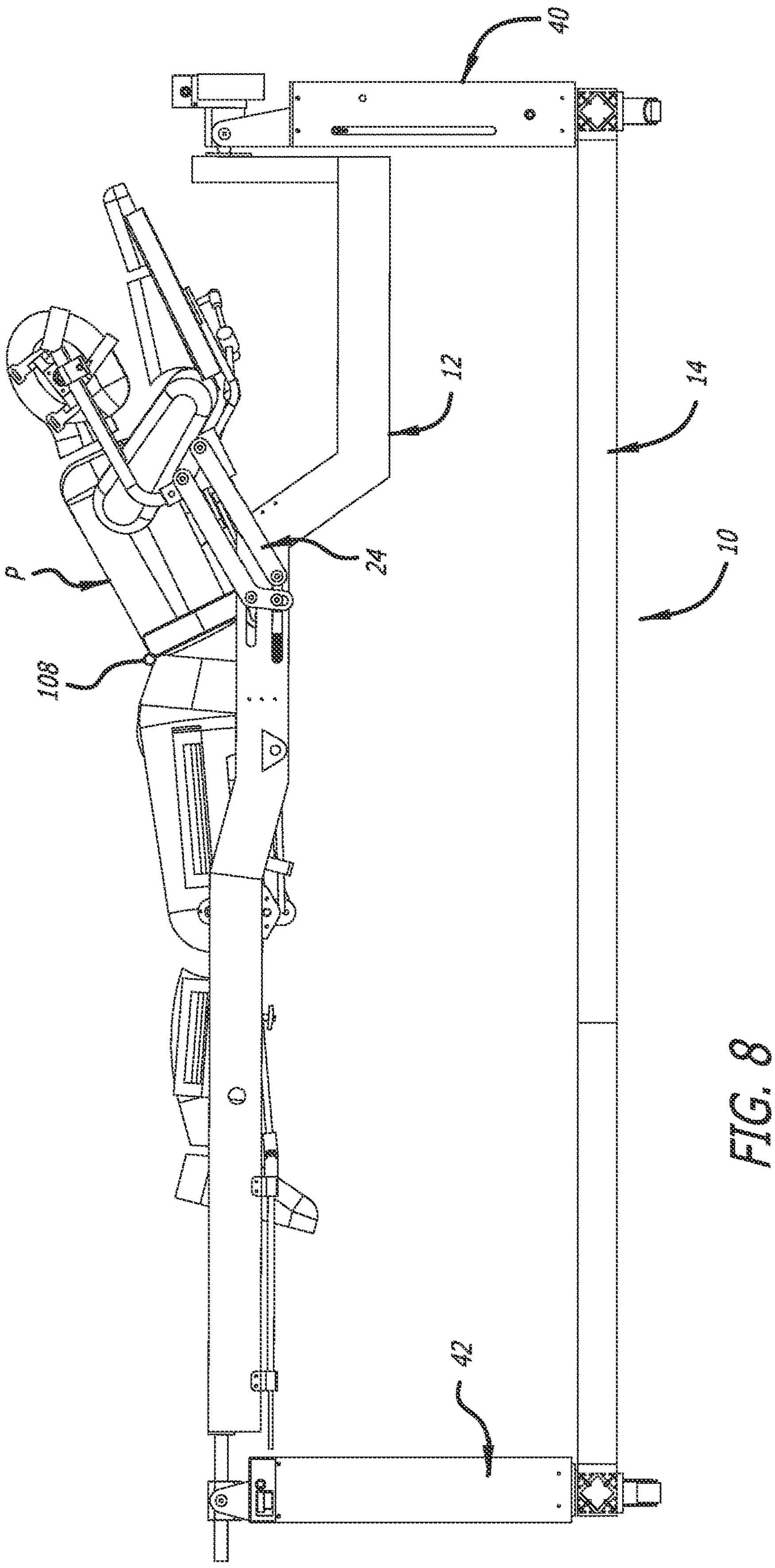
FIG. 8 is another side elevational view that illustrates the surgical frame of FIG. 1 showing the torso-lift support supporting the patient in the lifted position.
Figure 9:
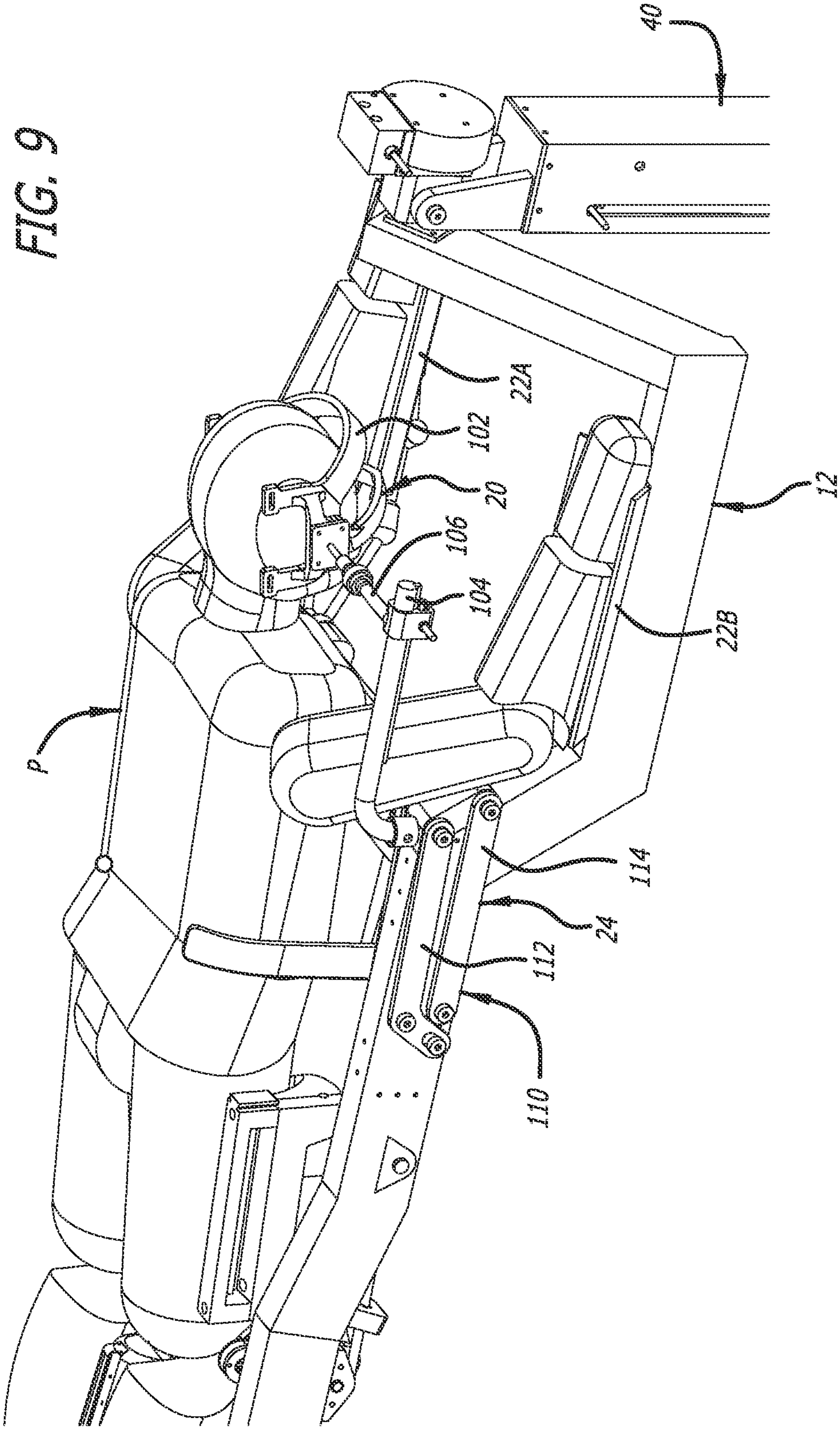
FIG. 9 is an enlarged top perspective view that illustrates portions of the surgical frame of FIG. 1 showing the torso-lift support supporting the patient in an unlifted position.

As depicted in FIGS. 7-12, for example, the surgical frame 10 includes a torso-lift capability for lifting and lowering the torso of the patient P between an uplifted position and a lifted position, which is described in detail below with respect to the torso-lift support 24. As depicted in FIGS. 7 and 8, for example, the torso-lift capability has an approximate center of rotation ("COR") 108 that is located at a position anterior to the patient's spine about the L2 of the lumbar spine, and is capable of elevating the upper body of the patient at least an additional six inches when measured at the chest support plate 100.

As depicted in FIGS. 9-12, for example, the torso-lift support 24 includes a "crawling" four-bar mechanism 110 attached to the chest support plate 100. Soft straps (not shown) can be used to secure the patient P to the chest support plate 100. The head support 20 and the arm supports 22A and 22B are attached to the chest support plate 100, thereby moving with the chest support plate 100 as the chest support plate 100 is articulated using the torso-lift support 24. The fixed COR 108 is defined at the position depicted in FIGS. 7 and 8. Appropriate placement of the COR 108 is important so that spinal cord integrity is not compromised (i.e., overly compressed or stretched) during the lift maneuver performed by the torso-lift support 24.

Figure 10:
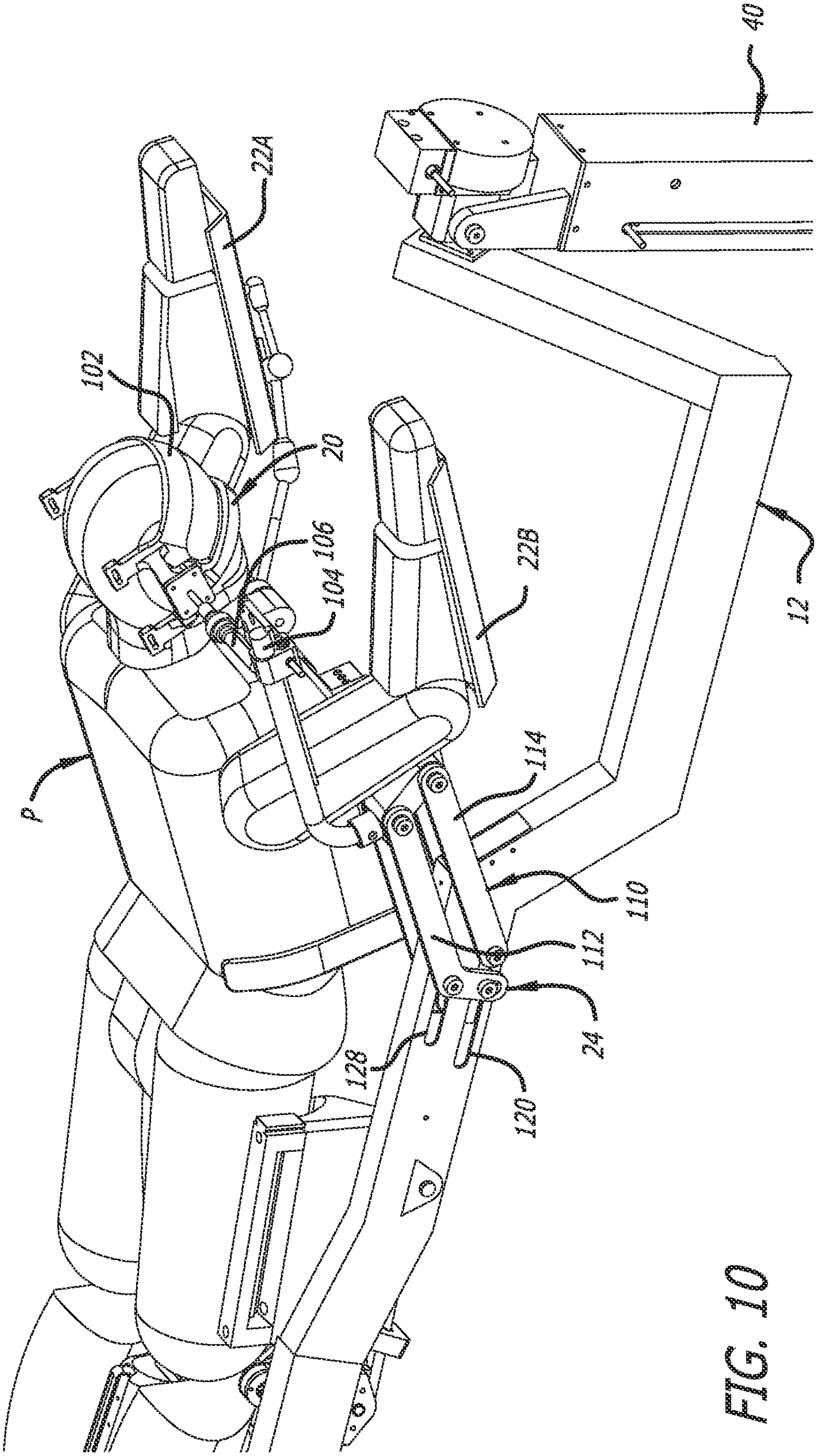
FIG. 10 is an enlarged top perspective view that illustrates portions of the surgical frame of FIG. 1 showing the torso-lift support supporting the patient in the lifted position.
Figure 11:
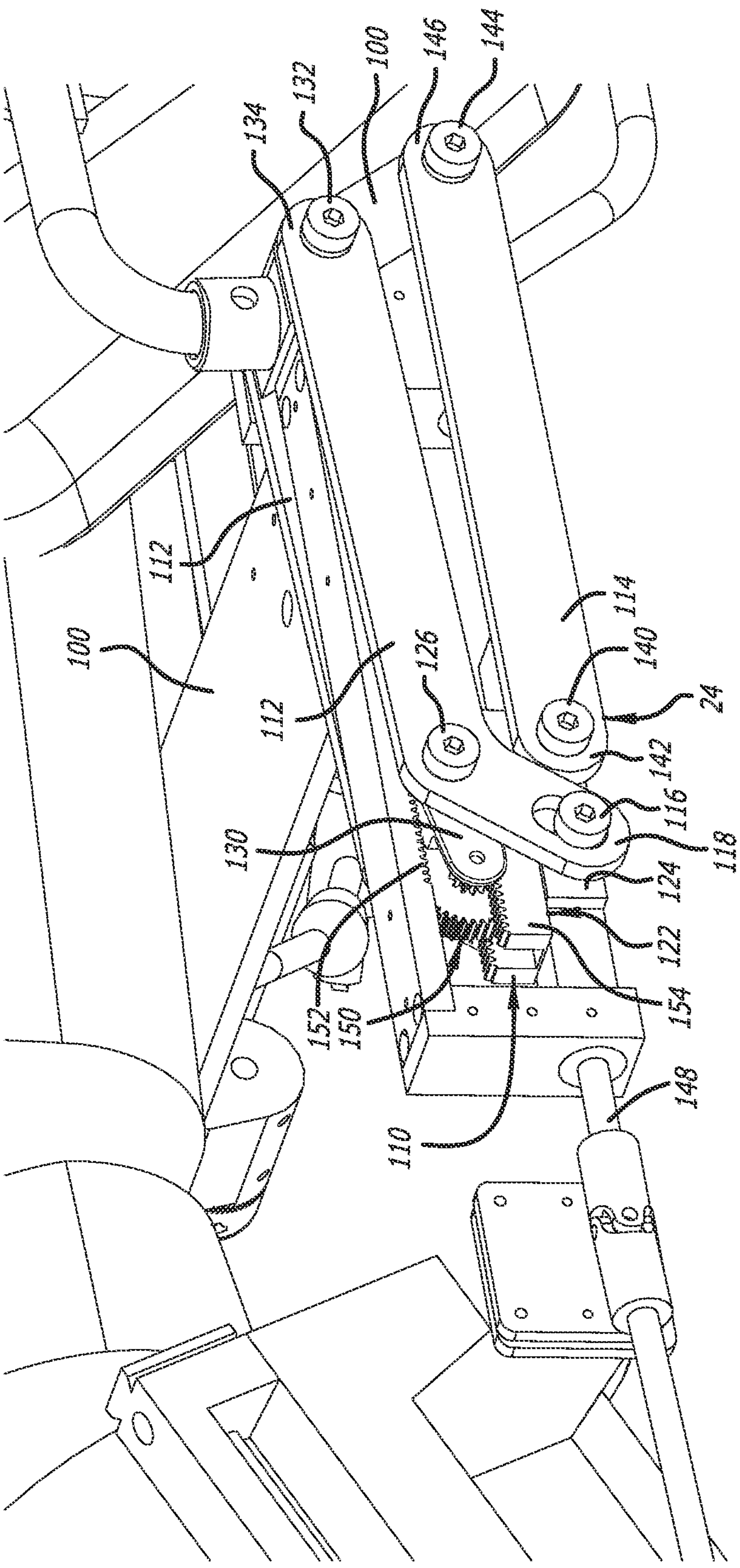
FIG. 11 is an enlarged top perspective view that illustrates componentry of the torso-lift support in the unlifted position.
Figure 12:
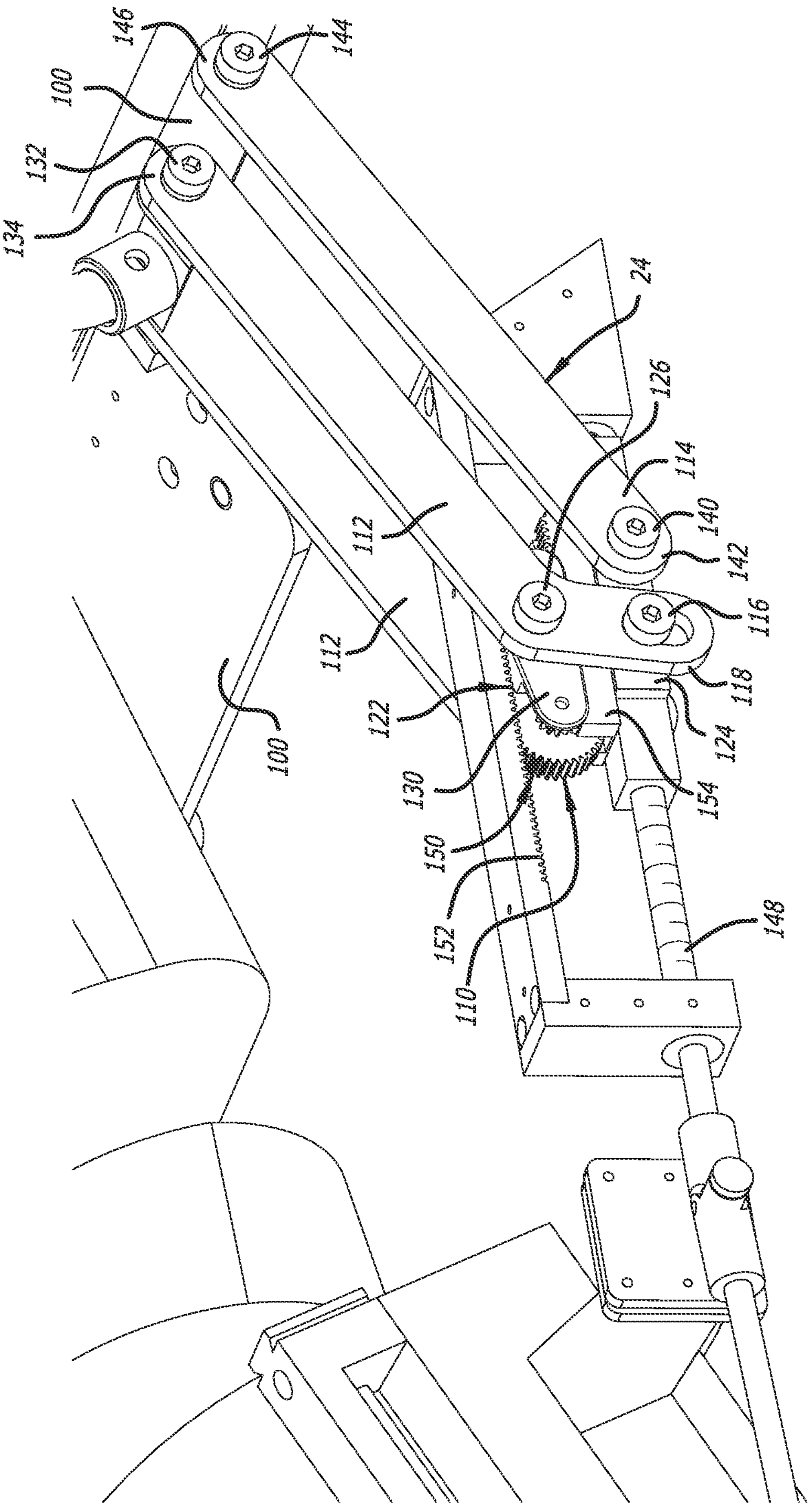
FIG. 12 is an enlarged top perspective view that illustrates the componentry of the torso-lift support in the lifted position.

As depicted in FIGS. 10-12, for example, the four-bar mechanism 110 includes first links 112 pivotally connected between offset main beam 12 and the chest support plate 100, and second links 114 pivotally connected between the offset main beam 12 and the chest support plate 100. As depicted in FIGS. 11 and 12, for example, in order to maintain the COR 108 at the desired fixed position, the first and second links 112 and 114 of the four-bar mechanism 110 crawl toward the first support portion 40 of the support structure 14, when the patient's upper body is being lifted. The first and second links 112 and 114 are arranged such that neither the surgeon's workspace nor imaging access are compromised while the patient's torso is being lifted.

As depicted in FIGS. 11 and 12, for example, each of the first links 112 define an L-shape, and includes a first pin 116 at a first end 118 thereof. The first pin 116 extends through first elongated slots 120 defined in the offset main beam 12, and the first pin 116 connects the first links 112 to a dual rack and pinion mechanism 122 via a drive nut 124 provided within the offset main beam 12, thus defining a lower pivot point thereof. Each of the first links 112 also includes a second pin 126 positioned proximate the corner of the L-shape. The second pin 126 extends through second elongated slots 128 defined in the offset main beam 12, and is linked to a carriage 130 of rack and pinion mechanism 122. Each of the first links 112 also includes a third pin 132 at a second end 134 that is pivotally attached to chest support plate 100, thus defining an upper pivot point thereof.

As depicted in FIGS. 11 and 12, for example, each of the second links 114 includes a first pin 140 at a first end 142 thereof. The first pin 140 extends through the first elongated slot 120 defined in the offset main beam 12, and the first pin 140 connects the second links 114 to the drive nut 124 of the rack and pinion mechanism 122, thus defining a lower pivot point thereof. Each of the second links 114 also includes a second pin 144 at a second end 146 that is pivotally connected to the chest support plate 100, thus defining an upper pivot point thereof.

As depicted in FIGS. 11 and 12, the rack and pinion mechanism 122 includes a drive screw 148 engaging the drive nut 124. Coupled gears 150 are attached to the carriage 130. The larger of the gears 150 engage an upper rack 152 (fixed within the offset main beam 12), and the smaller of the gears 150 engage a lower rack 154. The carriage 130 is defined as a gear assembly that floats between the two racks 152 and 154.

As depicted in FIGS. 11 and 12, the rack and pinion mechanism 122 converts rotation of the drive screw 148 into linear translation of the first and second links 112 and 114 in the first and second elongated slots 120 and 128 toward the first portion 40 of the support structure 14. As the drive nut 124 translates along drive screw 148 (via rotation of the drive screw 148), the carriage 130 translates towards the first portion 40 with less travel due to the different gear sizes of the coupled gears 150. The difference in travel, influenced by different gear ratios, causes the first links 112 pivotally attached thereto to lift the chest support plate 100. Lowering of the chest support plate 100 is accomplished by performing this operation in reverse. The second links 114 are "idler" links (attached to the drive nut 124 and the chest support plate 100) that controls the tilt of the chest support plate 100 as it is being lifted and lowered. All components associated with lifting while tilting the chest plate predetermine where COR 108 resides. Furthermore, a servomotor (not shown) interconnected with the drive screw 148 can be computer controlled and/or operated by the operator of the surgical frame 10 to facilitate controlled lifting and lowering of the chest support plate 100. A safety feature can be provided, enabling the operator to read and limit a lifting and lowering force applied by the torso-lift support 24 in order to prevent injury to the patient P. Moreover, the torso-lift support 24 can also include safety stops (not shown) to prevent over-extension or compression of the patient P, and sensors (not shown) programmed to send patient position feedback to the safety stops.

Figure 13A:
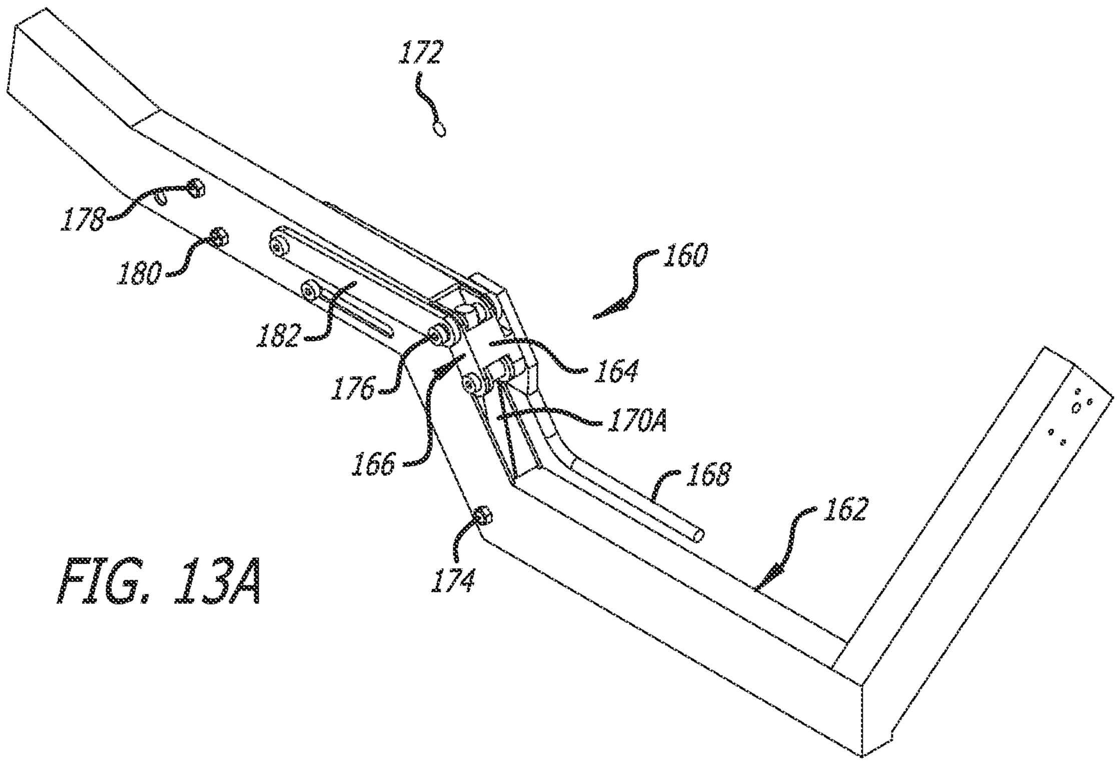
FIG. 13A is a perspective view of an embodiment that illustrates a structural offset main beam for use with another embodiment of a torso-lift support showing the torso-lift support in a retracted position.

An alternative preferred embodiment of a torso-lift support is generally indicated by the numeral 160 in FIGS. 13A-15. As depicted in FIGS. 13A-13C, an alternate offest main beam 162 is utilized with the torso-lift support 160. Furthermore, the torso-lift support 160 has a support plate 164 pivotally linked to the offset main beam 162 by a chest support lift mechanism 166. An arm support rod/plate 168 is connected to the support plate 164, and the second arm support 22B. The support plate 164 is attached to the chest support plate 100, and the chest support lift mechanism 166 includes various actuators 170A, 170B, and 170C used to facilitate positioning and repositioning of the support plate 164 (and hence, the chest support plate 100).

Figure 13B:
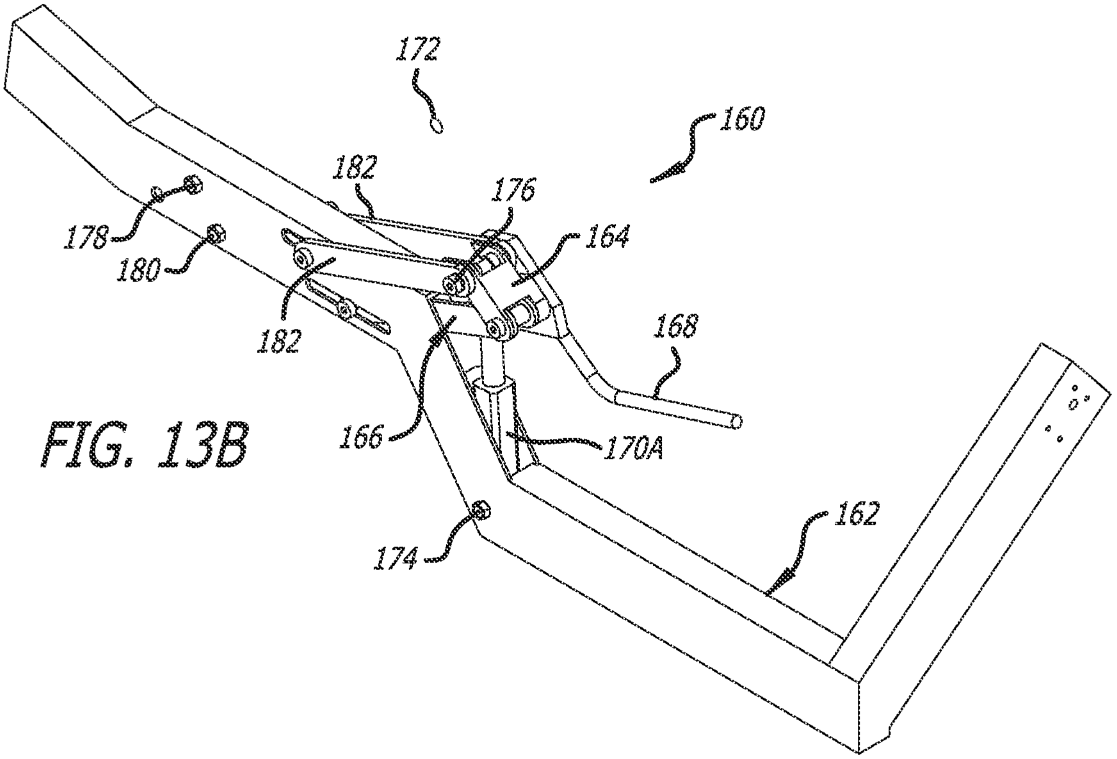
FIG. 13B is a perspective view similar to FIG. 13A showing the torso-lift support at half travel.
Figure 13C:
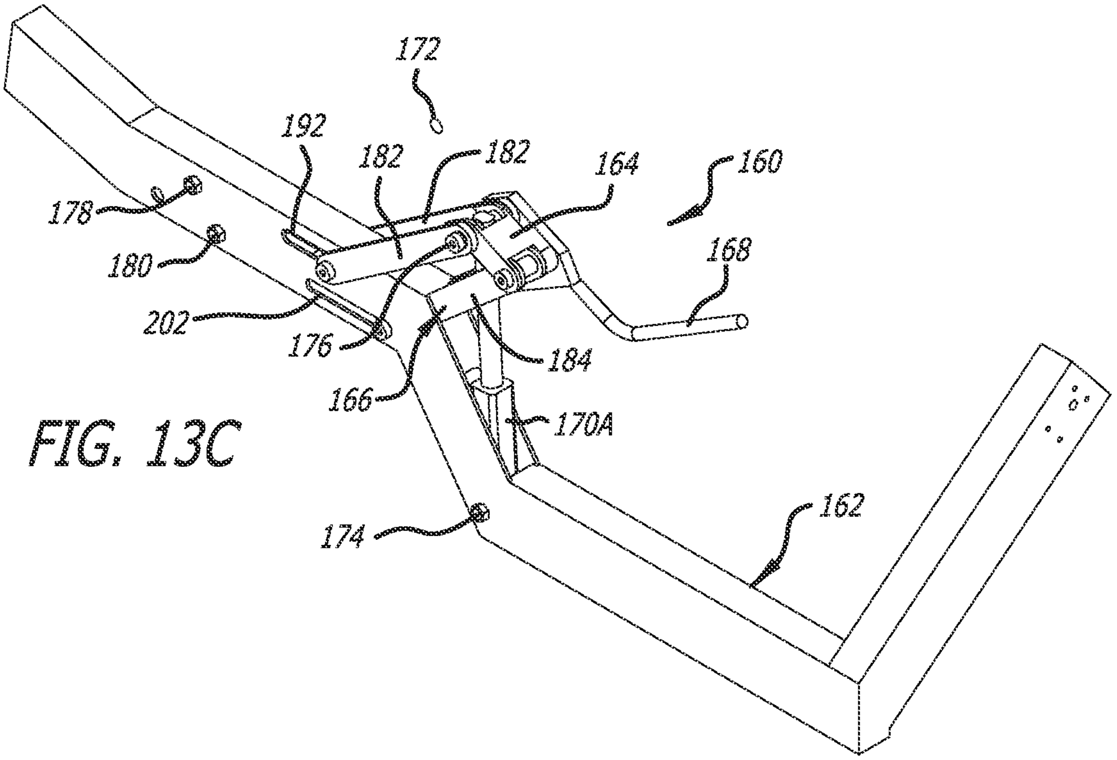
FIG. 13C is a perspective view similar to FIGS. 13A and 13B showing the torso-lift support at full travel.

As discussed below, the torso-lift support 160 depicted in FIGS. 13A-15 enables a COR 172 thereof to be programmably altered such that the COR 172 can be a fixed COR or a variable COR. As their names suggest, the fixed COR stays in the same position as the torso-lift support 160 is actuated, and the variable COR moves between a first position and a second position as the torso-lift support 160 is actuated between its initial position and final position at full travel thereof. Appropriate placement of the COR 172 is important so that spinal cord integrity is not compromised (i.e., overly compressed or stretched). Thus, the support plate 164 (and hence, the chest support plate 100) follows a path coinciding with a predetermined COR 172 (either fixed or variable). FIG. 13A depicts the torso-lift support 160 retracted, FIG. 13B depicts the torso-lift support 160 at half travel, and FIG. 13C depicts the torso-lift support 160 at full travel.

Figure 14:
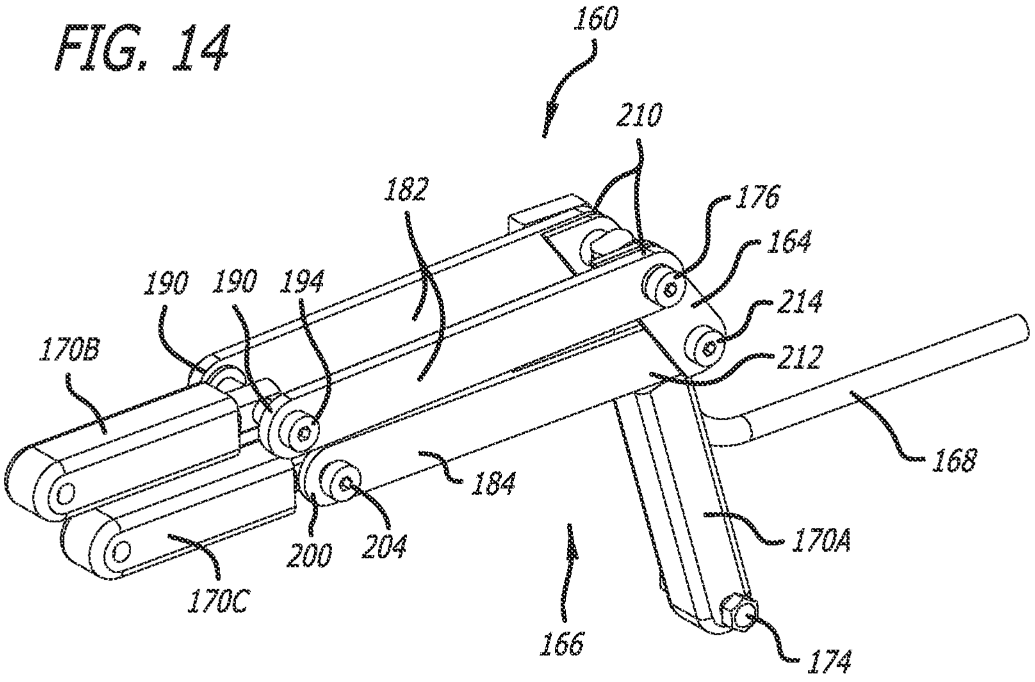
FIG. 14 is a perspective view that illustrates a chest support lift mechanism of the torso-lift support of FIGS. 13A-13C with actuators thereof retracted.
Figure 15:
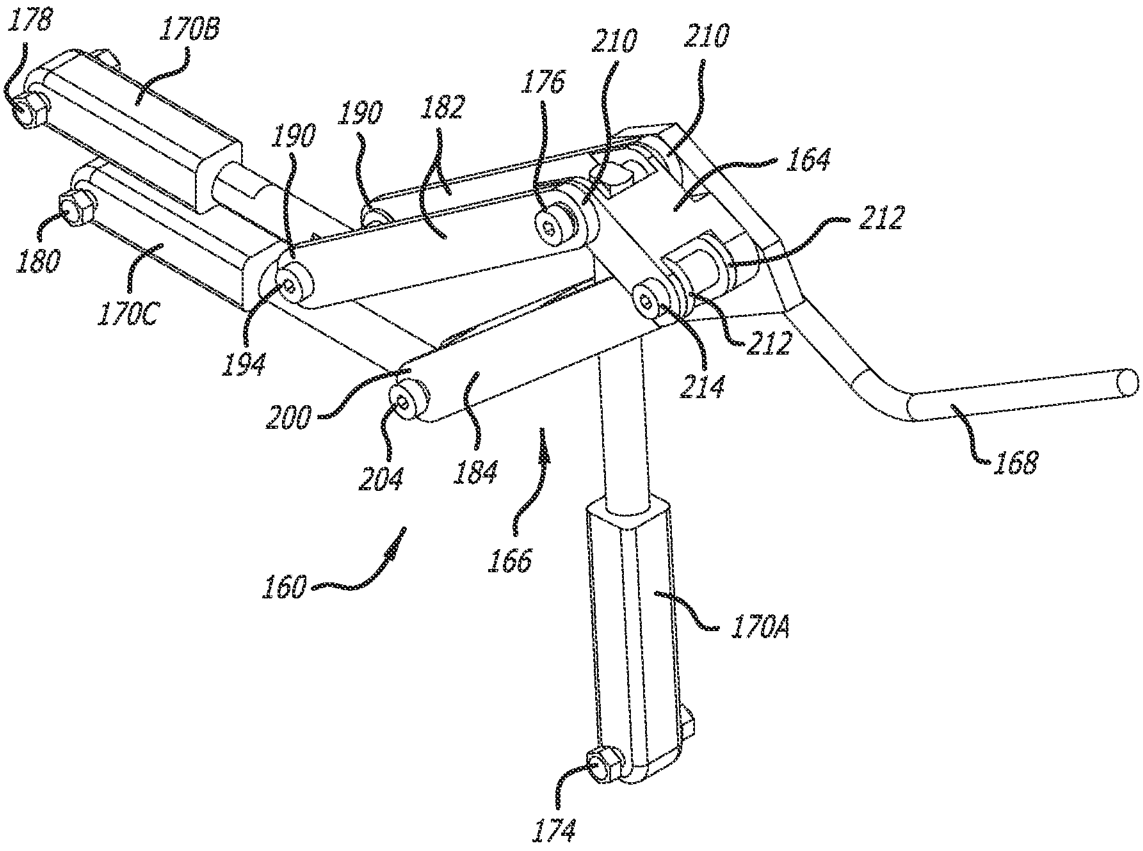
FIG. 15 is another perspective view that illustrates a chest support lift mechanism of the torso-lift support of FIGS. 13A-13C with the actuators thereof extended.

As discussed above, the chest support lift mechanism 166 includes the actuators 170A, 170B, and 170C to position and reposition the support plate 164 (and hence, the chest support plate 100). As depicted in FIGS. 14 and 15, for example, the first actuator 170A, the second actuator 170B, and the third actuator 170C are provided. Each of the actuators 170A, 170B, and 170C are interconnected with the offset main beam 12 and the support plate 164, and each of the actuators 170A, 170B, and 170C are moveable between a retracted and extended position. As depicted in FIGS. 13A-13C, the first actuator 170A is pinned to the offset main beam 162 using a pin 174 and pinned to the support plate 164 using a pin 176. Furthermore, the second and third actuators 170B and 170C are received within the offset main beam 162. The second actuator 170B is interconnected with the offset main beam 162 using a pin 178, and the third actuator 170C is interconnected with the offset main beam 162 using a pin 180.

The second actuator 170B is interconnected with the support plate 164 via first links 182, and the third actuator 170C is interconnected with the support plate 164 via second links 184. First ends 190 of the first links 182 are pinned to the second actuator 170B and elongated slots 192 formed in the offset main beam 162 using a pin 194, and first ends 200 of the second links 184 are pinned to the third actuator 170C and elongated slots 202 formed in the offset main beam 162 using a pin 204. The pins 194 and 204 are moveable within the elongated slots 192 and 202. Furthermore, second ends 210 of the first links 182 are pinned to the support plate 164 using the pin 176, and second ends 212 of the second links 184 are pinned to the support plate 164 using a pin 214. To limit interference therebetween, as depicted in FIGS. 13A-13C, the first links 182 are provided on the exterior of the offset main beam 162, and, depending on the position thereof, the second links 184 are positioned on the interior of the offset main beam 162.

Actuation of the actuators 170A, 170B, and 170C facilitates movement of the support plate 164. Furthermore, the amount of actuation of the actuators 170A, 170B, and 170C can be varied to affect different positions of the support plate 164. As such, by varying the amount of actuation of the actuators 170A, 1706, and 170C, the COR 172 thereof can be controlled. As discussed above, the COR 172 can be predetermined, and can be either fixed or varied. Furthermore, the actuation of the actuators 170A, 170B, and 170C can be computer controlled and/or operated by the operator of the surgical frame 10, such that the COR 172 can be programmed by the operator. As such, an algorithm can be used to determine the rates of extension of the actuators 170A, 1706, and 170C to control the COR 172, and the computer controls can handle implementation of the algorithm to provide the predetermined COR. A safety feature can be provided, enabling the operator to read and limit a lifting force applied by the actuators 170A, 170B, and 170C in order to prevent injury to the patient P. Moreover, the torso-lift support 160 can also include safety stops (not shown) to prevent over-extension or compression of the patient P, and sensors (not shown) programmed to send patient position feedback to the safety stops.

FIGS. 16-23 depict portions of the sagittal adjustment assembly 28. The sagittal adjustment assembly 28 can be used to distract or compress the patient's lumbar spine during or after lifting or lowering of the patient's torso by the torso-lift supports. The sagittal adjustment assembly 28 supports and manipulates the lower portion of the patient's body. In doing so, the sagittal adjustment assembly 28 is configured to make adjustments in the sagittal plane of the patient's body, including tilting the pelvis, controlling the position of the upper and lower legs, and lordosing the lumbar spine.

Figure 16:
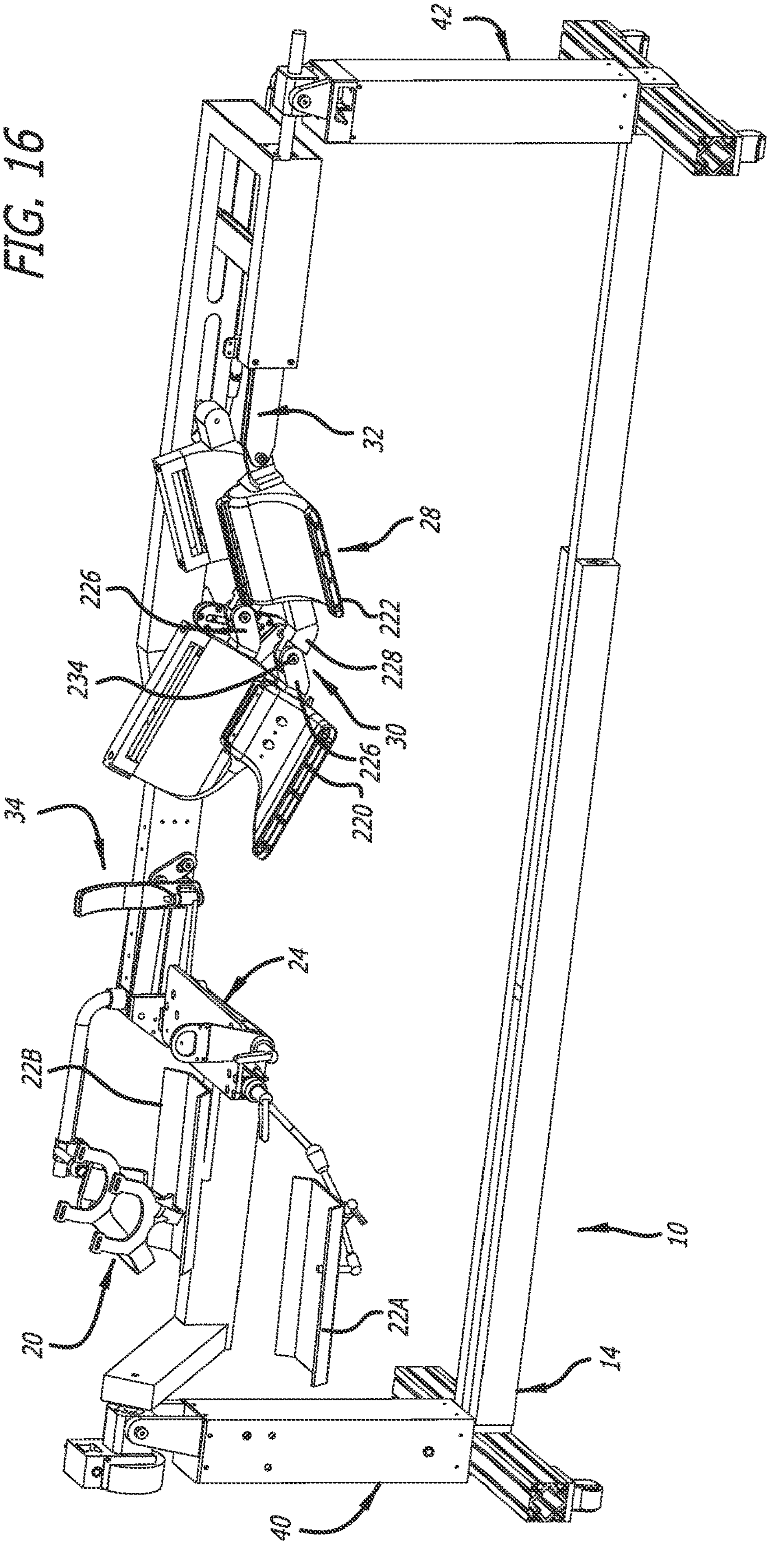
FIG. 16 is a top perspective view that illustrates the surgical frame of FIG. 1.
Figure 17:
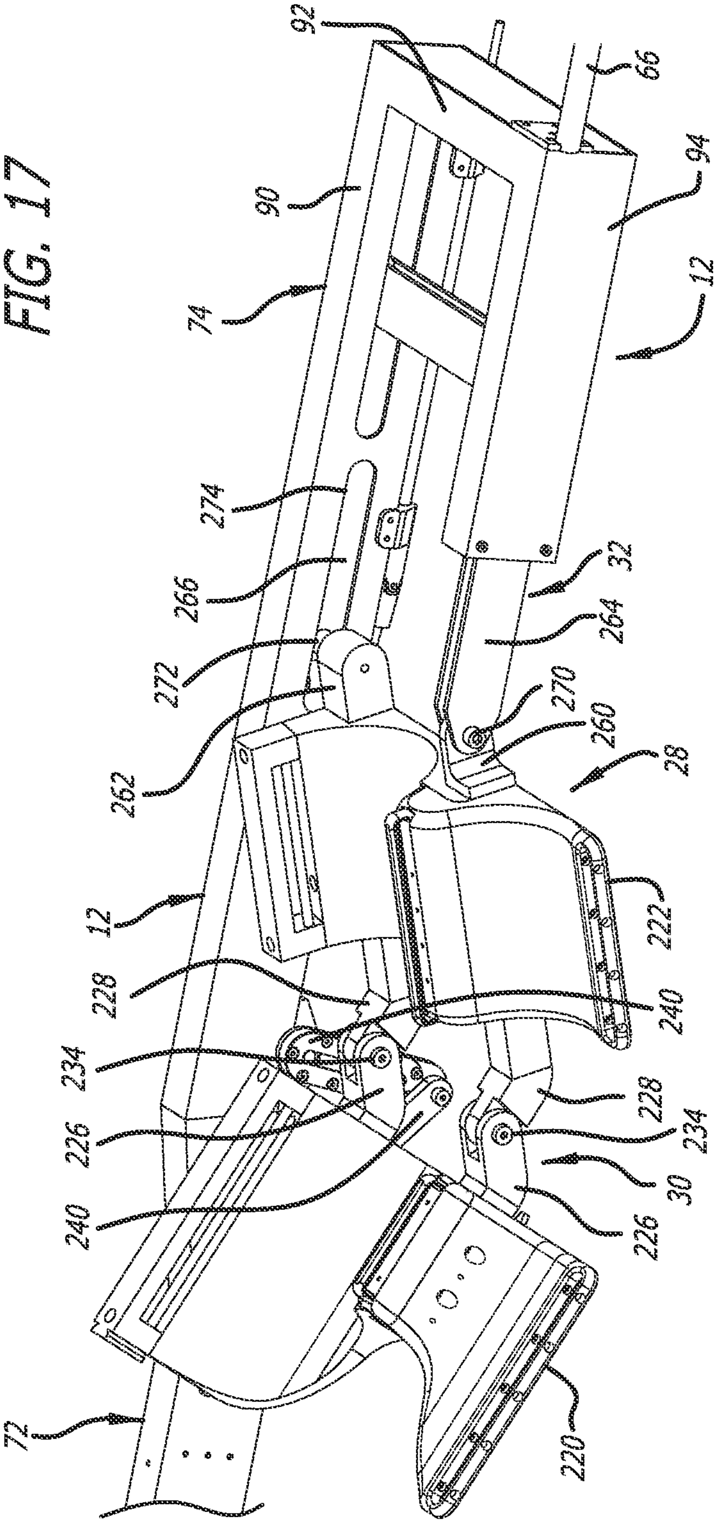
FIG. 17 is an enlarged top perspective view that illustrates portions of the surgical frame of FIG. 1 showing a sagittal adjustment assembly including a pelvic-tilt mechanism and leg adjustment mechanism.

As depicted in FIGS. 16 and 17, for example, the sagittal adjustment assembly 28 includes the pelvic-tilt mechanism 30 for supporting the thighs and lower legs of the patient P. The pelvic-tilt mechanism 30 includes a thigh cradle 220 configured to support the patient's thighs, and a lower leg cradle 222 configured to support the patient's shins. Different sizes of thigh and lower leg cradles can be used to accommodate different sizes of patients, i.e., smaller thigh and lower leg cradles can be used with smaller patients, and larger thigh and lower leg cradles can be used with larger patients. Soft straps (not shown) can be used to secure the patient P to the thigh cradle 220 and the lower leg cradle 222. The thigh cradle 220 and the lower leg cradle 222 are moveable and pivotal with respect to one another and to the offset main beam 12. To facilitate rotation of the patient's hips, the thigh cradle 220 and the lower leg cradle 222 can be positioned anterior and inferior to the patient's hips.

Figure 18:
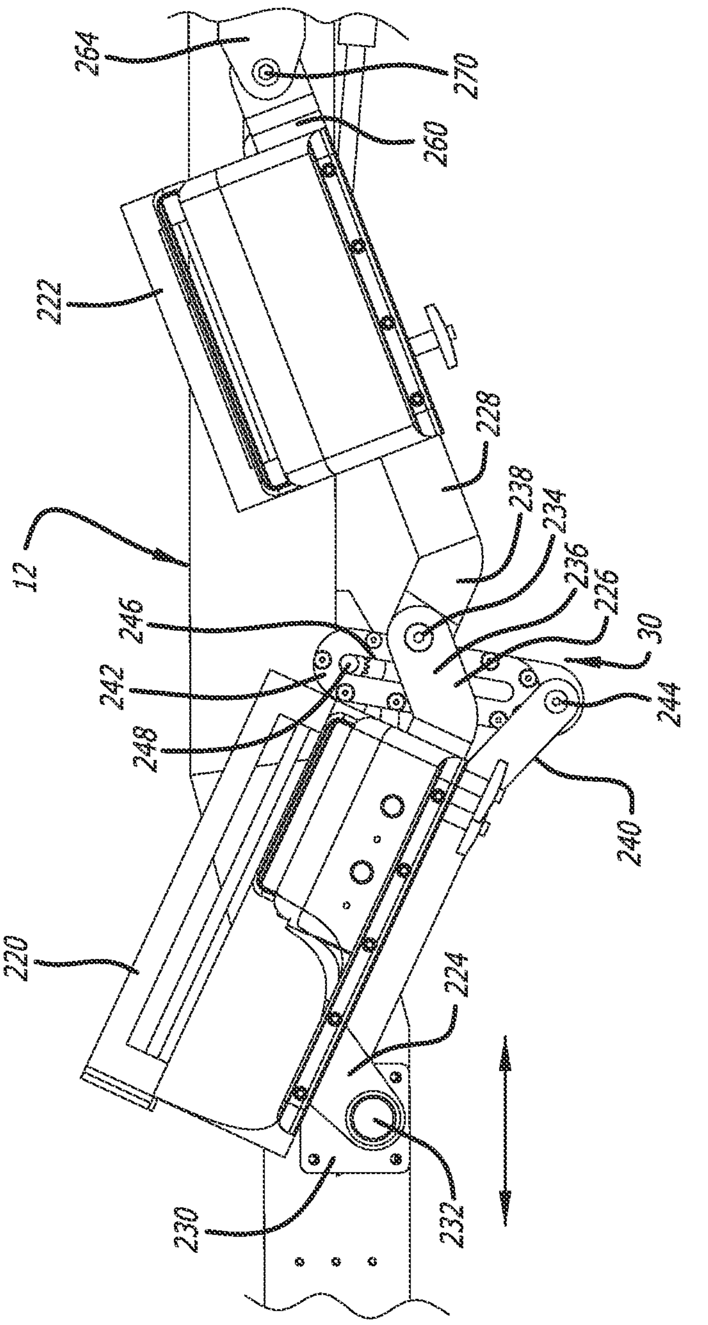
FIG. 18 is an enlarged side elevational view that illustrates portions of the surgical frame of FIG. 1 showing the pelvic-tilt mechanism.
Figure 25:
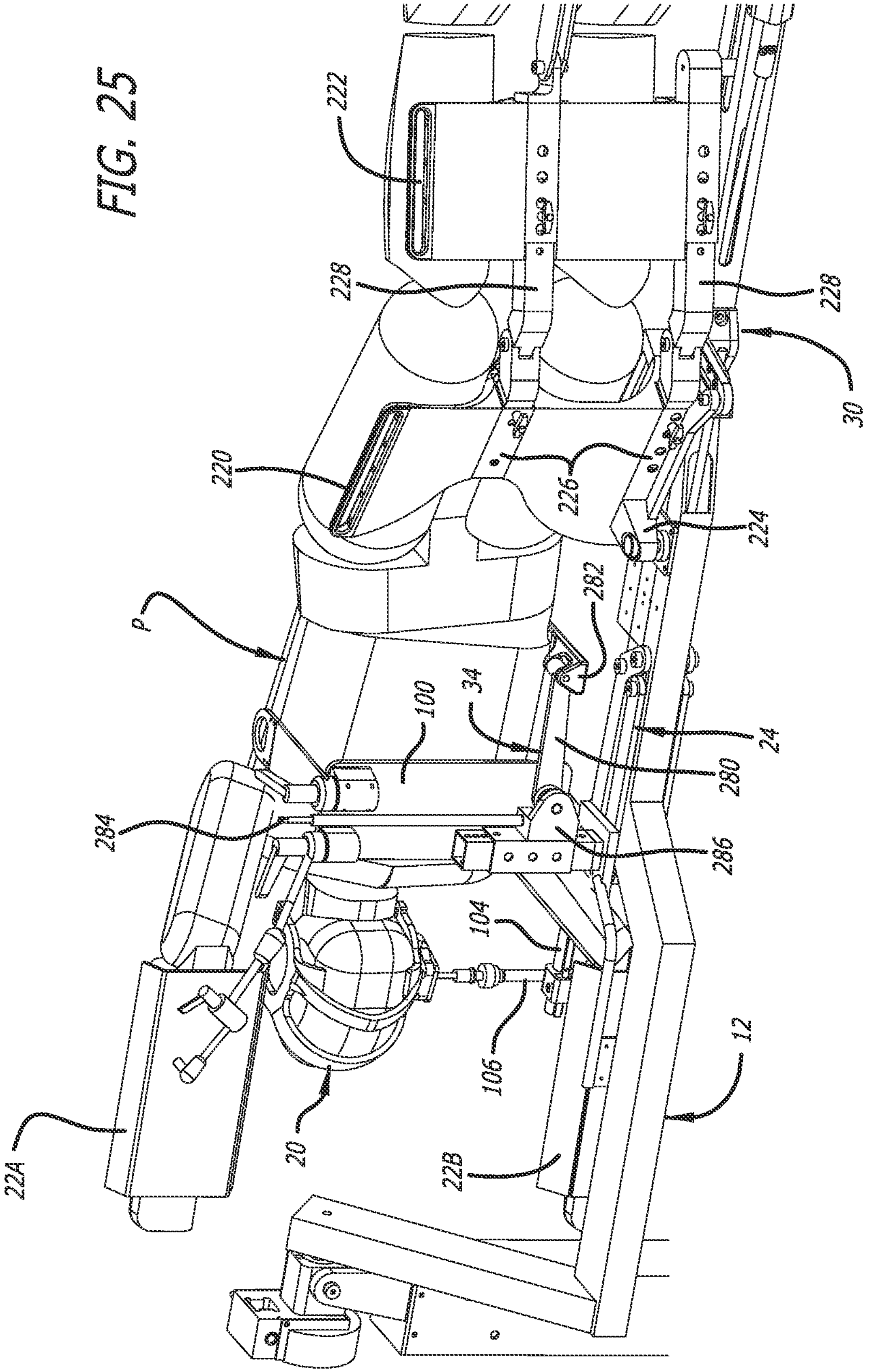
FIG. 25 is a top perspective view that illustrates portions of the surgical frame of FIG. 1 showing operation of the coronal adjustment assembly.

As depicted in FIGS. 18 and 25, for example, a first support strut 224 and second support struts 226 are attached to the thigh cradle 220. Furthermore, third support struts 228 are attached to the lower leg cradle 222. The first support strut 224 is pivotally attached to the offset main beam 12 via a support plate 230 and a pin 232, and the second support struts 226 are pivotally attached to the third support struts 228 via pins 234. The pins 234 extend through angled end portions 236 and 238 of the second and third support struts 226 and 228, respectively. Furthermore, the lengths of second and third support struts 226 and 228 are adjustable to facilitate expansion and contraction of the lengths thereof.

To accommodate patients with different torso lengths, the position of the thigh cradle 220 can be adjustable by moving the support plate 230 along the offset main beam 12. Furthermore, to accommodate patients with different thigh and lower leg lengths, the lengths of the second and third support struts 226 and 228 can be adjusted.

Figure 19:
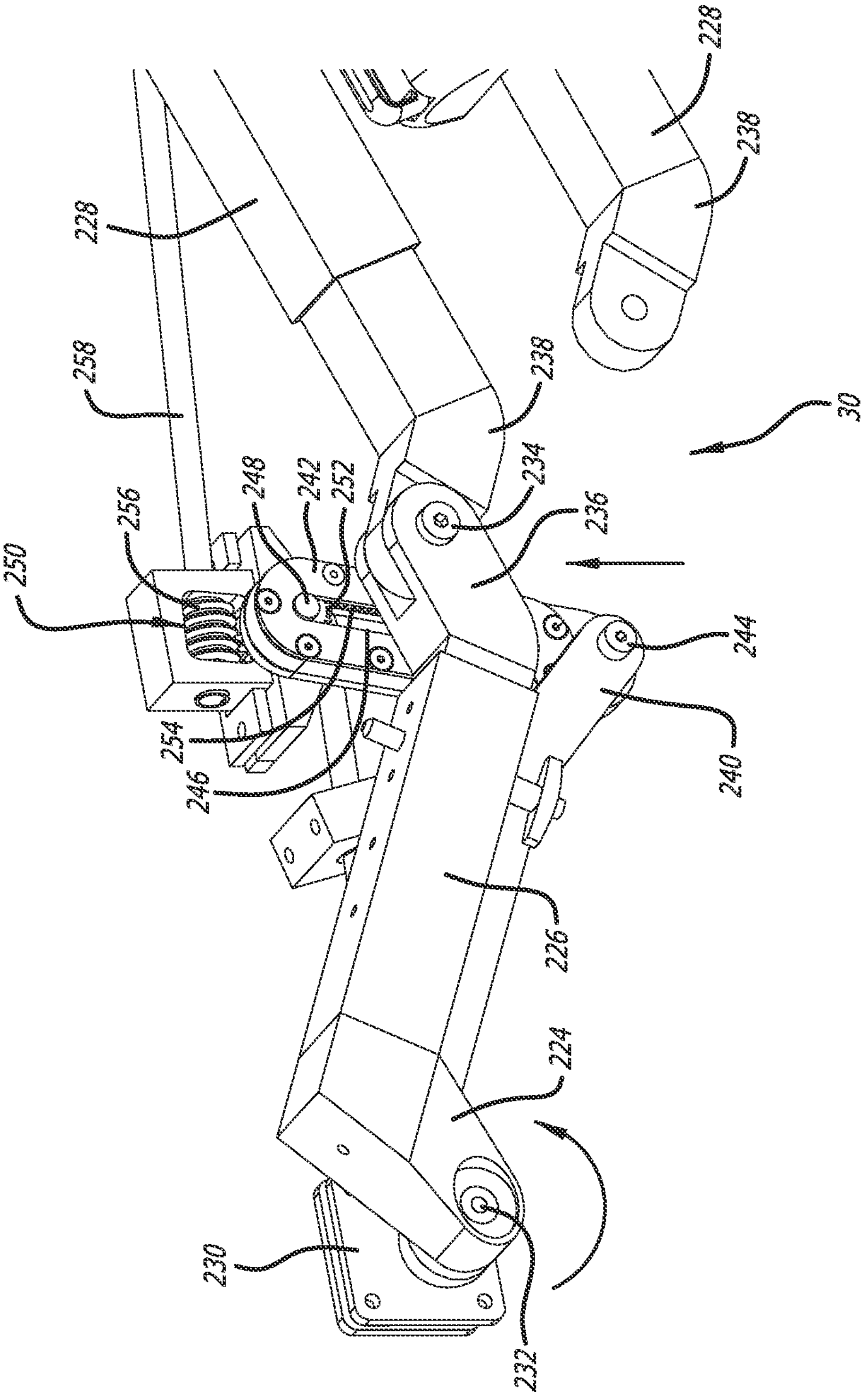
FIG. 19 is an enlarged perspective view that illustrates componentry of the pelvic-tilt mechanism.
Figure 20:
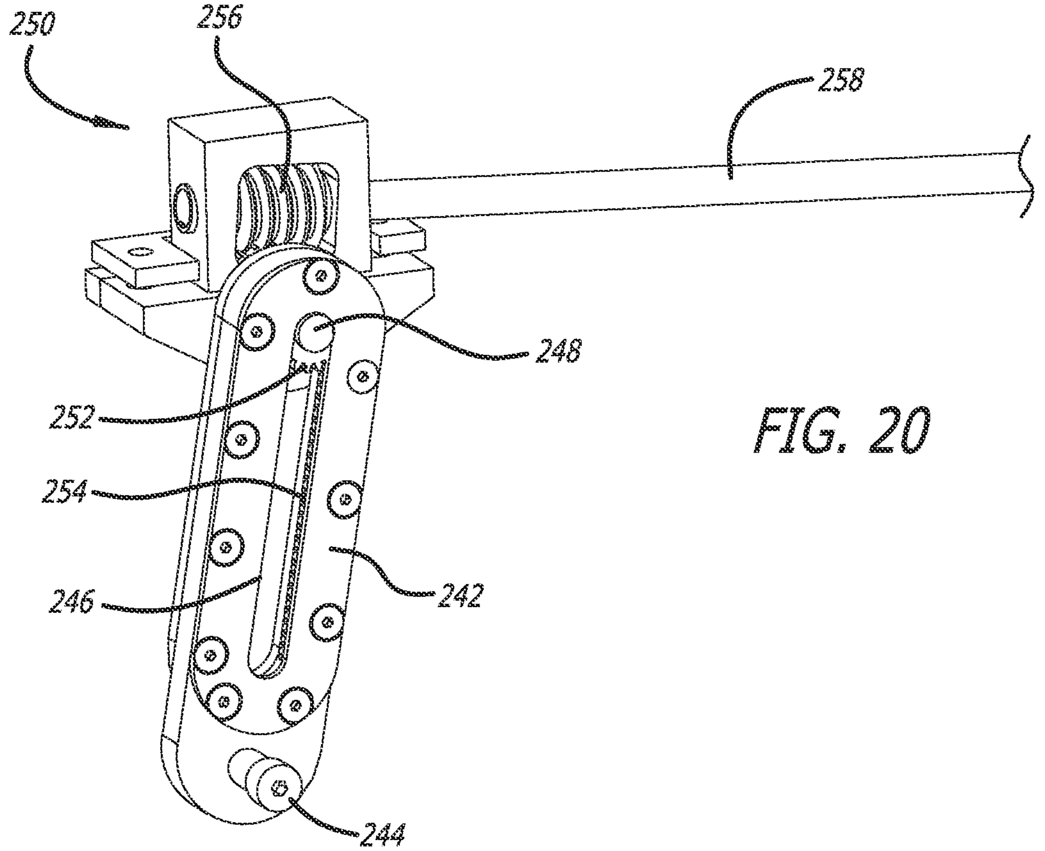
FIG. 20 is an enlarged perspective view that illustrates a captured rack and a worm gear assembly of the componentry of the pelvic-tilt mechanism.
Figure 21:
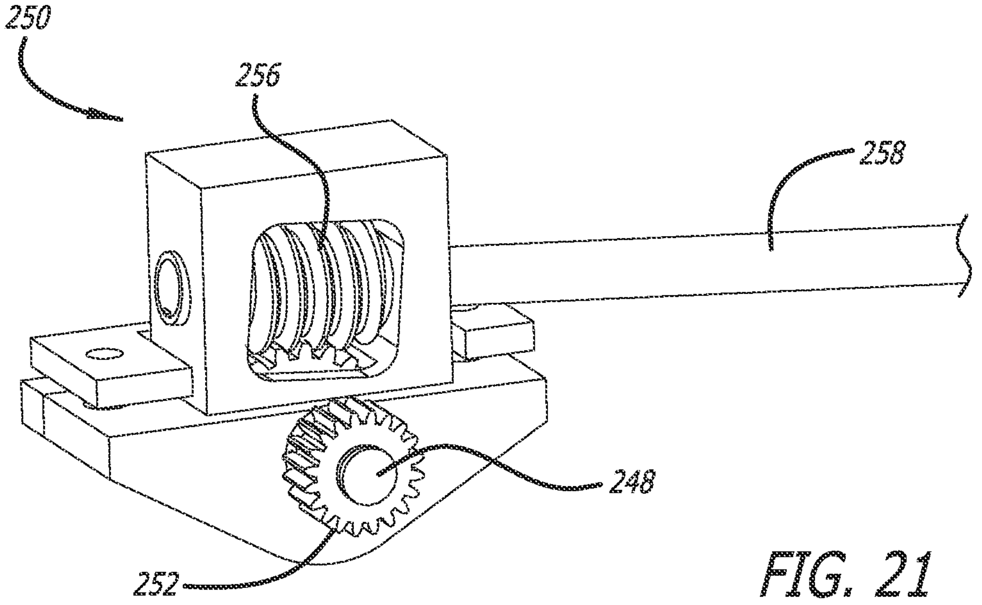
FIG. 21 is an enlarged perspective view that illustrates the worm gear assembly of FIG. 20.

To control the pivotal angle between the second and third support struts 226 and 228 (and hence, the pivotal angle between the thigh cradle 220 and lower leg cradle 222), a link 240 is pivotally connected to a captured rack 242 via a pin 244. The captured rack 242 includes an elongated slot 246, through which is inserted a worm gear shaft 248 of a worm gear assembly 250. The worm gear shaft 248 is attached to a gear 252 provided on the interior of the captured rack 242. The gear 252 contacts teeth 254 provided inside the captured rack 242, and rotation of the gear 252 (via contact with the teeth 254) causes motion of the captured rack 242 upwardly and downwardly. The worm gear assembly 250, as depicted in FIGS. 19-21, for example, includes worm gears 256 which engage a drive shaft 258, and which are connected to the worm gear shaft 248.

The worm gear assembly 250 also is configured to function as a brake, which prevents unintentional movement of the sagittal adjustment assembly 28. Rotation of the drive shaft 258 causes rotation of the worm gears 256, thereby causing reciprocal vertical motion of the captured rack 242. The vertical reciprocal motion of the captured rack 242 causes corresponding motion of the link 240, which in turn pivots the second and third support struts 226 and 228 to correspondingly pivot the thigh cradle 220 and lower leg cradle 222. A servomotor (not shown) interconnected with the drive shaft 258 can be computer controlled and/or operated by the operator of the surgical frame 10 to facilitate controlled reciprocal motion of the captured rack 242.

The sagittal adjustment assembly 28 also includes the leg adjustment mechanism 32 facilitating articulation of the thigh cradle 220 and the lower leg cradle 222 with respect to one another. In doing so, the leg adjustment mechanism 32 accommodates the lengthening and shortening of the patient's legs during bending thereof. As depicted in FIG. 17, for example, the leg adjustment mechanism 32 includes a first bracket 260 and a second bracket 262 attached to the lower leg cradle 222. The first bracket 260 is attached to a first carriage portion 264, and the second bracket 262 is attached to a second carriage portion 266 via pins 270 and 272, respectively. The first carriage portion 264 is slidable within third portion 94 of the rear portion 74 of the offset main beam 12, and the second carriage portion 266 is slidable within the first portion 90 of the rear portion 74 of the offset main beam 12. An elongated slot 274 is provided in the first portion 90 to facilitate engagement of the second bracket 262 and the second carriage portion 266 via the pin 272. As the thigh cradle 220 and the lower leg cradle 222 articulate with respect to one another (and the patient's legs bend accordingly), the first carriage 264 and the second carriage 266 can move accordingly to accommodate such movement.

Figure 22:
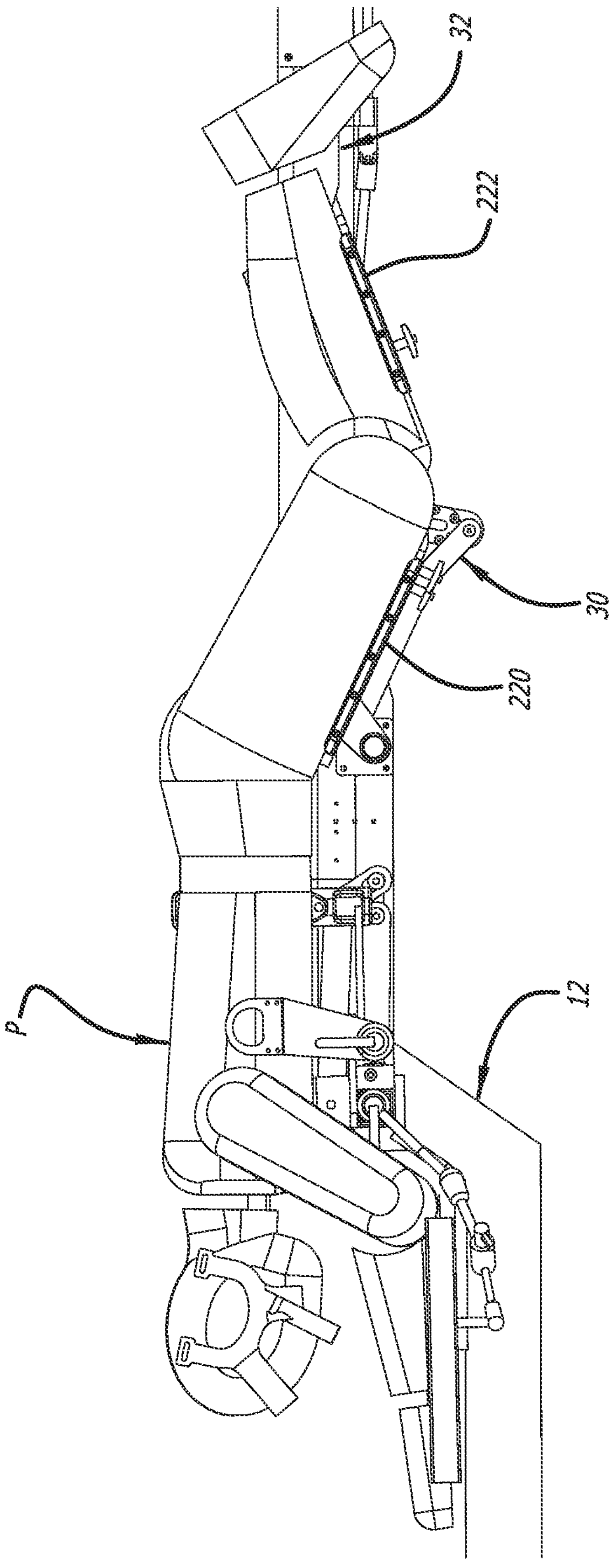
FIG. 22 is a side elevational view that illustrates portions of the surgical frame of FIG. 1 showing the patient positioned thereon and the pelvic-tilt mechanism of the sagittal adjustment assembly in the flexed position.
Figure 23:
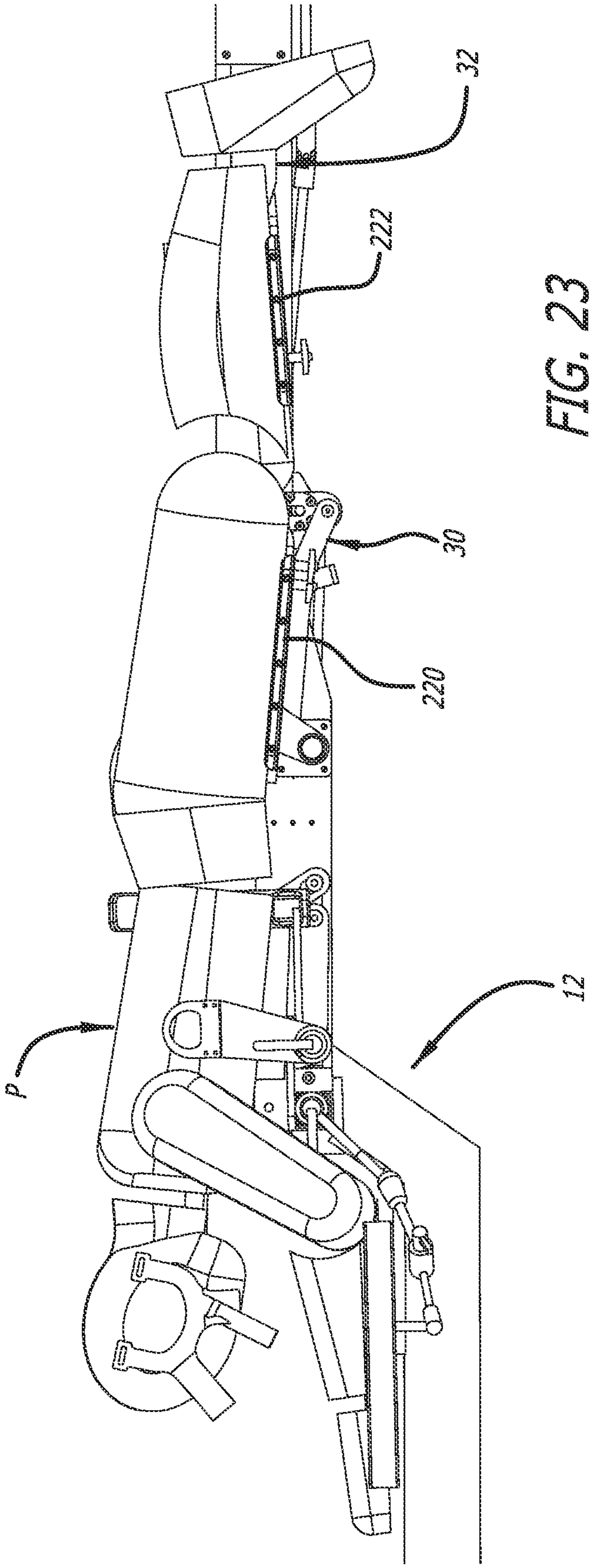
FIG. 23 is another side elevational view that illustrates portions of the surgical frame of FIG. 1 showing the patient positioned thereon and the pelvic-tilt mechanism of the sagittal adjustment assembly in the fully extended position.

The pelvic-tilt mechanism 30 is movable between a flexed position and a fully extended position. As depicted in FIG. 22, in the flexed position, the lumbar spine is hypo-lordosed. This opens the posterior boundaries of the lumbar vertebral bodies and allows for easier placement of any interbody devices. The lumbar spine stretches slightly in this position. As depicted in FIG. 23, in the extended position, the lumbar spine is lordosed. This compresses the lumbar spine. When posterior fixation devices, such as rods and screws, are placed, optimal sagittal alignment can be achieved. During sagittal alignment, little to negligible angle change occurs between the thighs and the pelvis. The pelvic-tilt mechanism 30 also can hyper-extend the hips as a means of lordosing the spine, in addition to tilting the pelvis. One of ordinary skill will recognize, however, that straightening the patient's legs does not lordose the spine. Leg straightening is a consequence of rotating the pelvis while maintaining a fixed angle between the pelvis and the thighs.

The sagittal adjustment assembly 28, having the configuration described above, further includes an ability to compress and distract the spine dynamically while in the lordosed or flexed positions. The sagittal adjustment assembly 28 also includes safety stops (not shown) to prevent over-extension or compression of the patient, and sensors (not shown) programmed to send patient position feedback to the safety stops.

Figure 24:
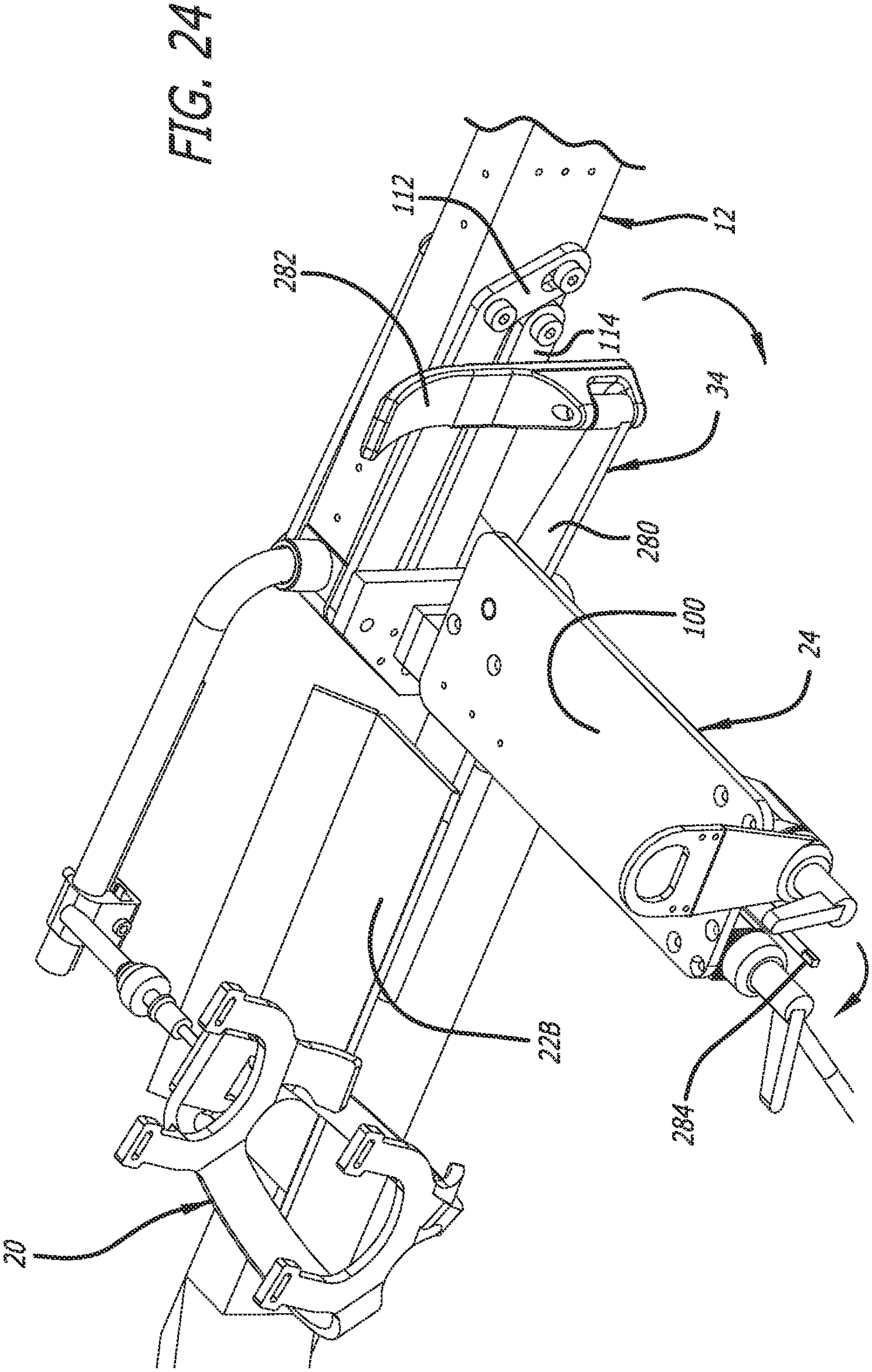
FIG. 24 is an enlarged top perspective view that illustrates portions of the surgical frame of FIG. 1 showing a coronal adjustment assembly.
Figure 26:
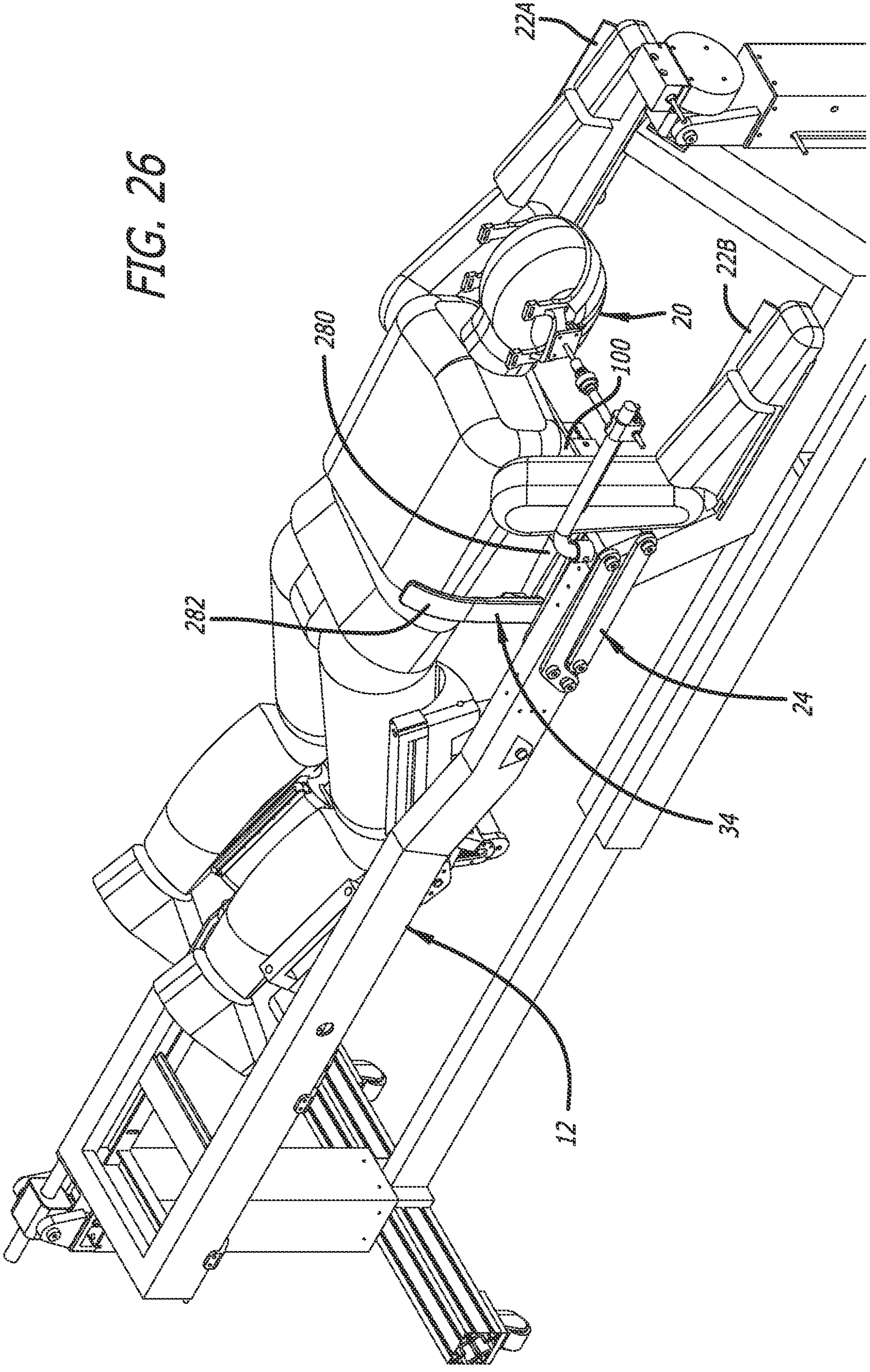
FIG. 26 is a top perspective view that illustrates a portion of the surgical frame of FIG. 1 showing operation of the coronal adjustment assembly.
Figure 27:
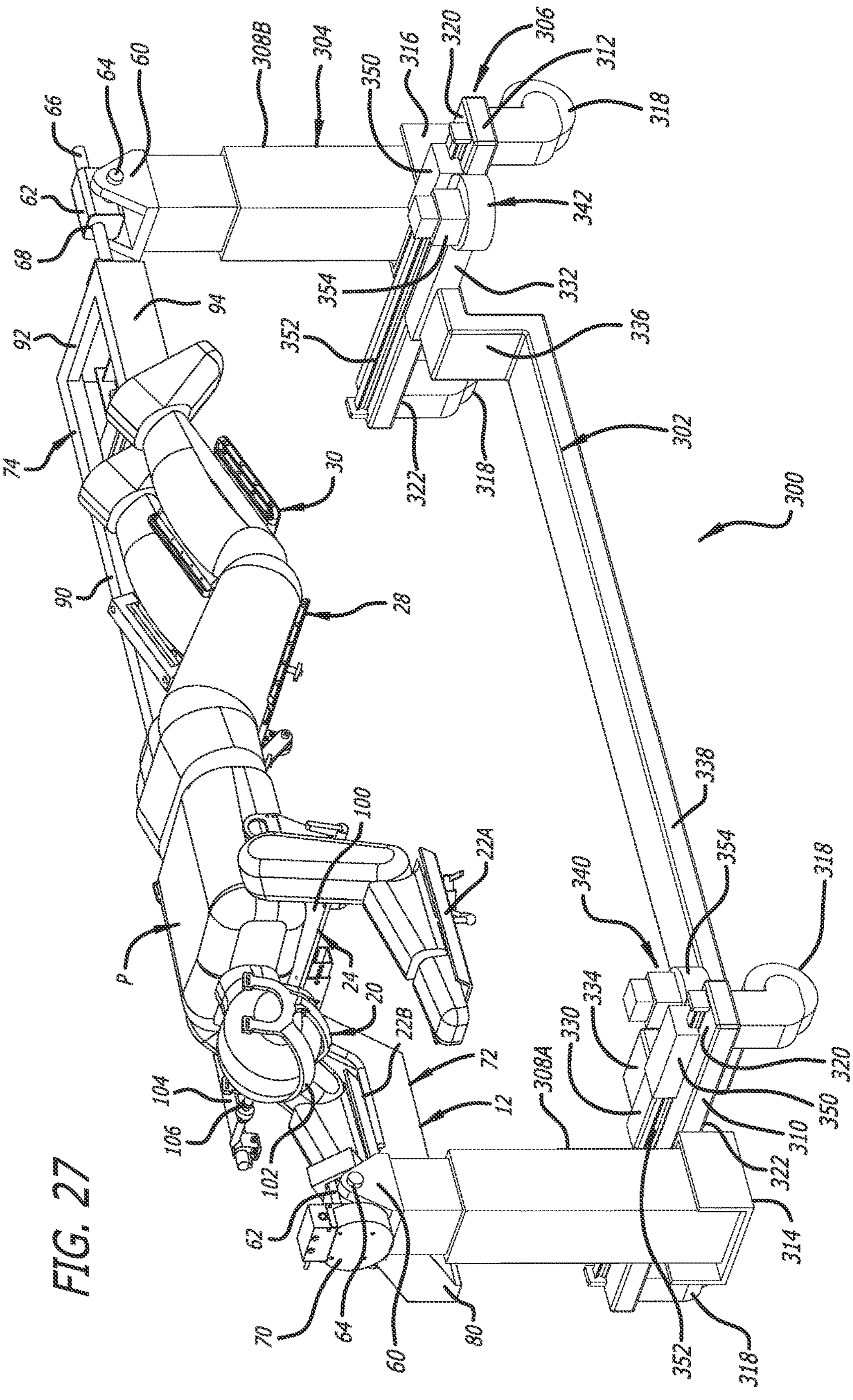
FIG. 27 is a top perspective view that illustrates a prior art surgical frame in accordance with an embodiment of the present invention with the patient positioned thereon in a prone position showing a translating beam thereof in a first position.

As depicted in FIGS. 24-26, for example, the coronal adjustment assembly 34 is configured to support and manipulate the patient's torso, and further to correct a spinal deformity, including but not limited to a scoliotic spine. As depicted in FIGS. 24-26, for example, the coronal adjustment assembly 34 includes a lever 280 linked to an arcuate radio-lucent paddle 282. As depicted in FIGS. 24 and 25, for example, a rotatable shaft 284 is linked to the lever 280 via a transmission 286, and the rotatable shaft 284 projects from an end of the chest support plate 100. Rotation of the rotatable shaft 284 is translated by the transmission 286 into rotation of the lever 280, causing the paddle 282, which is linked to the lever 280, to swing in an arc. Furthermore, a servomotor (not shown) interconnected with the rotatable shaft 284 can be computer controlled and/or operated by the operator of the surgical frame 10 to facilitate controlled rotation of the lever 280.

As depicted in FIG. 24, for example, adjustments can be made to the position of the paddle 282 to manipulate the torso and straighten the spine. As depicted in FIG. 25, when the offset main beam 12 is positioned such that the patient P is positioned in a lateral position, the coronal adjustment assembly 34 supports the patient's torso. As further depicted in FIG. 26, when the offset main beam 12 is positioned such that the patient P is positioned in a prone position, the coronal adjustment assembly 34 can move the torso laterally, to correct a deformity, including but not limited to a scoliotic spine. When the patient is strapped in via straps (not shown) at the chest and legs, the torso is relatively free to move and can be manipulated. Initially, the paddle 282 is moved by the lever 280 away from the offset main beam 12. After the paddle 282 has been moved away from the offset main beam 12, the torso can be pulled with a strap towards the offset main beam 12. The coronal adjustment assembly 34 also includes safety stops (not shown) to prevent over-extension or compression of the patient, and sensors (not shown) programmed to send patient position feedback to the safety stops.

A preferred embodiment of a surgical frame incorporating a translating beam is generally indicated by the numeral 300 in FIGS. 27-30. Like the surgical frame 10, the surgical frame 300 serves as an exoskeleton to support the body of the patient P as the patient's body is manipulated thereby. In doing so, the surgical frame 300 serves to support the patient P such that the patient's spine does not experience unnecessary stress/torsion.

The surgical frame 300 includes translating beam 302 that is generally indicated by the numeral 302 in FIGS. 27-30. The translating beam 302 is capable of translating motion affording it to be positioned and repositioned with respect to portions of the remainder of the surgical frame 300. As discussed below, the positioning and repositioning of the translating beam 302, for example, affords greater access to a patient receiving area A defined by the surgical frame 300, and affords greater access to the patient P by a surgeon and/or a surgical assistant (generally indicated by the letter S in FIG. 30) via access to either of the lateral sides $L_1$ and $L_2$ (FIG. 30) of the surgical frame 300.

As discussed below, by affording greater access to the patient receiving area A, the surgical frame 300 affords transfer of the patient P from and to a surgical table/gurney. Using the surgical frame 300, the surgical table/gurney can be conventional, and there is no need to lift the surgical table/gurney over portions of the surgical frame 300 to afford transfer of the patient P thereto.

The surgical frame 300 is configured to provide a relatively minimal amount of structure adjacent the patient's spine to facilitate access thereto and to improve the quality of imaging available before, during, and even after surgery. Thus, the workspace of a surgeon and/or a surgical assistant and imaging access are thereby increased. The workspace, as discussed below, can be further increased by positioning and repositioning the translating beam 302. Furthermore, radio-lucent or low magnetic susceptibility materials can be used in constructing the structural components adjacent the patient's spine in order to further enhance imaging quality.

The surgical frame 300, as depicted in FIGS. 27-30, is similar to the surgical frame 10 except that surgical frame 300 includes a support structure 304 having a support platform 306 incorporating the translating beam 302. The surgical frame 300 incorporates the offset main beam 12 and the features associated therewith from the surgical table 300. As such, the element numbering used to describe the surgical frame 10 is also applicable to portions of the surgical frame 300.

Rather than including the cross member 44, and the horizontal portions 46 and the vertical portions 48 of the first and second support portions 40 and 42, the support structure 304 includes the support platform 306, a first vertical support post 308A, and a second vertical support post 308B. As depicted in FIGS. 27-30, the support platform 306 extends from adjacent one longitudinal end to adjacent the other longitudinal end of the surgical frame 300, and the support platform 306 supports the first vertical support post 308A at the one longitudinal end and supports the second vertical support post 308B at the other longitudinal end.

As depicted in FIGS. 27-30, the support platform 306 (in addition to the translating beam 302) includes a first end member 310, a second end member 312, a first support bracket 314, and a second support bracket 316. Casters 318 are attached to the first and second end members 310 and 312. The first end member 310 and the second end member 312 each include an upper surface 320 and a lower surface 322. The casters 318 can be attached to the lower surface of each of the first and second end members 310 and 312 at each end thereof, and the casters 318 can be spaced apart from one another to afford stable movement of the surgical frame 300. Furthermore, the first support bracket 314 supports the first vertical support post 308A, and the second support bracket 316 supports the vertical second support post 308B.

The translating beam 302 is interconnected with the first and second end members 310 and 312 of the support platform 306, and as depicted in FIGS. 27-30, the translating beam 302 is capable of movement with respect to the first and second end members 310 and 312. The translating beam 302 includes a first end member 330, a second end member 332, a first L-shaped member 334, a second L-shaped member 336, and a cross member 338. The first L-shaped member 334 is attached to the first end member 330 and the cross member 338, and the second L-shaped member 336 is attached to the second end member 332 and the cross member 338. Portions of the first and second L-shaped members 334 and 336 extend downwardly relative to the first and second end members 330 and 332 such that the cross member 338 is positioned vertically below the first and second end member 330 and 332. The vertical position of the cross member 338 relative to the remainder of the surgical frame 300 lowers the center of gravity of the surgical frame 300, and in doing so, serves in adding to the stability of the surgical frame 300.

The translating beam 302, as discussed above, is capable of being positioned and repositioned with respect to portions of the remainder of the surgical frame 300. To that end, the support platform 306 includes a first translation mechanism 340 and a second translation mechanism 342. The first translation mechanism 340 facilitates attachment between the first end members 310 and 330, and the second translation mechanism 342 facilitates attachment between the second end members 312 and 332. The first and second translation mechanism 340 and 342 also facilitate movement of the translating beam 302 relative to the first end member 310 and the second end member 312.

The first and second translation mechanisms 340 and 342 can each include a transmission 350 and a track 352 for facilitating movement of the translating beam 302. The tracks 352 are provided on the upper surface 320 of the first and second end members 310 and 312, and the transmissions 350 are interoperable with the tracks 352. The first and second transmission mechanisms 340 and 342 can each include an electrical motor 354 or a hand crank (not shown) for driving the transmissions 350. Furthermore, the transmissions 350 can include, for example, gears or wheels driven thereby for contacting the tracks 352. The interoperability of the transmissions 350, the tracks 352, and the motors 354 or hand cranks form a drive train for moving the translating beam 302. The movement afforded by the first and second translation mechanism 340 and 342 allows the translating beam 302 to be positioned and repositioned relative to the remainder of the surgical frame 300.

The surgical frame 300 can be configured such that operation of the first and second translation mechanism 340 and 342 can be controlled by an operator such as a surgeon and/or a surgical assistant. As such, movement of the translating beam 302 can be effectuated by controlled automation. Furthermore, the surgical frame 300 can be configured such that movement of the translating beam 302 automatically coincides with the rotation of the offset main beam 12. By tying the position of the translating beam 302 to the rotational position of the offset main beam 12, the center of gravity of the surgical frame 300 can be maintained in positions advantageous to the stability thereof.

During use of the surgical frame 300, access to the patient receiving area A and the patient P can be increased or decreased by moving the translating beam 302 between the lateral sides $L_1$ and $L_2$ of the surgical frame 300. Affording greater access to the patient receiving area A facilitates transfer of the patient P between the surgical table/gurney and the surgical frame 300. Furthermore, affording greater access to the patient P facilitates ease of access by a surgeon and/or a surgical assistant to the surgical site on the patient P.

Figure 28:
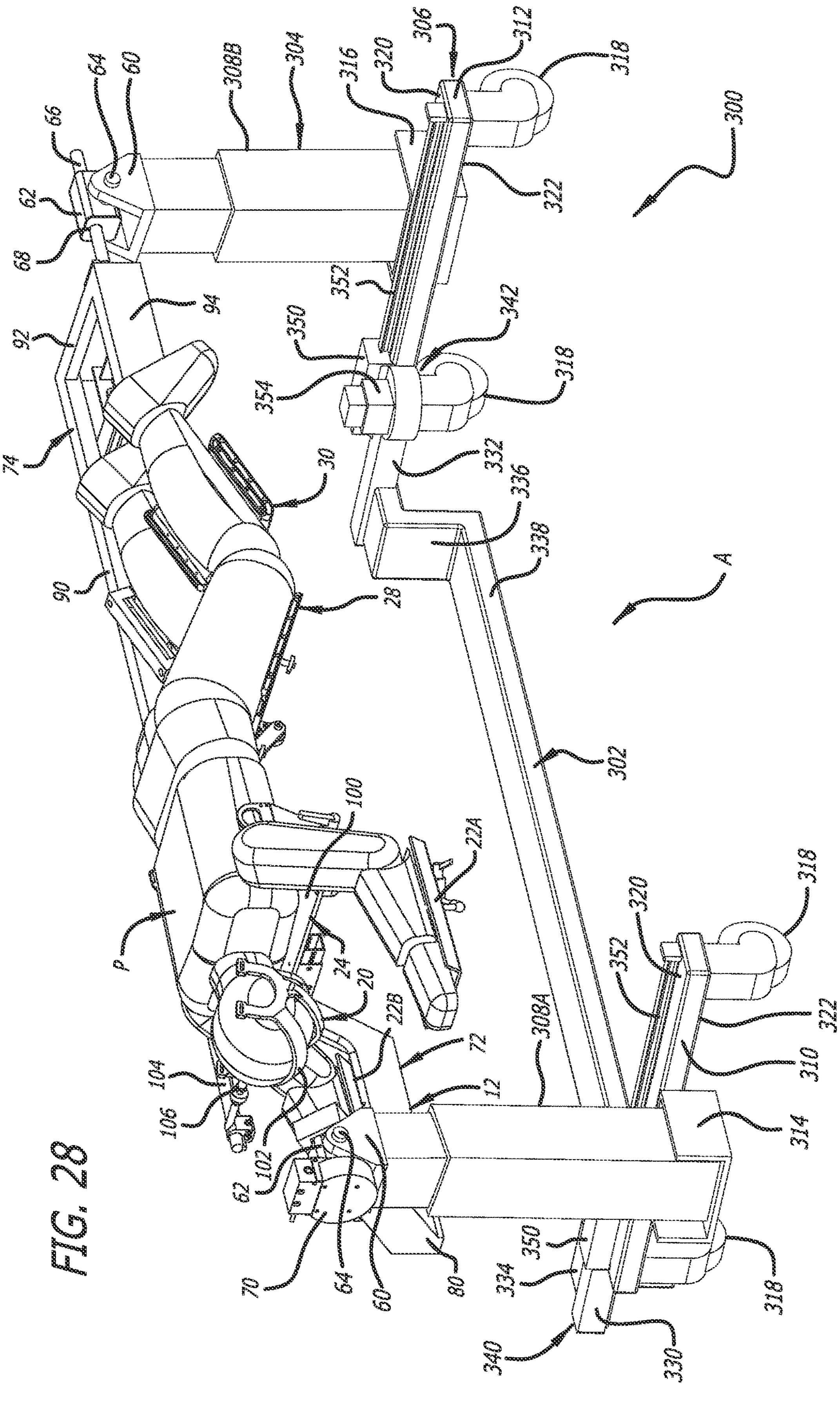
FIG. 28 is another top perspective view that illustrates the surgical frame of FIG. 27 with the patient in a prone position showing the translating beam thereof in a second position.
Figure 29:
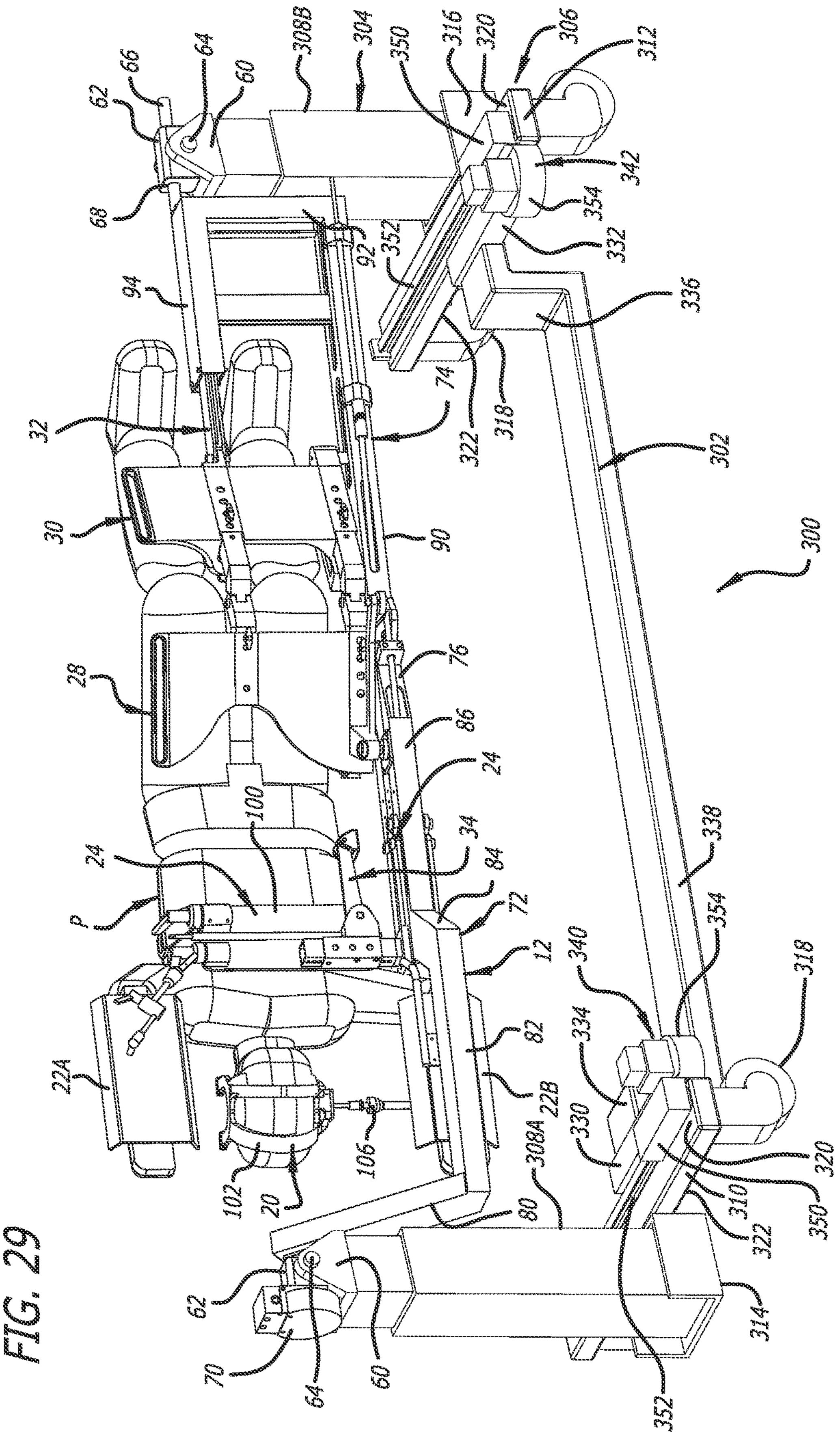
FIG. 29 is yet another top perspective view that illustrates the surgical frame of FIG. 27 with the patient in a lateral position showing the translating beam thereof in a third position.
Figure 30:
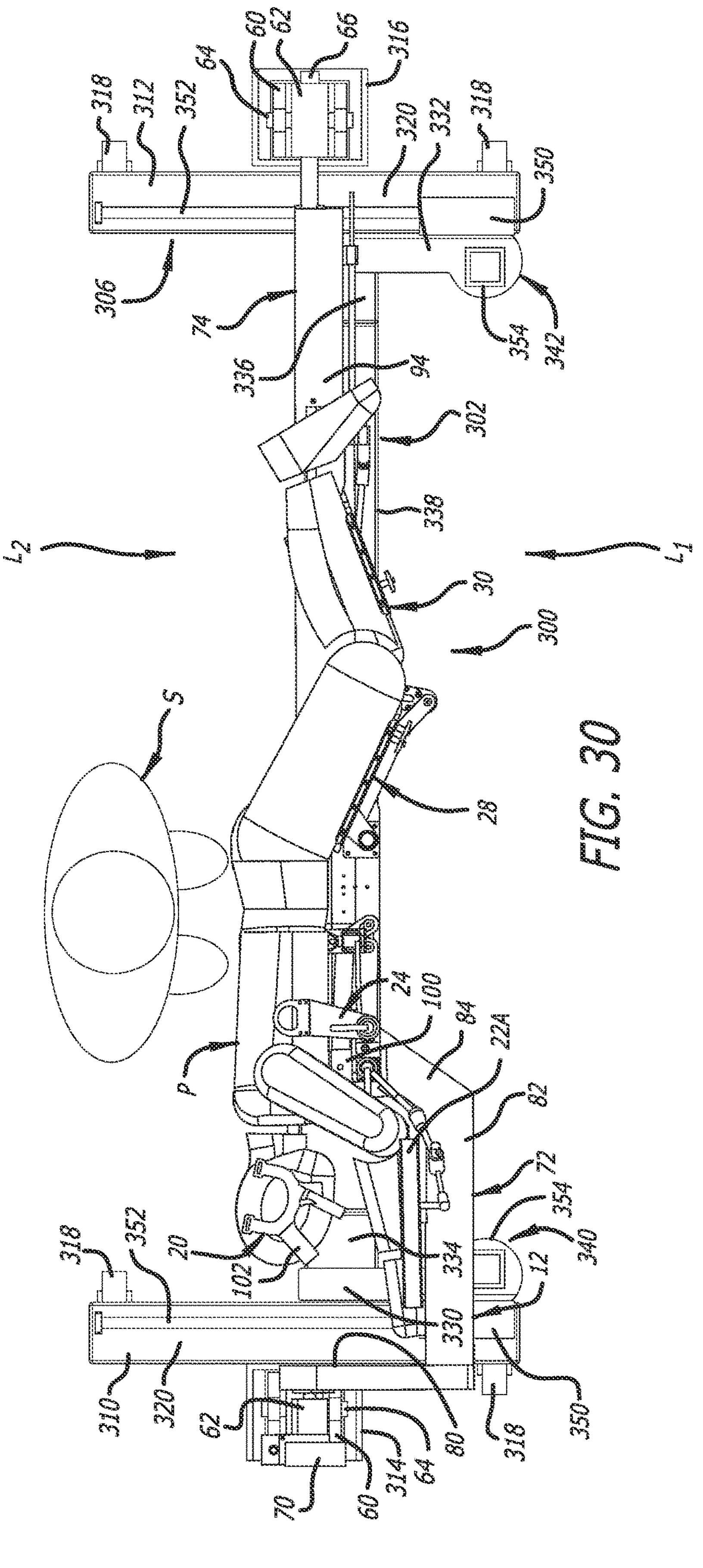
FIG. 30 is top plan view that illustrates the surgical frame of FIG. 27 with the patient in a lateral position showing the translating beam thereof in the third position.

The translating beam 302 is moveable using the first and second translation mechanisms 340 and 342 between a first terminal position (FIG. 28) and a second terminal position (FIGS. 29 and 30). The translating beam 302 is positionable at various positions (FIG. 27) between the first and second terminal positions. When the translating beam 302 is in the first terminal position, as depicted in FIG. 28, the translating beam 302 and its cross member 338 are positioned on the lateral side $L_1$ of the surgical frame 300. Furthermore, when the translating beam 302 is in the second terminal position, as depicted in FIGS. 29 and 30, the translating beam 302 and its cross member 338 are positioned in the middle of the surgical frame 300.

With the translating beam 302 and its cross member 338 moved to be positioned at the lateral side $L_1$, the surgical table/gurney and the patient P positioned thereon can be positioned under the offset main beam 12 in the patient receiving area A to facilitate transfer of the patient P to or from the offset main beam 12. As such, the position of the translating beam 302 at the lateral side $L_1$ enlarges the patient receiving area A so that the surgical table/gurney can be received therein to allow such transfer to or from the offset main beam 12.

Furthermore, with the translating beam 302 and its cross member 338 moved to be in the middle of the surgical frame 300 (FIGS. 29 and 30), a surgeon and/or a surgical assistant can have access to the patient P from either of the lateral sides $L_1$ or $L_2$. As such, the position of the translating beam 302 in the middle of the surgical frame 300 allows a surgeon and/or a surgical assistant to get close to the patient P supported by the surgical frame 300. As depicted in FIG. 30, for example, a surgeon and/or a surgical assistant can get close to the patient P from the lateral side $L_2$ without interference from the translating beam 302 and its cross member 338. The position of the translating beam 302 can be selected to accommodate access by both a surgeon and/or a surgical assistant by avoiding contact thereof with the feet and legs of a surgeon and/or a surgical assistant.

The position of the translating beam 302 and its cross member 338 can also be changed according to the rotational position of the offset main beam 12. To illustrate, the offset main beam 12 can be rotated a full 360° before, during, and even after surgery to facilitate various positions of the patient to afford various surgical pathways to the patient's spine depending on the surgery to be performed. For example, the offset main beam 12 can be positioned by the surgical frame 300 to place the patient P in a prone position (e.g., FIGS. 27 and 28), lateral positions (e.g., FIGS. 29 and 30), and in a position 45° between the prone and lateral positions. The translating beam 302 can be positioned to accommodate the rotational position of the offset main beam 12 to aid in the stability of the surgical frame 300. For example, when the patient P is in the prone position, the translating beam 302 can preferably be moved to the center of the surgical frame 300 underneath the patient P. Furthermore, when the patient P is in one of the lateral positions, the translating beam 302 can be moved toward one of the corresponding lateral sides $L_1$ and $L_2$ of the surgical frame 300 to position underneath the patient P. Such positioning of the translating beam 302 can serve to increase the stability of the surgical frame 300.

A surgical frame 400 including a vest/harness 402 and a lift 404 incorporating the vest/harness 402 in accordance with embodiments of the present disclosure are described hereinbelow. The surgical frame 400 can incorporate the features of the above-discussed surgical frames, and the lift 404 and the vest/harness 402 can also be incorporated in the above-discussed surgical frames. As discussed below, the operation of the lift 404 can be done via manual adjustment or via controlled automation of the componentry thereof.

Like the surgical frames 10 and 300, the surgical frame 400 can serve as an exoskeleton to support the body of the patient P as the patient's body is manipulated thereby. In doing so, the surgical frame 400 serves to support the patient P such that the patient's spine does not experience unnecessary stress/torsion. As discussed below, the lift 404 and the vest/harness 402 are used in transferring the patient P to the surgical frame 400.

Figure 32:
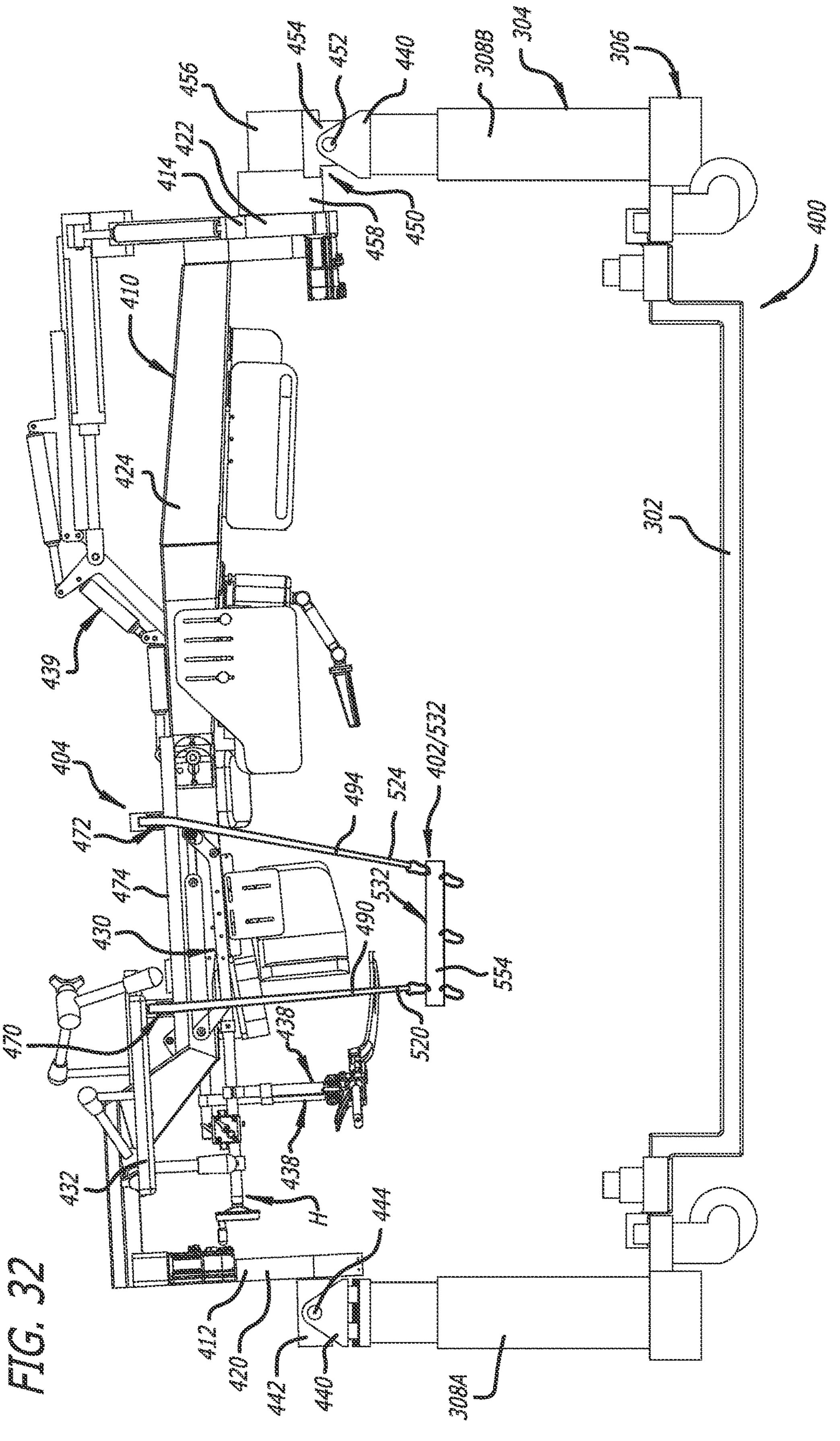
FIG. 32 is a side elevational view that illustrates a surgical frame and additional portions of the first embodiment of the lift of the present disclosure incorporated into the surgical frame.
Figure 33:
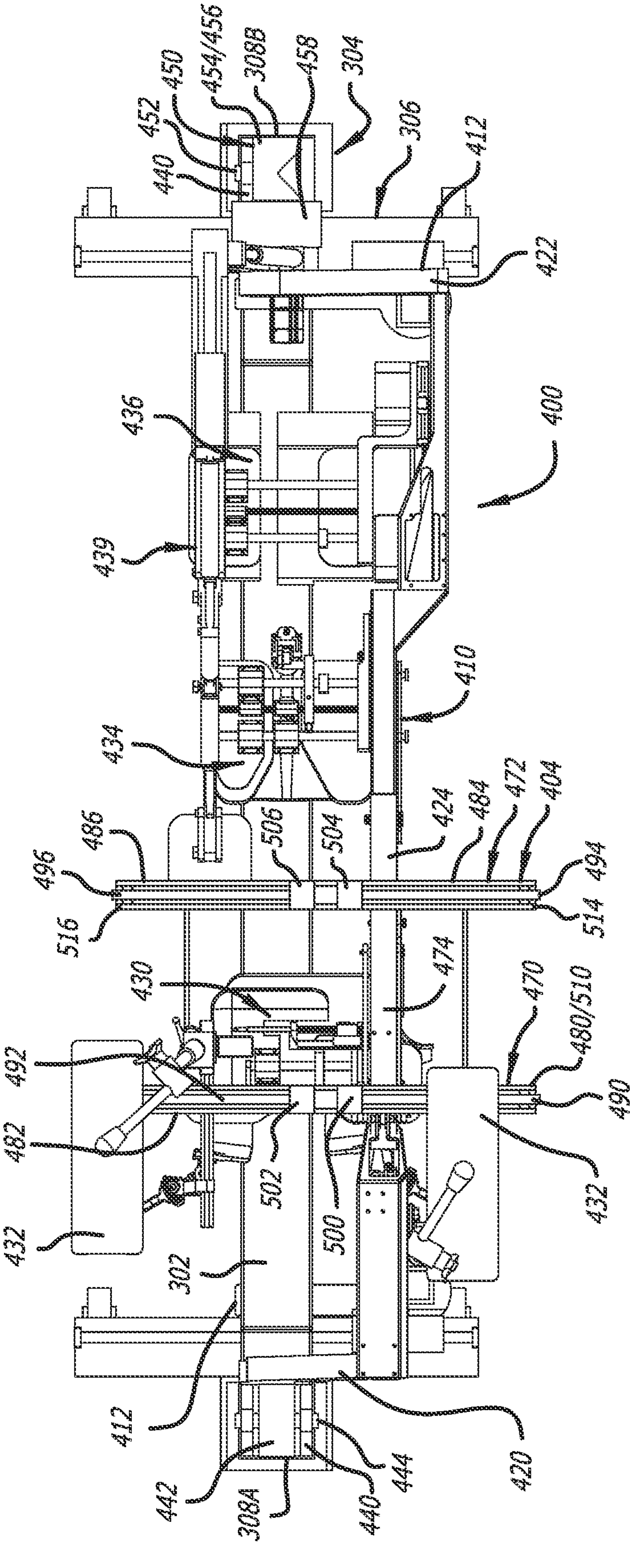
FIG. 33 is a top plan view that that illustrates the surgical frame and the portions of the lift of FIG. 32.

Like the surgical frame 300, the surgical frame 400, as depicted in FIGS. 32 and 33, includes a translating beam 302 (FIG. 32) and a support structure 304 having a support platform 306 incorporating the translating beam 302. Besides the support platform 306, the support structure 304 can include a first vertical support portion 308A and a second vertical support portion 308B. The first vertical support portion 308A and the second vertical support portion 308B are capable of expansion and contraction.

As depicted in FIGS. 32-36, 39, and 41-45, the surgical frame 400 also incorporates a main beam 410 having a first end 412 attached relative to the first support portion 308A and a second end 414 attached relative to the second support portion 308B. The main beam 410 includes a first portion 420 at the first end 412, a second portion 422 at the second end 414, and a third portion 424 extending between the first portion 420 and the second portion 422. The main beam 410 is similar to the offset main beam 12, and, as discussed below, the main beam 410 can incorporate features associated with the offset main beam 12. To illustrate, the offset main beam 410, like the main beam 12, is used in supporting the patient P on the surgical frame 400 and includes various support components similar to those incorporated in the surgical frames 10 and 300. For example, the main beam 410 can incorporate a head support H, a chest support 430, arm supports 432, an upper leg support 434, a lower leg support 436, shoulder hold-downs 438, and pelvic support 439. Furthermore, rather than the head support H described herein, the surgical frame 400 can incorporate componentry similar to and that functions in a similar manner as those described in U.S. Ser. Nos. 15/239,256 and 15/638,802 to hold the patient's head in position, the shoulder hold-downs 438 can be similar to and function in a similar manner as those described in U.S. Ser. Nos. 16/395,821 and 16/513,422 to hold the patient's torso in position, and the pelvic support 439 can be similar to and function in a similar manner as those described in U.S. Ser. Nos. 16/395,734 and 16/395,903.

An operator such as a surgeon can control actuation of the various support components to manipulate the position of the patient's body. After the patient P is transferred to the surgical frame 400, soft straps (not shown) can be used with these various support components to secure the patient P to the frame and to enable either manipulation or fixation of the patient P. Furthermore, reusable soft pads can be used on the load-bearing areas of the various support components. Additionally, the main beam 410 can be rotated a full 360° before, during, and even after surgery to facilitate various positions of the patient P to afford various surgical pathways to the patient's spine depending on the surgery to be performed. For example, the main beam 410 can be positioned by the surgical frame 400 to place the patient P in a prone position, left and right lateral positions, and in positions 45° between the prone and lateral positions to facilitate access to desired surgical pathways to the patient's lumbar spine.

The surgical frame 400 can be used to facilitate access to different parts of the spine of the patient P. In particular, the surgical frame 400 can be used to facilitate access to portions of the patient's lumbar spine. To illustrate, the patient P is simultaneously supported by the head support H, the chest support 430, the upper leg support 434, the lower leg support 436, and the should hold-downs 438 on the main beam 410, and uninterrupted access is provided to portions of the patient's lumbar spine by the positions of the chest support 430 and/or the upper leg support 434.

The main beam 410 is moveably attached relative to the first vertical support portion 308A and the second vertical support portion 308B. Like those of the surgical frames 10 and 300, the first vertical support portion 308A and the second vertical support portion 308B of the surgical frame 400 each include a clevis 440 supporting componentry facilitating rotation of the main beam 410.

In addition to the clevis 440, the first vertical support 308A includes a support block portion 442, a pin portion 444 pivotally attaching the support block portion 442 to the clevis 440, and an axle portion (not shown) rotatably supported by the support block portion 442 and interconnected to the main beam 410. The support block portion 442, via interaction of the pin portion 444 with the clevis 440, is capable of pivotal movement relative to the clevis 440 to accommodate different heights for the first vertical support portion 308A and the second vertical support portion 308B. And the main beam 410, via interaction of the axle portion with the support block portion 442, is capable of rotational movement relative to the support block portion 442 to accommodate rotation of the patient P supported by the main beam 410.

Furthermore, in addition to the clevis 440, the second vertical support post 308B includes a coupler 450 and a pin portion 452 pivotally attaching the coupler 450 to the clevis 440. The coupler 450 includes a base portion 454 that is pinned to the clevis 440 with the pin portion 452, a body portion 456 that includes a transmission (not shown) and a motor (not shown) that drives the transmission in the body portion 456, and a head portion 458 that is rotatable with respect to the body portion 456 and driven rotationally by the transmission via the motor. The head portion 458 is interconnected with the main beam 410, and the head portion 460 (via the transmission and the motor) can rotate the main beam 410 a full 360° before, during, and even after surgery to facilitate various positions of the patient P.

The chest support 430 (to which the head support H, the arm supports 432, and the shoulder hold-downs 438 are attached relative thereto), the upper leg support 434, and the lower leg support 436 are attached to and/or incorporated into the third portion 424 of the main beam 410. Furthermore, the head support H, chest support 430, the arm supports 432, the upper leg support 434, the lower leg support 436, and the shoulder hold-downs 438 can be adjusted via manual adjustment and/or via controlled automation thereof to facilitate accommodation of differently-sized patients. Such adjustment can also be used to manipulate the patient P before, during, and even after surgery.

The lift 404, as depicted in FIGS. 32-36, can include a first arm portion 470 and a second arm portion 472 attached to the third portion 424 of the main beam 410. As depicted in FIGS. 32-36, the third portion 424 includes a support surface 474, and the first arm portion 470 and the second arm portion 472 each can be attached relative to the support surface 474. The spacing between the first arm portion 470 and the second arm portion 472 can be varied and adjustable along the support surface 474. To illustrate, a track (not shown) can be provided on the support surface 474 that affords positioning and repositioning of the first arm portion 470 and the second arm portion 472 with respect to one another.

A first support bracket (not shown) and a second support bracket (not shown) can be attached to the support surface 474 to facilitate attachment of the first arm portion 470 and the second arm portion 472, respectively, to the third portion 424. The first support bracket can be configured to engage a track (not shown) formed in the first arm portion 470, and the second support bracket can be configured to engage a track (not shown) formed in the second arm portion 472. The engagement of the first support bracket and the second support bracket with the respective tracks can afford adjustment of the first arm portion 470 and the second arm portion 472 with respect to the third portion 424 of the main beam 410. To illustrate, via engagement of the respective tracks, first support bracket and the second support bracket, the first arm portion 470 and the second arm portion 472 can be positioned and repositioned in directions transverse to the length of the third portion 424 of the main beam 410. A first locking mechanism (not shown) and a second locking mechanism (not shown) can be used to maintain the positions of the first arm portion 470 and the second arm portion 472 relative to the third portion 424.

As depicted in FIG. 33, the first arm portion 470 includes a first portion 480 on a first side of the third portion 424 and a second portion 482 on a second side of the third portion 434, and the second arm portion 472 includes a third portion 484 on the first side of the third portion 424 and a fourth portion 486 on the second side of the third portion 424. Depending on the positions of the first arm portion 470 and the second arm 472 relative to the third portion 424, the lengths of the first portion 480, the second portion 482, the third portion 484, and the fourth portion 486 can vary. In addition or as an alternative to the adjustment of the first arm portion 470 and the second arm portion 472 relative to the third portion 424, the first portion 480, the second portion 482, the third portion 484, and/or the fourth portion 486 can each include telescoping portions (not shown) that can be used to increase or decrease the lengths thereof.

As depicted in FIG. 33, the first portion 480 is cantilevered on the first side of the third portion 424, and the second portion 482 is cantilevered on the second side of the third portion 424. Furthermore, as depicted in FIG. 33, the third portion 484 is cantilevered on the first side of the third portion 424, and the fourth portion 486 is cantilevered on the second side of the third portion 424. The cantilevers formed by the first portion 480, the second portion 482, the third portion 484, and the fourth portion 486 afford spacing of hanging portions of a first flexible connector 490, a second flexible connector 492, a third flexible connector 494, and a fourth flexible connector 496, respectively, used in the lift 404 away from the third portion 424 of the main beam 410. Although straps are used as flexible connectors in the accompanying figures, cables, cords, ropes, etc. can also be used.

Figure 34:
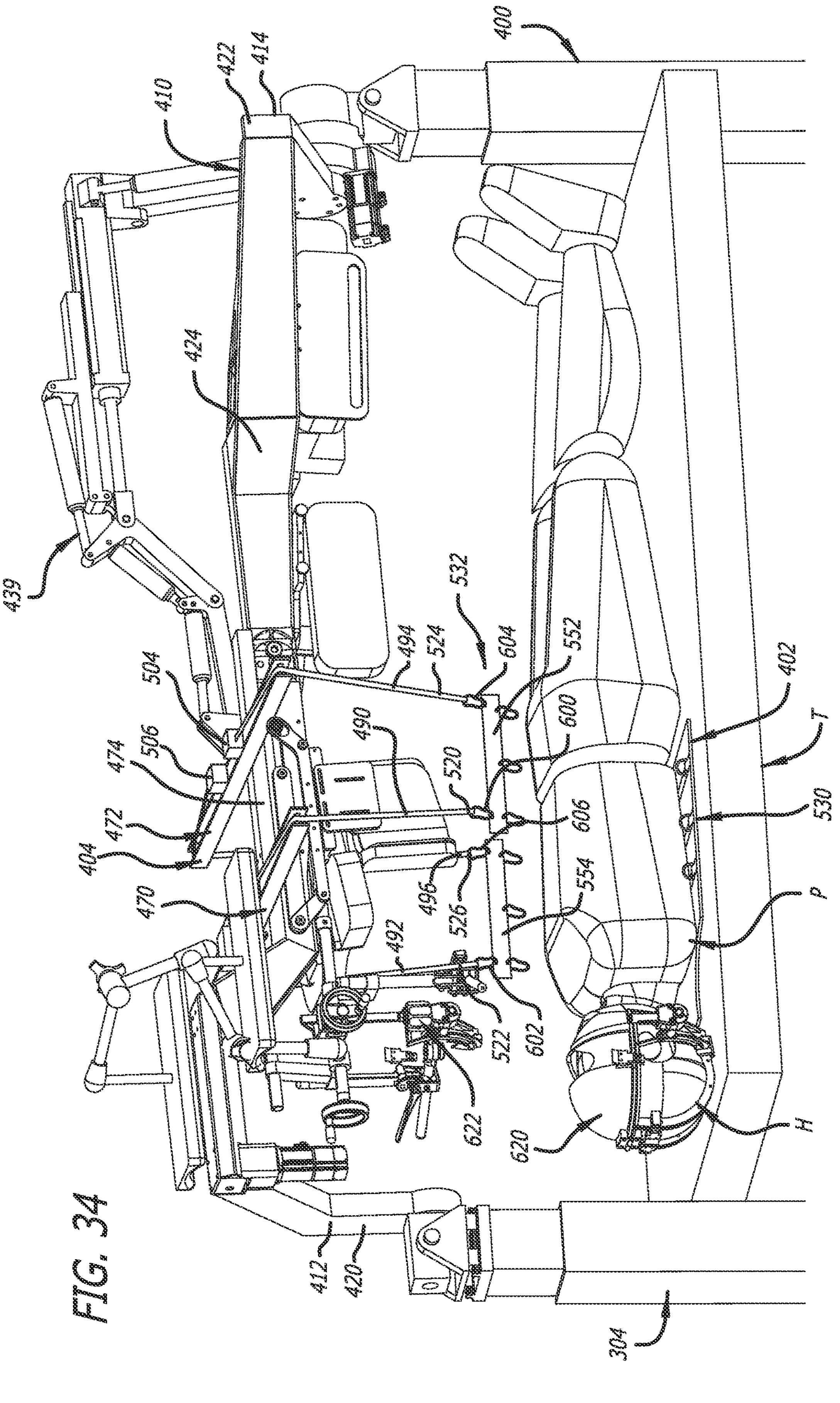
FIG. 34 is a side perspective view that illustrates a patient laying in a supine position on top of a portion of the vest/harness that is received on a surgical table/gurney with that patient positioned by the surgical table/gurney relative to the surgical frame and the portions of the lift of FIG. 32, and illustrates a first embodiment of a head support of the present disclosure including portions incorporated into the surgical frame and received on the head of the patient.

The first strap 490, the second strap 492, the third strap 494, and the fourth strap 496 are used in moving the vest/harness 402 relative to the third portion 424 of the main beam 410. To increase (or extend) and decrease (or retract) the lengths of the first strap 490, the second strap 492, the third strap 494, and the fourth strap 496, various lifting devices such as, for example, winches can be used in the lift 404. To illustrate, as depicted in FIGS. 33 and 34, a first lifting device (such as a winch) 500 can be used in manipulating the first strap 490 such that the first strap 490 can be wound and unwound from the first winch 500 to respectively increase and decrease the length thereof; a second lifting device (such as a winch) 502 can be used in manipulating the second strap 492 such that the second strap 492 can be wound and unwound from the second winch 502 to respectively increase and decrease the length thereof; a third lifting device (such as a winch) 504 can be used in manipulating the third strap 494 such that the third strap 494 can be wound and unwound from the third winch 504 to respectively increase and decrease the length thereof; and a fourth lifting device (such as a winch) 506 can be used in manipulating the fourth strap 496 such that the fourth strap 496 can be wound and unwound from the fourth winch 506 to respectively increase and decrease the length thereof.

The first winch 500, the second winch 502, the third winch 504, and the fourth winch 506 can be actuatable via manual adjustment and/or controlled automation. Furthermore, ends 510, 512, 514, and 516 of the first portion 480, the second portion 482, the third portion 484, and the fourth portion 486, respectively, can include pulleys used in limiting friction between the ends 510, 512, 514, and 516 and the first straps 490, the second strap 492, the third strap 494, and the fourth strap 496 as the lengths thereof are increased and decreased. And ends 520, 522, 524, and 526 of the first strap 490, the second strap 492, the third strap 494, and the fourth strap 496, respectively, can include hooks and/or shackles (or other attachment brackets) used in facilitating engagement with the vest/harness 402.

As depicted in FIGS. 31 and 34-36, the vest/harness 402 includes a vest portion 530 and a harness portion 532. The vest portion 530 is shown in a flattened configuration in FIGS. 31, 34-37, and 39, but such a configuration is for illustrative purposes. The vest portion 530 can be flexible and/or malleable to conform to portions of the patient's torso as depicted, for example, in FIG. 43). Furthermore, in FIGS.

34-37, the arms of the patient P are removed for illustrative purposes in order to depict the vest/harness portion 402. The vest portion 530 includes a body portion 534 for engaging a posterior portion of the torso of the patient P. The body portion 534 includes a first side 535A and an opposite second side 535B, and the body portion 534 can have different larger and smaller sizes to accommodate differently-sized patients. The body portion 534 can be made of a woven or non-woven natural or synthetic material in the form of cloth, fabric, or sheeting, and includes a cranial end 536, a caudal end 538, a first lateral side 540, and a second lateral side 542. As their names suggest, the cranial end 536 is ultimately positioned adjacent the patient's head, the caudal end 538 is ultimately positioned adjacent the patient's buttocks, the first lateral side 540 is ultimately positioned adjacent one lateral side of the patient's torso, and the second lateral side 542 is ultimately positioned adjacent the other lateral side of the patient's torso when the patient P is oriented on the body portion 534. As discussed below, the vest portion 530 can be positioned on a table/gurney T, and the patient P can be received on the first side 535A of the the body portion 534.

Figure 31:
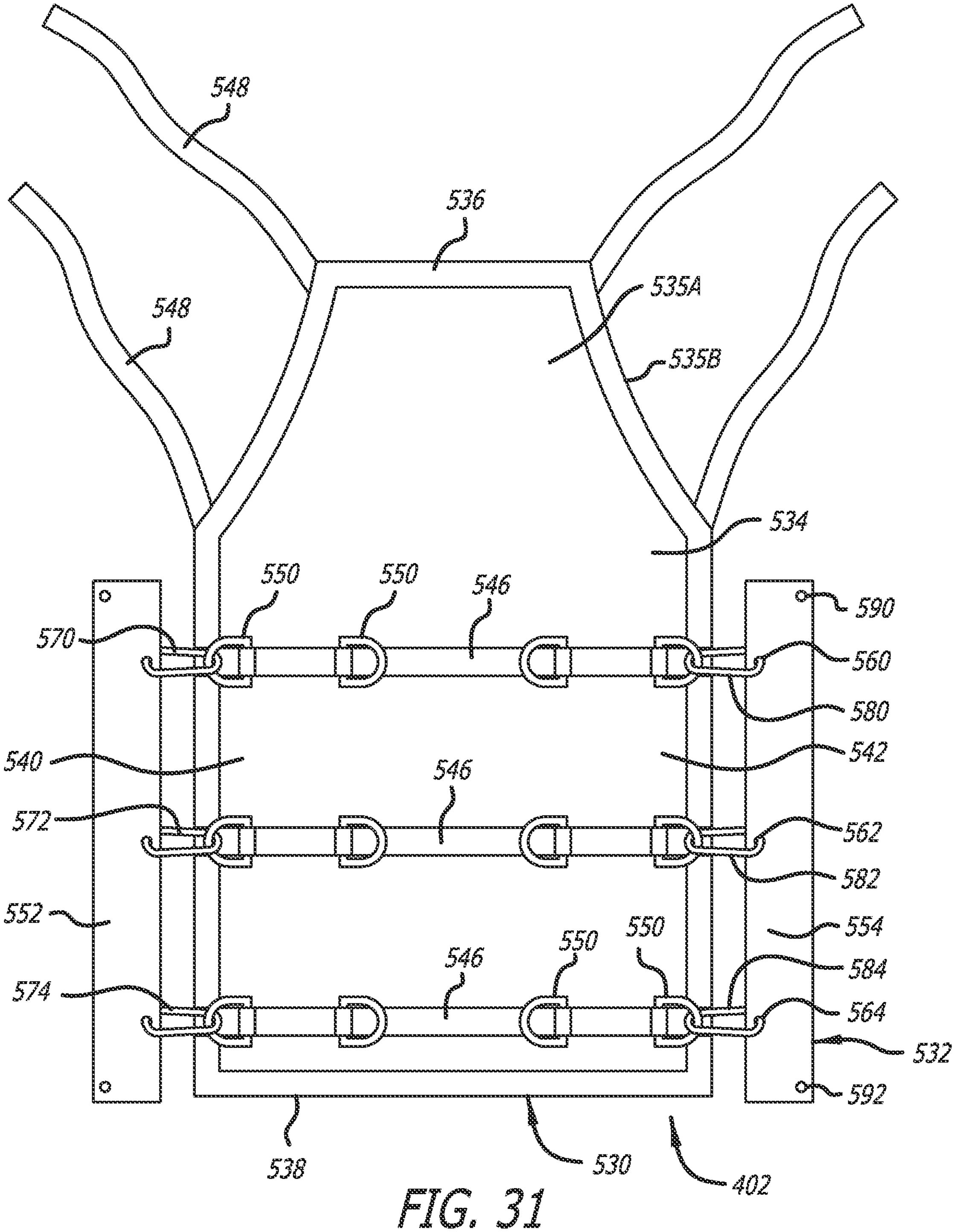
FIG. 31 is a top plan view that illustrates a vest/harness that is part of a first embodiment of a lift of the present disclosure.

As depicted in FIG. 31, the body portion 534 can include reinforcements in the form of reinforcement strips 544 around the perimeter of the body portion 534, and reinforcement ribs 546 across the first side 535A of the body portion 534. Additional reinforcement ribs 546 can also be positioned across the second side 535B of the body portion 534, and the reinforcement strips 544 and the reinforcement ribs 546, for example, can be sewn and/or adhesively attached to the body portion 534. The reinforcement strips 544 can be used for attaching straps 548 thereto, and the straps 548 can be used in securing the vest portion 530 to the patient P. To illustrate, two of the straps 548 can be provided adjacent each of the first lateral side 540 and the second lateral side 542, and each of these pairs of the straps 548 can be wrapped around a shoulder and an underarm of the patient P and tightened together to secure the body portion 534 to an upper portion of the patient's torso.

Furthermore, as depicted in FIG. 31, the reinforcement ribs 546 can be used in attaching various rings 550. Each of the reinforcement ribs 546 can be used in attaching one, two, or more of the rings 550 at each end of the reinforcement ribs 546.

That is, one ring or multiple rings 550 can be attached to the body portion 534 along each of the reinforcement ribs 546 along the first lateral side 540, and one ring or multiple rings 550 can be attached to the body portion 534 along each of the reinforcement ribs 546 along the second lateral side 542. The rings 550 can be attached to the body portion 534 in loops of material formed by the reinforcement ribs 546. Use of multiple rings 550 provided along each of the reinforcement ribs 546 along each of the first lateral side 540 and the second lateral side 542 can provide a multitude of attachment points used in attaching the vest portion 530 to the harness portion 532 in order to accommodate differently-sized patients.

In one preferred embodiment of the present disclosure, the vest portion 530 of the vest/harness 402 may be made of neoprene, such as that used in neoprene wetsuits. One advantage of using neoprene for the vest portion 530 may be to provide additional warmth to the patient during surgery. For example, a one-time use neoprene vest portion may be used with the patient P. The neoprene vest portion may have cutaway or tear way portions that are removable to permit surgical access to the patient P, while the remainder of the vest portion helps to maintain the body temperature of the patient P. While the terms vest or harness has been used herein, these terms are not to be construed as limiting the portions of the patient P covered thereby. The vest portion may be in the form of a short sleeved shirt providing partial coverage of the arms, a long sleeved shirt providing more complete arm coverage, or even more full body coverage, such as with a patient jumpsuit to assist with maintaining the body temperature of the patient P. These various vest portion embodiments may have seatbelt like material straps or other reinforcement material incorporated therein to assist with strengthening the vest portion and supporting the patient P during the lifting and lowering processes. In one preferred embodiment the vest portion (including, for example, the vest portion 530, the short-sleeve shirt vest portion, the long sleeve shirt vest portion, and the jumpsuit vest portion) may have pressure sensors incorporated therein to provide information related to patient safety in order to inhibit the patient P from experiencing unsafe forces during the lifting and lowering processes.

One preferred embodiment of the vest portion 530 also incorporates one of Velco, a zipper, or other single step action device such as use of magnets on each lateral side (i.e., the first lateral side 540 and the second lateral side 542) of the vest portion 530 to directly attach to the flexible connectors and/or the lifting devices of the lift 404, including, but not limited to, the first strap 490, the second strap 492, the third strap 494, and the fourth strap 496, the first winch 500, the second winch 502, the third winch 504, and/or the fourth winch 506. The flexible connectors and/or the lifting devices in this preferred embodiment would include cooperating/mating counterparts to the Velco, the zipper, or other single step action device such as the magnets to facilitate cooperative engagement of the vest portion 530 to permit lifting and lowering of the patient P. While a single step action device on each lateral side of the vest portion 530 is preferred, a plurality of Velco segments, zippers, magnets, or other devices for cooperative engagement may be used on each lateral side of the vest portion 530 if so desired. Moreover, while preferred devices have been described herein as having the vest portion 530 of the vest/harness 402 configured for attachment on the first lateral side 540 and the second lateral side 542 of the vest portion 530, it is contemplated that, if the vest portion 530 were enlarged to wrap around a larger portion of the patient P, the patient P could be lifted via attachment along the front centerline of the vest portion 530 via one of more lifting devices. In this embodiment, the flexible connectors, such as the first strap 490, the second strap 492, the third strap 494, and the fourth strap 496, would preferably be in a plane aligned generally parallel to the long axis of the table so as to lift and lower the patient P via the front centerline of the vest portion 530.

The harness portion 532 includes a first plate (or connecting) portion 552 and a second plate (or connecting) portion 554. The first plate portion 552 is ultimately attached to the vest portion 530 along the first lateral side 540 of the body portion 534, and the second plate portion 554 is ultimately attached to the vest portion 530 along the first lateral side 542 of the body portion 534. To that end, each of the first plate portion 552 and the second plate portion 554 includes a first aperture 560, a second aperture 562, and a third aperture 564, and one of multiple hooks and/or shackles (or other attachment brackets) is used to attach each of the first aperture 560, the second aperture 562, and the third aperture 564 to the rings 550. For example, as depicted in FIG. 31, a shackle in the form of a first carabiner 570 is used to attach the first aperture 560 of the first plate portion 552 to at least one of the rings 550, a shackle in the form of a second carabiner 572 is used to attach the second aperture 562 of the first plate portion 552 to at least one of the rings 550, and a shackle in the form of a third carabiner 574 is used to attach the third aperture 564 of the first plate portion 552 to at least one of the rings 550. Furthermore, as depicted in FIG. 31, a shackle in the form of a fourth carabiner 580 is used to attach the first aperture 560 of the second plate portion 554 to at least one of the rings 550, a shackle in the form of a fifth carabiner 582 is used to attach the second aperture 562 of the second plate portion 554 to at least one of the rings 550, and a shackle in the form of a sixth carabiner 584 is used to attach the third aperture 564 of the second plate portion 554 to at least one of the rings 550.

As depicted in FIG. 34, the first plate portion 552 is also attached to the first strap 490 and the third strap 494, and the second plate portion 554 is also attached to the second strap 492 and the fourth strap 496. To facilitate such attachment, each of the first plate portion 552 and the second plate portion 554 include a first aperture 590 and a second aperture 592, and hooks and/or shackles (or other attachment brackets) can be used to attach the first strap 490 and the third strap 494 to the first plate portion 552, and the second strap 492 and the fourth strap 496 to the second plate portion 554. To illustrate, a first hook 600, a second hook 602, a third hook 604, and a fourth hook 606 are provided, and each of the first hook 600, the second hook 602, the third hook 604, and the fourth hook 606 can be double-ended hooks with first ends facilitating attachment with the ends 520, 522, 524, and 526, and second ends facilitating attachment to the first plate portion 552 and the second plate portion 554. Loops formed at or adjacent the ends 520, 522, 524, and 526 can facilitate such attachment to the first strap 490, the second strap 492, the third strap 494, and the fourth strap 496, and the first apertures 590 and second apertures 592 can facilitate such attachment to the first plate portion 552 and the second plate portion 554. As such, the first hook 600 can be attached between the first strap 490 and the first aperture 590 of the first plate portion 552, the third hook 604 can be attached between the third strap 494 and the second aperture 592 of the first plate portion 552, the second hook 602 can be attached between the second strap 492 and the first aperture 590 of the second plate portion 554, and the fourth hook 606 can be attached between the fourth strap 496 and the second aperture 592 of the second plate portion 554.

Given the attachment of the first strap 490, the second strap 492, the third strap 494, and the fourth strap 496 to the vest portion 530 via the first plate portion 552 and the second plate portion 554 of the harness portion 532, the body portion 534 can be raised and lowered via actuation of the first winch 500, the second winch 502, the third winch 504, and the fourth winch 506. Thus, as discussed below, when the patient P is received on the body portion 534 received on the table/gurney T, the patient P can be lifted from the table/gurney T via actuation of the first winch 500, the second winch 502, the third winch 504, and the fourth winch 506, and in doing so, the patient P can be positioned to facilitate contact with the chest support 430, the upper leg support 434, and the lower leg support 436. That is, the lifting of the patient P using the lift 404 and the vest/harness 402 allows the patient P to be suspended relative to the main beam 410, and such suspension (via, if necessary, extension or retraction of the first strap 490, the second strap 492, the third strap 494, and/or the fourth strap 496) affords positioning or orienting the patient P with respect to the main beam 410 and the various support components supported by the main beam 410 before the patient P is brought into contact with such support components. As such, the patient P can be centered relative to the main beam 410 and the various support components so that the patient P can be brought into proper contact with the various support components during the lifting process. Thereafter, a connection can be effectuated with portions of the head support H, the arms of the patient P can be contacted with and attached to the arm supports 432, the legs of the patient can be contacted with and attached to the upper leg support 434 and the lower leg support 436, and the shoulder hold-downs 438 can be contacted with the shoulders of the patient P.

To initiate the process for transferring the patient P to the surgical frame 400, the body portion 534 of the vest portion 530 can be received on the table/gurney T, and the patient P can be positioned in the supine position on the surgical table/gurney T such that a posterior portion of the patient's torso is contacted to the first side 535A of the body portion 534. The size of the body portion 534 can be selected to accommodate the size of the patient P, and the pairs of the straps 548 adjacent the first lateral side 540 and the second lateral side 542 can be wrapped around a shoulder and an underarm of the patient P and tightened together to secure the body portion 534 to an upper portion of the patient's torso.

The surgical table/gurney T with the patient P positioned thereon can be positioned, as depicted in FIGS. 34, under the main beam 410 of the surgical frame 400. The main beam 410 can be raised/lowered, pivoted/tilted, and/or rotated to allow the table/gurney T to be positioned thereunder. Furthermore, the translating beam 302 can be moved to facilitate positioning of the table/gurney T under the main beam 410. As such, like the surgical frame 300, componentry of the surgical frame 400 can be moved to create the patient receiving area A, and the table/gurney T can be received in the patient receiving area A. After positioning the table/gurney T in the patient receiving area A, the main beam 410 can be raised/lowered, pivoted/tilted, and/or rotated to facilitate attachment of the first strap 490, the second strap 492, the third strap 494, and the fourth strap 496 to the vest portion 530. In doing so, the main beam 410 can be positioned such that the support surface 474 faces upwardly.

Figure 35:
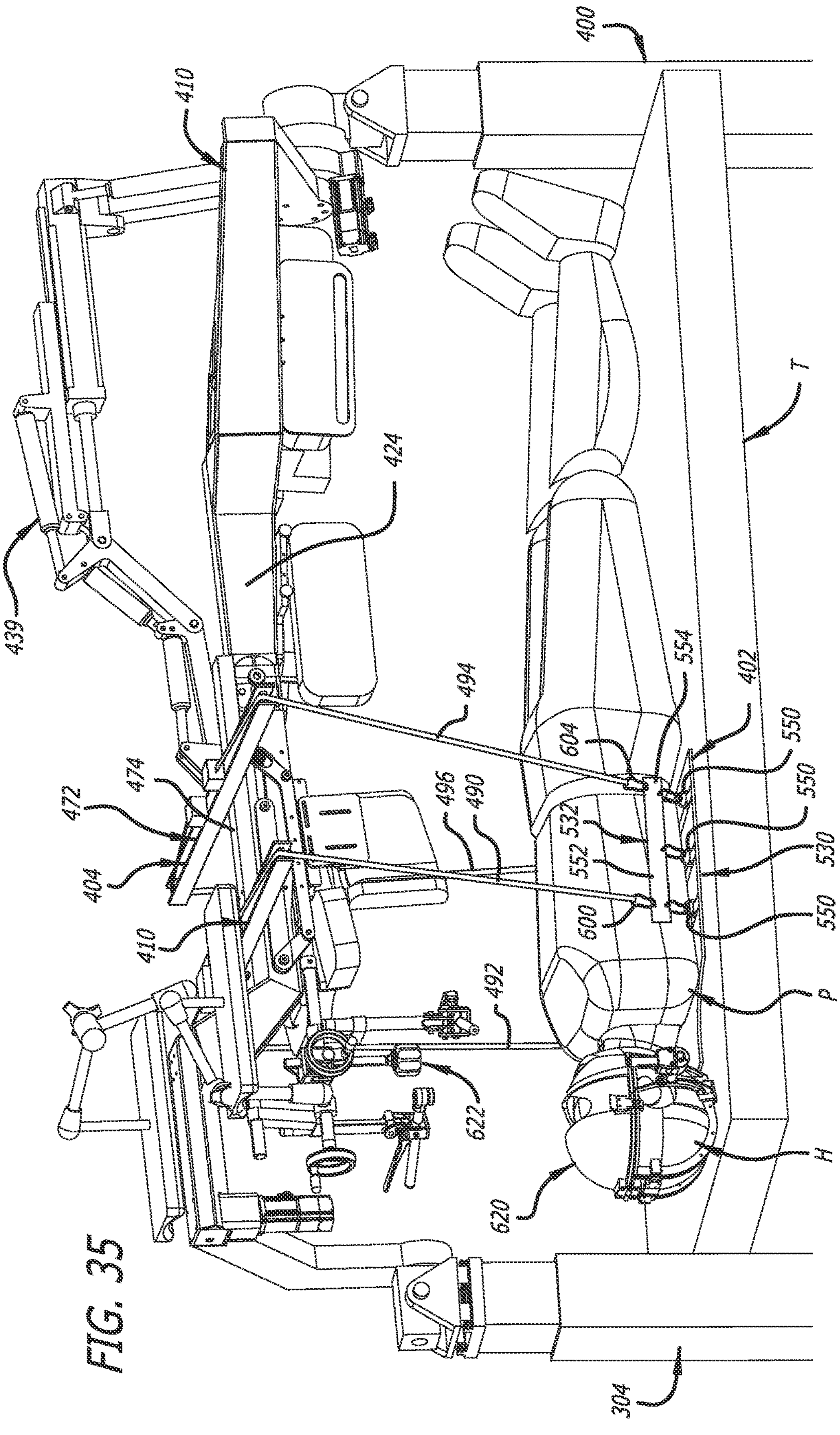
FIG. 35 is a side perspective view similar to FIG. 34 that illustrates straps of the lift attached to portions of the vest/harness.
Figure 36:
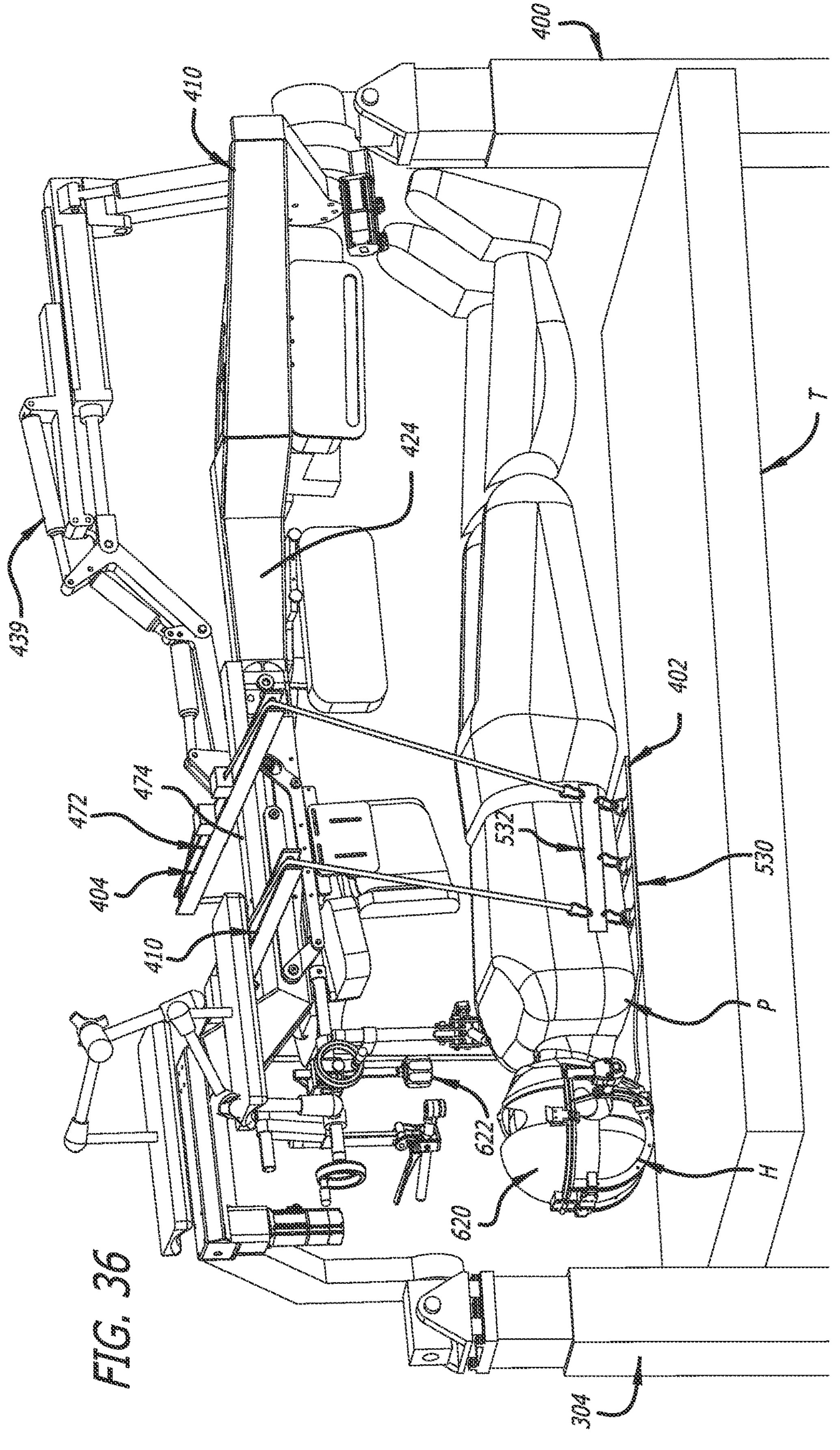
FIG. 36 is a side perspective view similar to FIGS. 34 and 35 that illustrates the patient being lifted from the surgical table/gurney using the lift.

With the patient P positioned under the main beam 410, as depicted in FIG. 35, the lengths of first strap 490, the second strap 492, the third strap 494, and the fourth strap 496, via actuation of the first winch 500, the second winch 502, the third winch 504, and the fourth winch 506, respectively, can be increased to lower the ends 520, 522, 524, and 526 toward the table/gurney T. Prior to or after the lowering of the ends 520, 522, 524, and 526, the harness portion 532 can be attached to the vest portion 530 using the first carabiner 570, the second carabiner 572, the third carabiner 574, and the fourth carabiner 580, the fifth carabiner 582, and the sixth carabiner 584. Furthermore, with the ends 520, 522, 524, and 526 positioned adjacent the harness portion 532, the first hook 600, the second hook 602, the third hook 604, and the fourth hook 606 can be used in attaching the first strap 490 and the third strap 494 to the first plate portion 552, and the second strap 492 and the fourth strap 496 to the second plate portion 554. After such attachment, the first winch 500, the second winch 502, the third winch 504, and the fourth winch 506, as depicted in FIG. 36, can be actuated to decrease the lengths of the first strap 490, the second strap 492, the third strap 494, and the fourth strap 496 to lift the vest portion 530 and the patient P toward the main beam 410.

Figure 39:
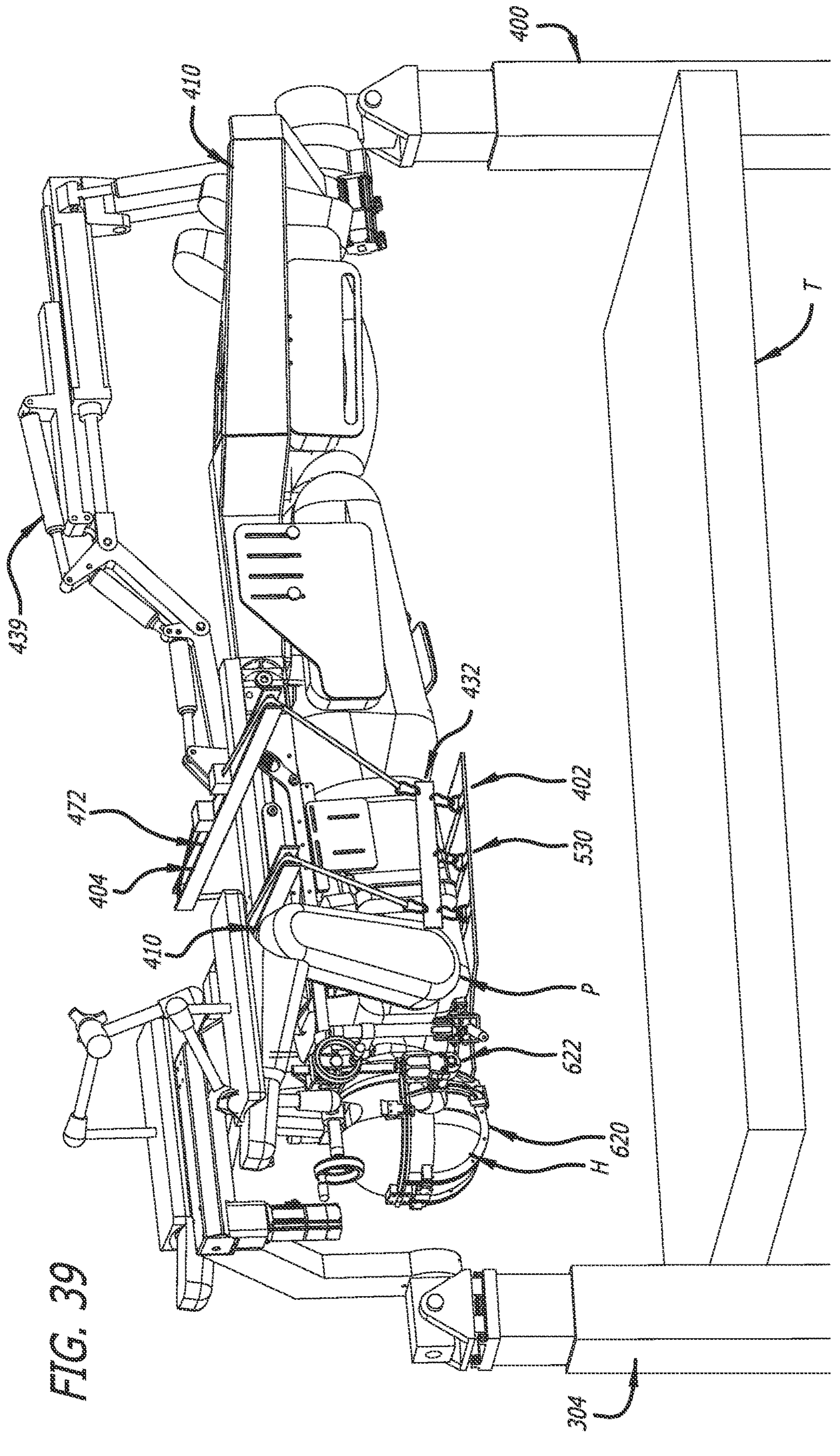
FIG. 39 is a side perspective view similar to FIGS. 34, 35, and 36 that illustrates the patient contacted to various support components of the surgical frame after the patient is lifted into position relative to and supported by the surgical frame, and illustrates the portions of the head support of FIG. 34 attached to one another.
Figure 40:
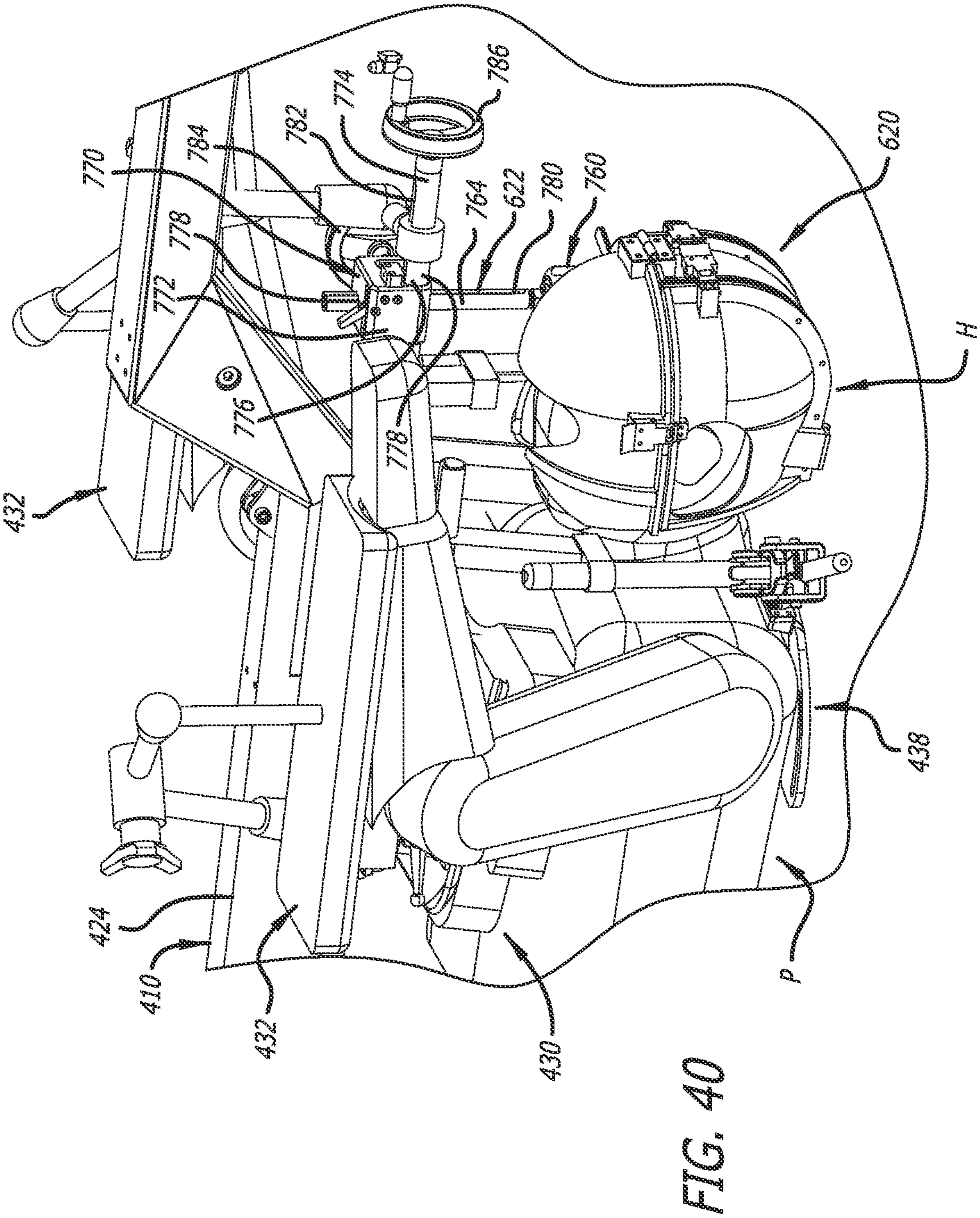
FIG. 40 is an enlarged side perspective view that illustrates the portions of the head support of FIG. 34 attached relative to one another after the patient is lifted into position relative to the surgical frame.
Figure 41:
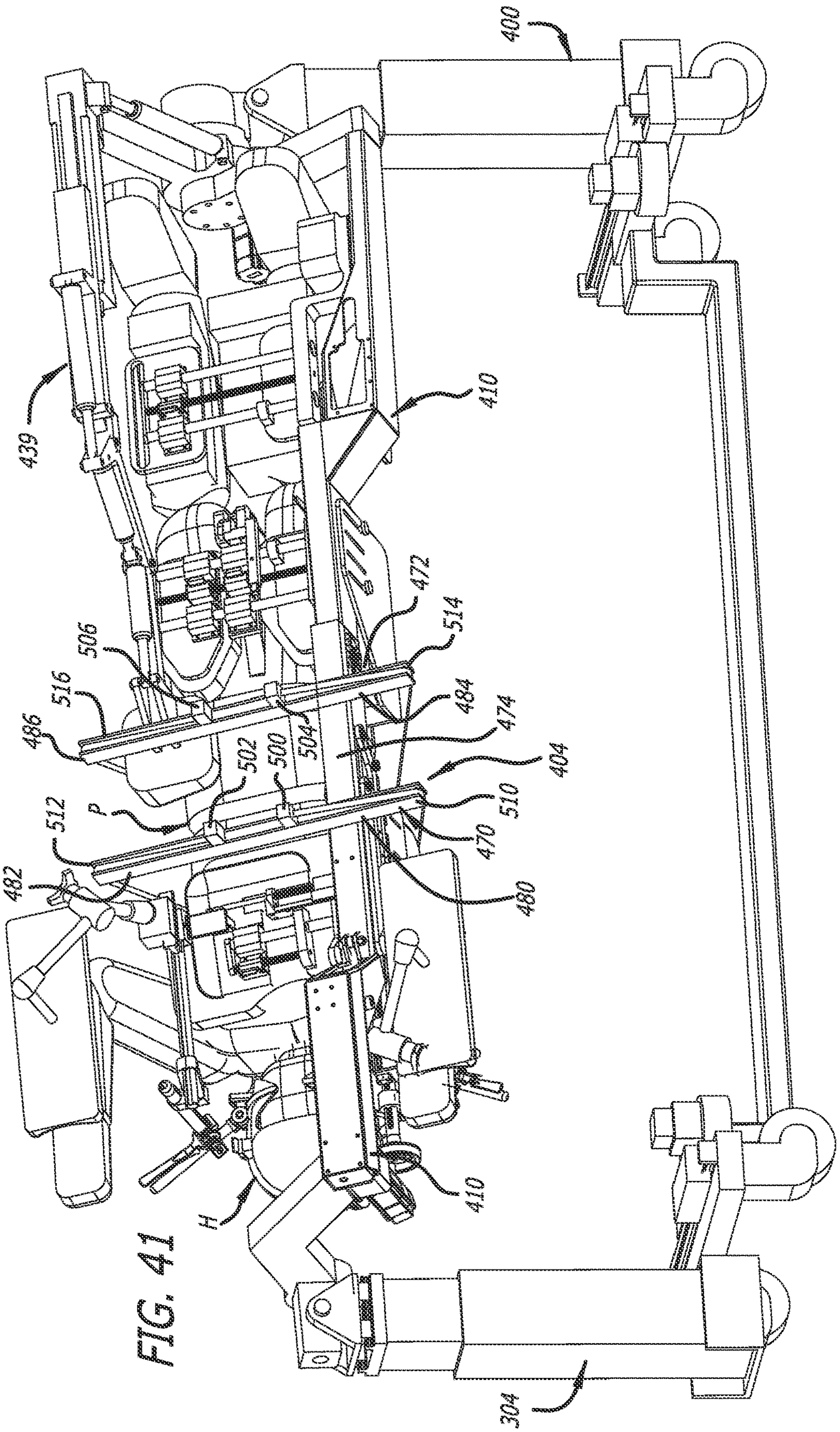
FIG. 41 is a side perspective view that illustrates the surgical frame of FIG. 32 with the patient supported thereon being rotated in order to position the patient into a lateral position and/or a prone position.
Figure 42:
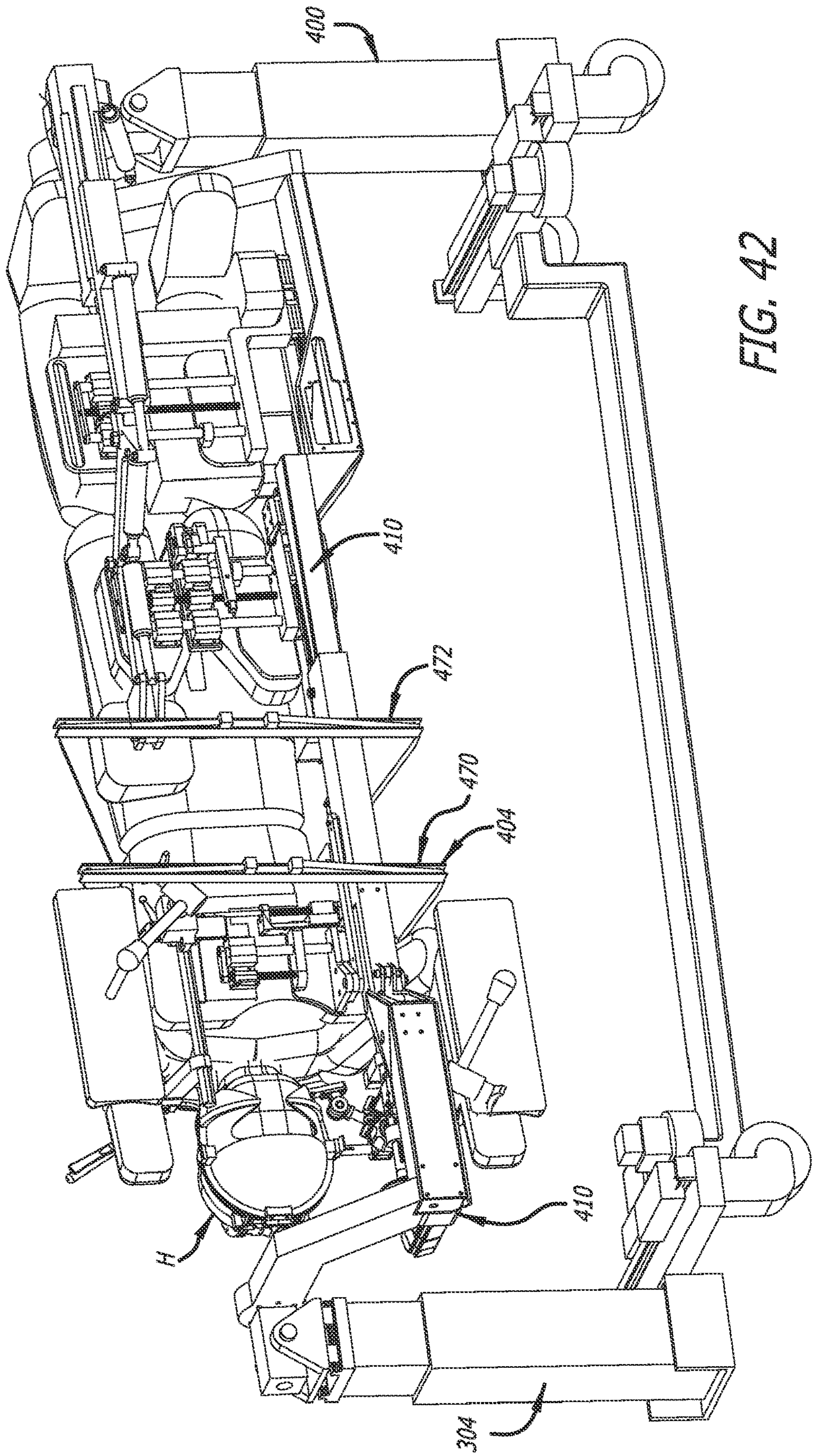
FIG. 42 is a side perspective view that illustrates the surgical frame of FIG. 32 with the patient supported thereon in the lateral position.
Figure 43:
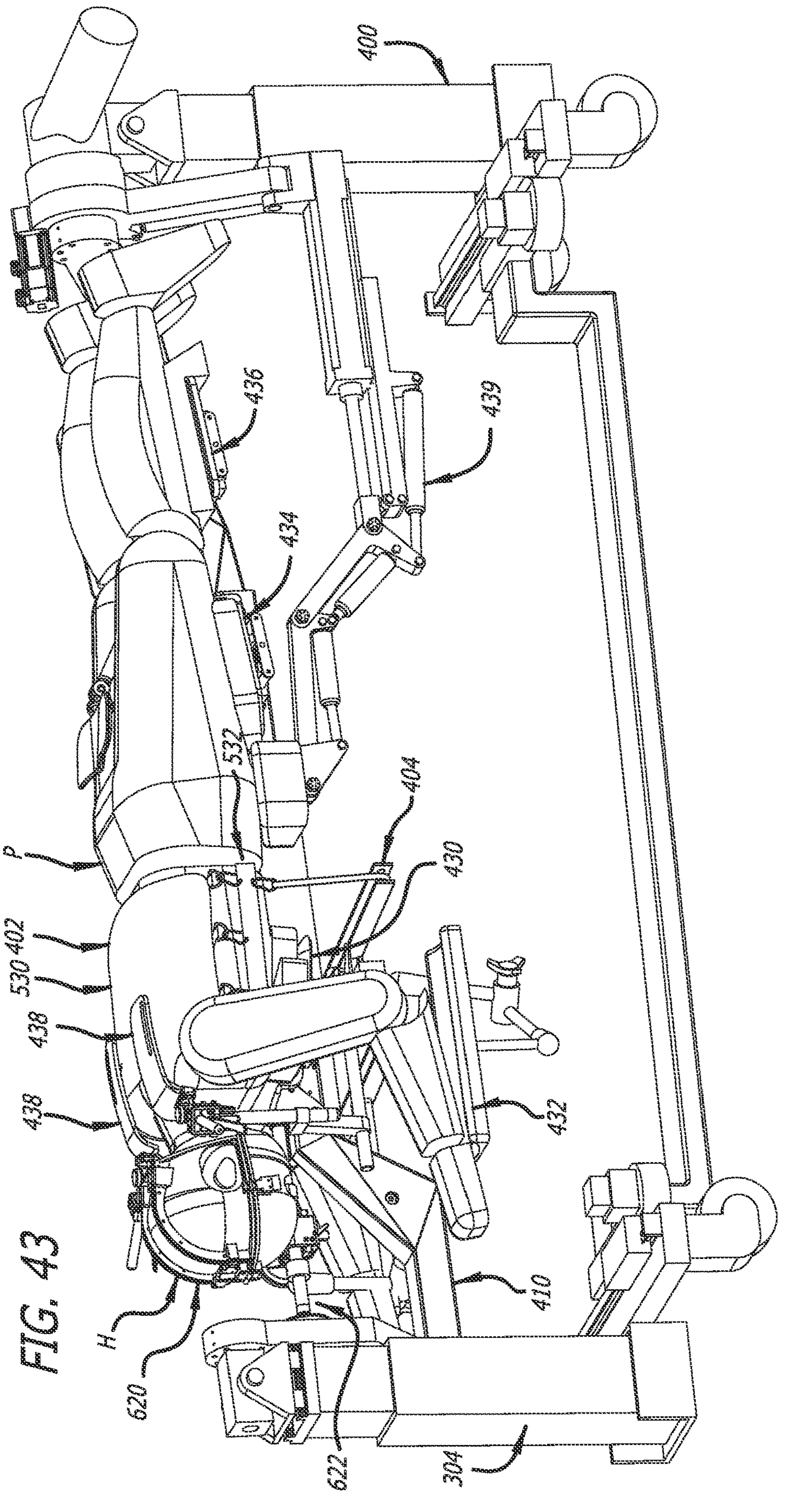
FIG. 43 is a side perspective view that illustrates the surgical frame of FIG. 32 with the patient supported thereon in the prone position.
Figure 44:
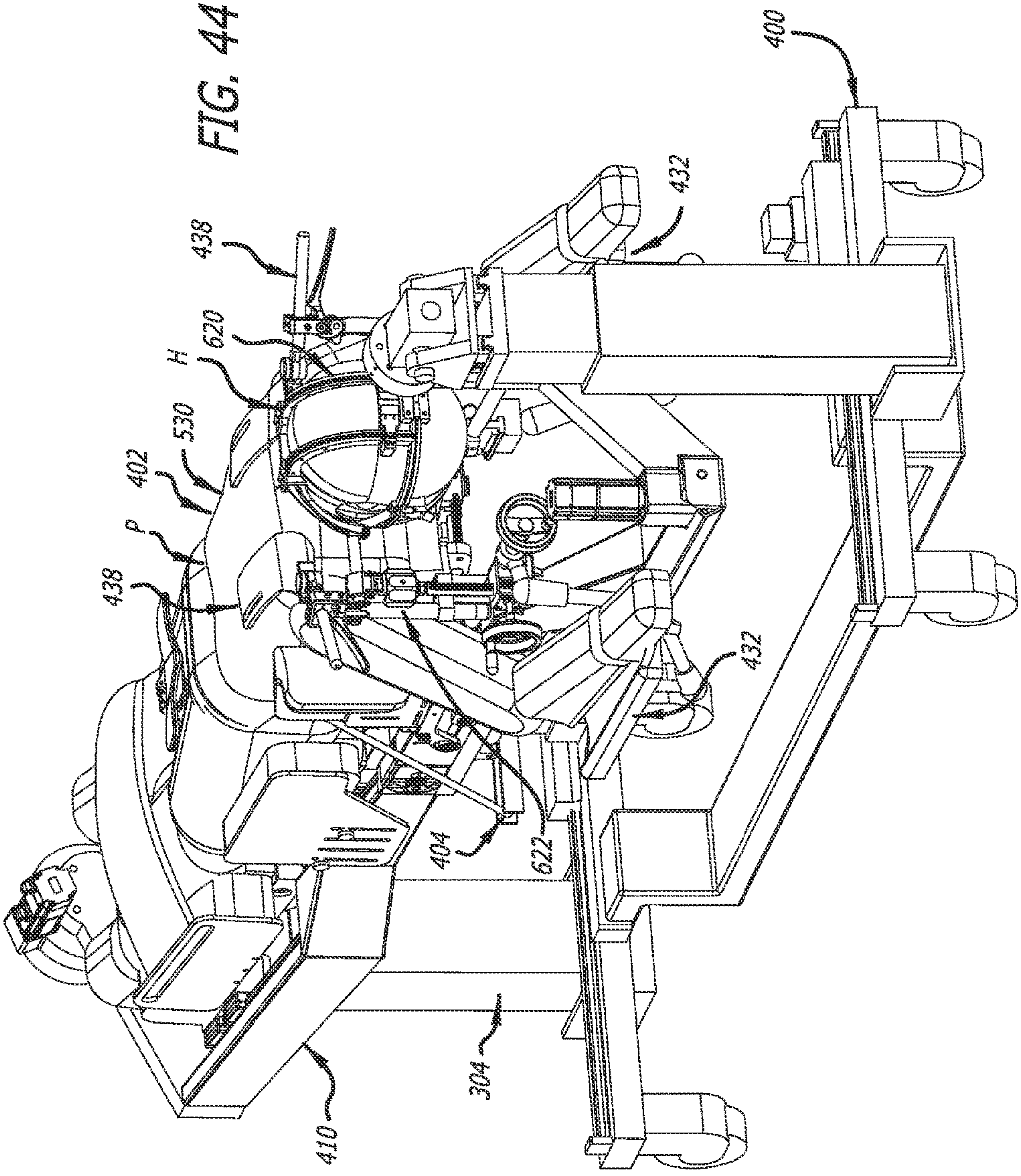
FIG. 44 is an end perspective view that illustrates the surgical frame of FIG. 32 with the patient supported thereon in the prone position.
Figure 45:
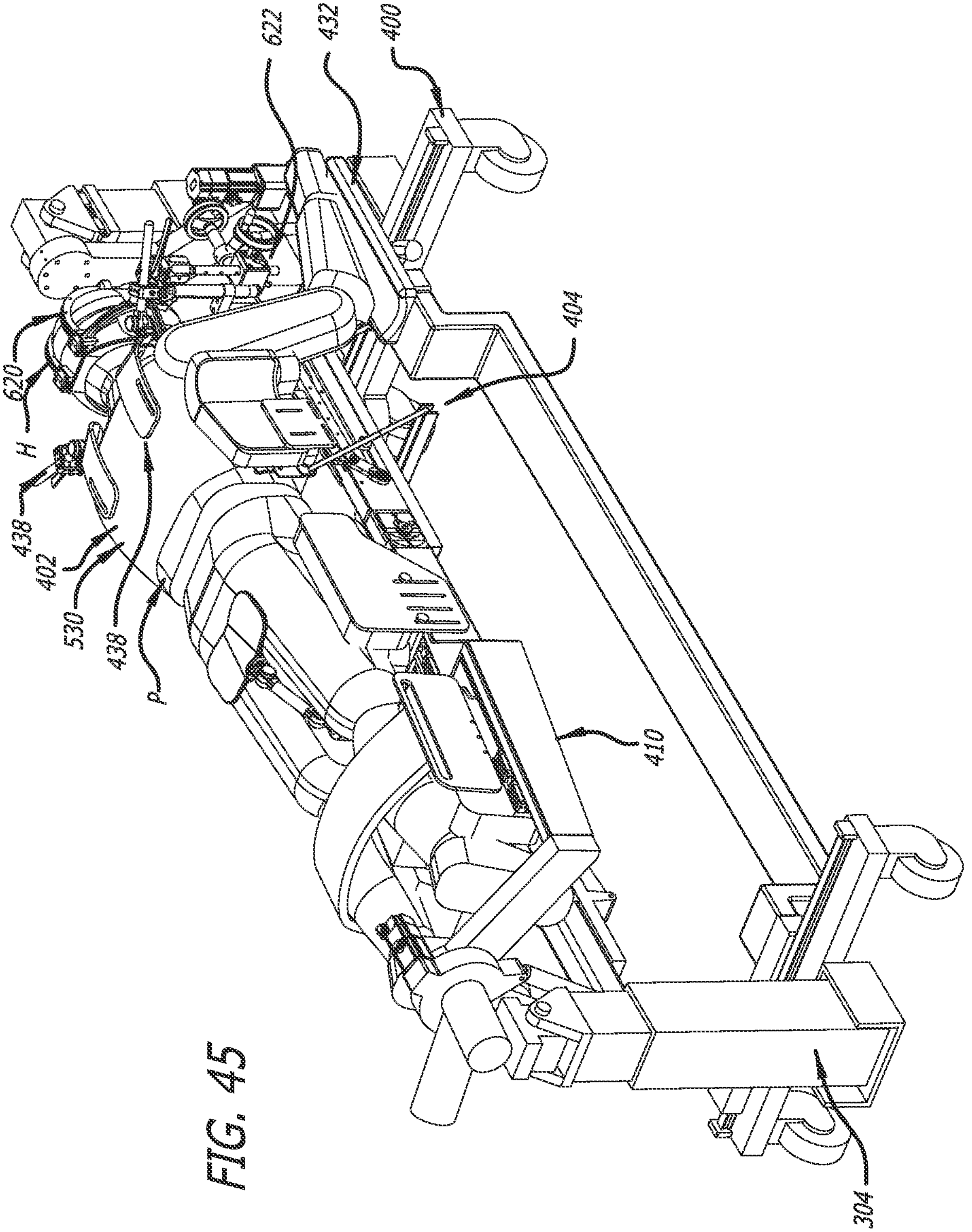
FIG. 45 is a top and an opposite end perspective view that illustrates the surgical frame of FIG. 32 with the patient supported therein in the prone position.

As the patient P is lifted toward the main beam 410, the lengths of the first strap 490, the second strap 492, the third strap 494, and the fourth strap 496 can be adjusted to properly position and orient the patient P with respect to the various support components attached to the main be 410 to facilitate contact therewith. Furthermore, as the patient is lifted toward the main beam 410, portions of the head support H can be positioned with respect to one another (FIGS. 36-38 brought into proximity with one another). Thereafter, as depicted in FIGS. 39 and 40, the patient P can be brought into proper contact with the chest support 430, the upper leg support 434, and the lower leg support 436, and the portions of the head support H can be engaged to one another.

Soft straps (not shown) that are separate from or incorporated into the surgical frame 400 can be used to facilitate attachment of the patient P to the various support components of the surgical frame 400. To illustrate, the soft straps can be used in securing attachment of the torso of the patient P to the chest support 430, the upper legs of the patient P to the upper leg support 434, and the lower legs of the patient P to the lower leg support 436. Furthermore, with the patient P in contact with at least the chest support 430, the arms of the patient P can be attached to the arm supports 432 using the soft straps to secure attachment of the patient's arms relative to the chest support 430, and the should hold-downs 438 can be attached relative to chest support 430 to secure attachment of the patient's shoulders relative to the chest support 430. Furthermore, although these portions are shown FIGS. 39 and 40 as being engaged after the patient P is lifted into contact with the various support components, the portions of the head support H can be engaged to one another to secure attachment of the patient's head relative to the chest support 430 before or after use of the lift 404 and the vest/harness 402 to lift the patient P from the table/gurney.

With the patient P otherwise secured relative to the main beam 410, the vest portion 530 and the harness portion 532 can be removed from the patient P, the first strap 490, the second strap 492, the third strap 494, and the fourth strap 496 can be retracted, and the main beam 410 can be raised/lowered, pivoted/tilted, and/or rotated (FIGS. 41-45) to facilitate positioning and repositioning of the patient P for surgery. For example, the patient P can be rotated by the main beam 410 from the supine position (FIG. 39) to the prone position (FIGS. 43-45) to facilitate access to the patient's torso for surgery. Furthermore, the position of the patient's head can be adjusted using the head support H, the position of the patient's torso can be adjusted using the chest support 430, the position of the patient's arms can be adjusted using the arm supports 432, the position of the patient's legs can be adjusted using the upper leg support 434 and the lower leg support 436.

After surgery, the process for transferring the patient P can be reversed to facilitate transfer of the patient P from the surgical frame 400 to the table/gurney T. To illustrate, the patient P can be rotated by the main beam 410 into the supine position, and the main beam 410 can be raised/lowered and/or pivoted/tilted to facilitate positioning and repositioning of the patient P for transfer to the table/gurney T. Thereafter, the patient P can be lowered to the table/gurney T using the lift 404 and the vest/harness 402.

However, before rotation into the supine position, the patient P can be rotated into the prone position to facilitate placement of the vest portion 530 and the harness portion 532. The vest portion 530 can be positioned on the patient P so that a posterior portion of the patient's torso is contacted to the first side 535A of the body portion 534, and the pairs of the straps 548 adjacent the first lateral side 540 and the second lateral side 542 can be wrapped around the shoulder and the underarm of the patient P and tightened together to secure the body portion 534 to an upper portion of the patient's torso.

The harness portion 532 then can be attached to the vest portion 530 using the first carabiner 570, the second carabiner 572, the third carabiner 574, and the fourth carabiner 580, the fifth carabiner 582, and the sixth carabiner 584. The first carabiner 570 is used to attach the first aperture 560 of the first plate portion 552 to at least one of the rings 550, the second carabiner 572 is used to attach the second aperture 562 of the first plate portion 552 to at least one of the rings 550, and the third carabiner 574 is used to attach the third aperture 564 of the first plate portion 552 to at least one of the rings 550. Furthermore, the fourth carabiner 580 is used to attach the first aperture 560 of the second plate portion 554 to at least one of the rings 550, the fifth carabiner 582 is used to attach the second aperture 562 of the second plate portion 554 to at least one of the rings 550, and the sixth carabiner 584 is used to attach the third aperture 564 of the second plate portion 554 to at least one of the rings 550.

Prior to or after attachment of the harness portion 532 to the vest portion 530, the ends 520, 522, 524, and 526 of the first strap 490, the second strap 492, the third strap 494, and the fourth strap 496, respectively, can be attached to the harness portion 532. With the ends 520, 522, 524, and 526 positioned adjacent the harness portion 532, the first hook 600, the second hook 602, the third hook 604, and the fourth hook 606 can be used in attaching the first strap 490 and the third strap 494 to the first plate portion 552, and the second strap 492 and the fourth strap 496 to the second plate portion 554. After such attachment, the first winch 500, the second winch 502, the third winch 504, and the fourth winch 506 can be actuated to decrease (or retract) the lengths of the first strap 490, the second strap 492, the third strap 494, and the fourth strap 496, respectively, to pull the vest portion 530 and the patient P toward the main beam 410. Thereafter, the patient can be rotated into the prone position by the main beam 410.

With the patient P rotated into the supine position by the main beam, the patient P can be transferred from the surgical frame 400 to the table/gurney T. To illustrate, portions of the head support H can be detached from one another, and the soft straps can be detached from the various support components (such as the chest support 430, arm supports 432, the upper leg support 434, the lower leg support 436), and the shoulder hold-downs 438 can be detached. Thereafter, the first winch 500, the second winch 502, the third winch 504, and the fourth winch 506 can be actuated to increase (or extend) the lengths of the first strap 490, the second strap 492, the third strap 494, and the fourth strap 496, respectively, to lower the patient P to the table/gurney T positioned in the patient receiving area A. After the patient P has been lowered to the table/gurney T, the harness portion 532 can be detached from the first strap 490, the second strap 492, the third strap 494, and the fourth strap 496 and/or the vest portion 530 can be detached from the harness portion 532. The patient P can then be moved on table/gurney from the patient receiving area A.

As depicted in FIGS. 34-40 and 43-45, the head support H includes a helmet portion 620 and a frame portion 622. The helmet portion 620 can be received on the head of the patient P to enclose and protect portions thereof. Furthermore, the frame portion 622 can be used to interconnect with the helmet portion 620 with the chest support 430 to support the helmet portion 620 relative thereto. As discussed below, the helmet portion 620 is moveable between an opened position and a closed position, and the frame portion 622 includes various posts that are adjustable with respect to one another and to the chest support 430 to facilitate engagement with the helmet portion 620.

Figure 46A:
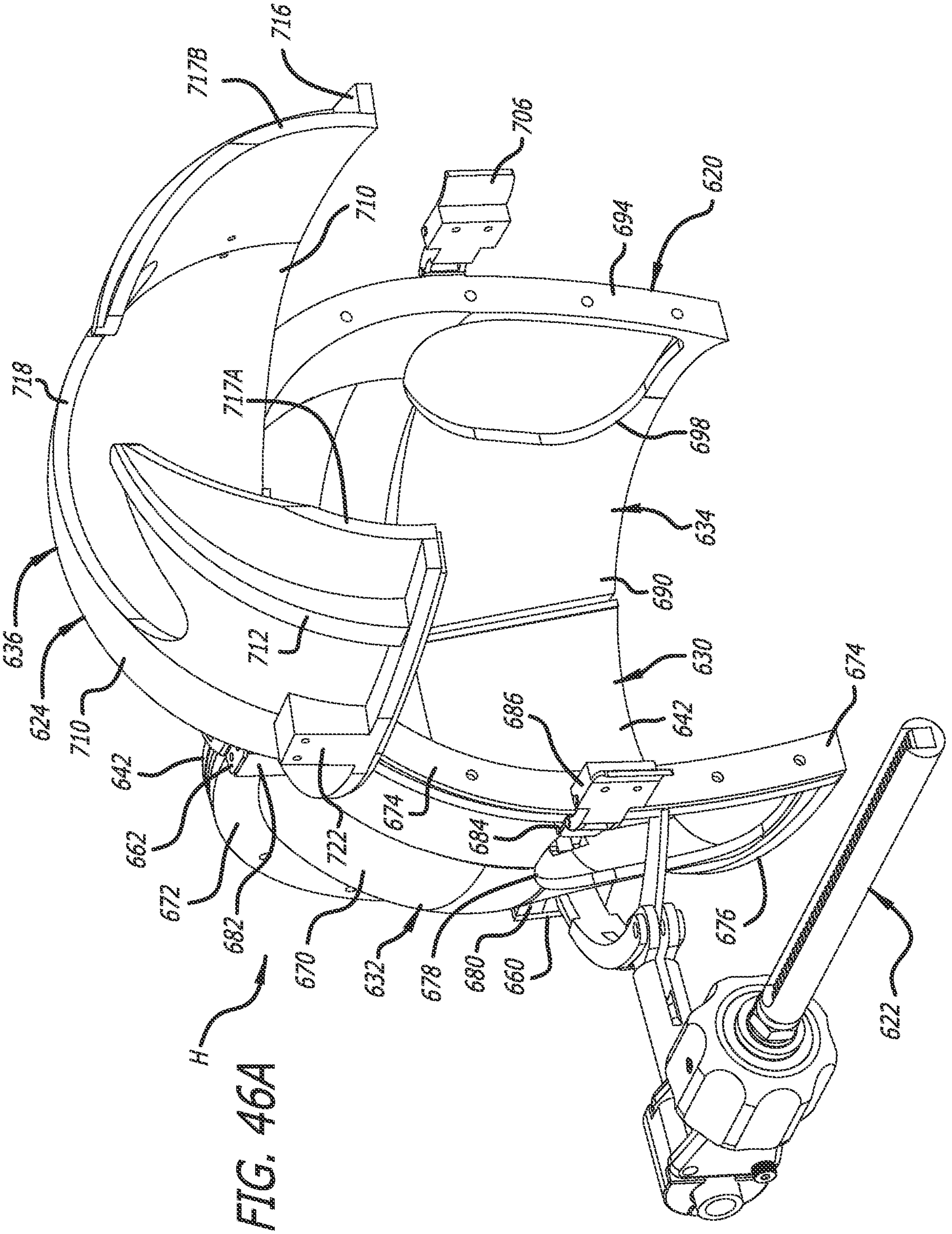
FIG. 46A is an enlarged front and side perspective view that illustrates a helmet portion and portions of a frame portion of the head support of FIG. 34 with portions of the helmet portion in an open position.
Figure 47:
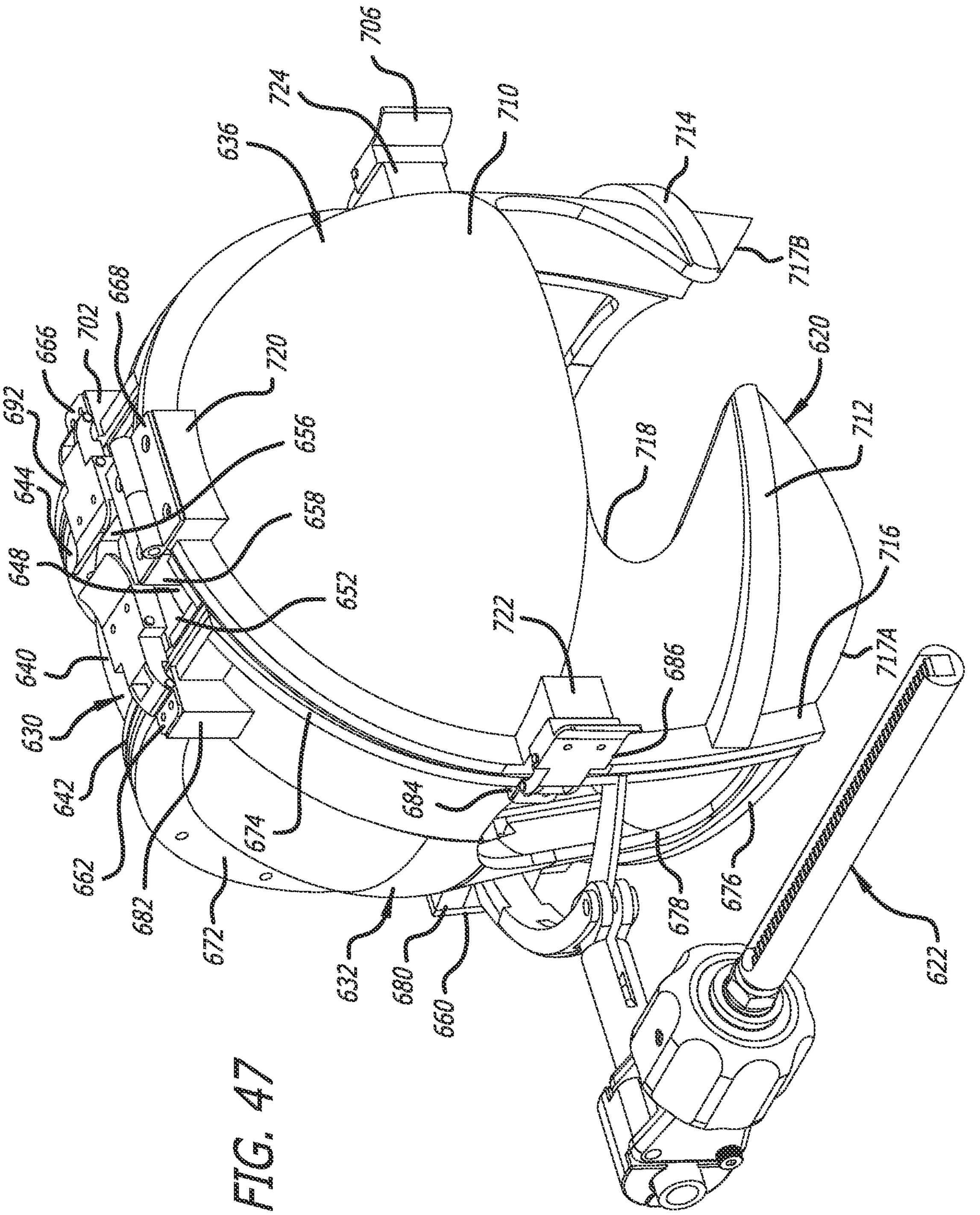
FIG. 47 is an enlarged front and side perspective view similar to FIG. 46 that illustrates the helmet portion and the portions of the frame portion of the head support of FIG. 34 with the helmet portion in a closed position.
Figure 48:
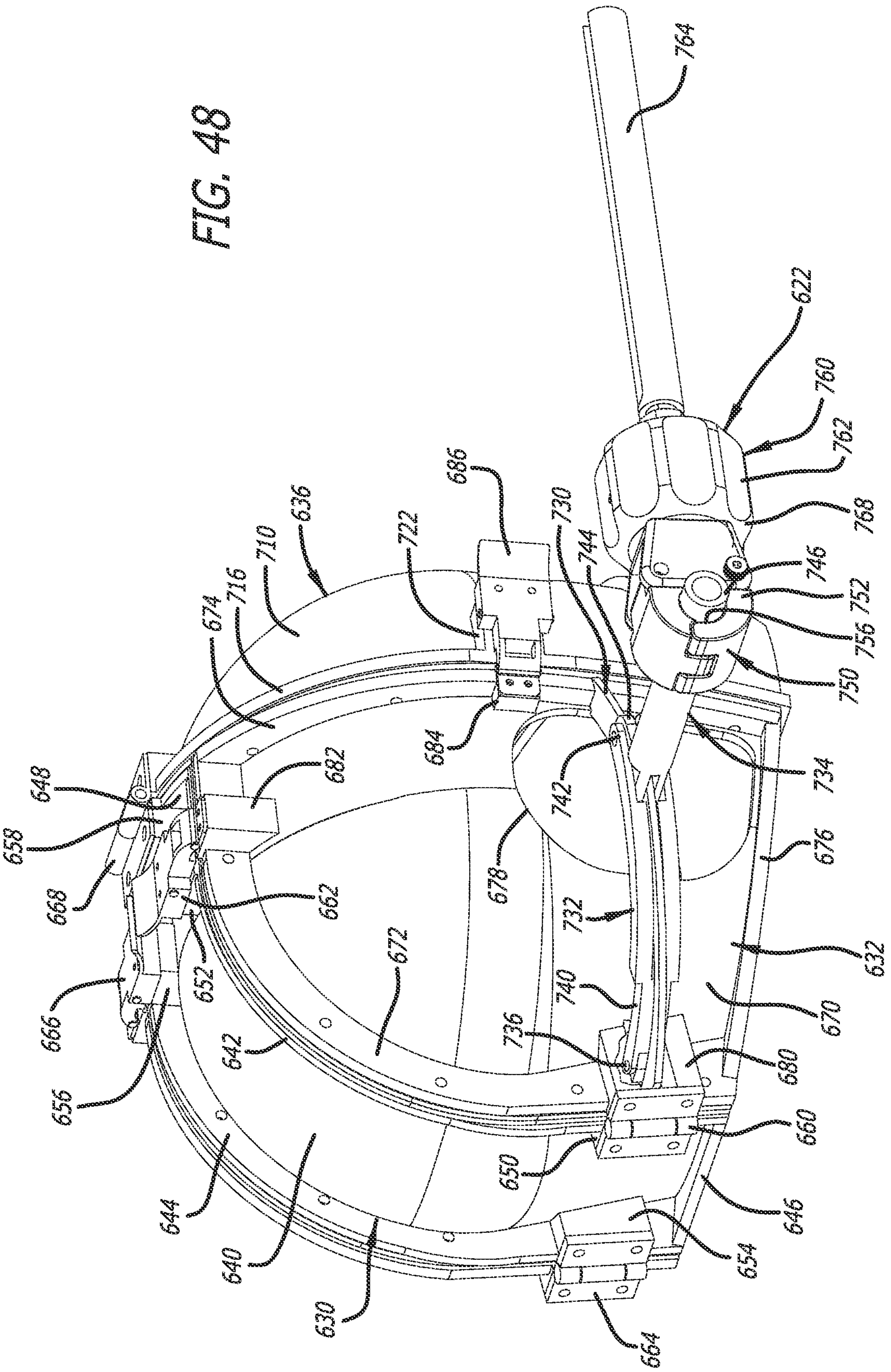
FIG. 48 is an enlarged rear and side, partial fragmentary, perspective view that illustrates the helmet portion in the closed position.
Figure 49:
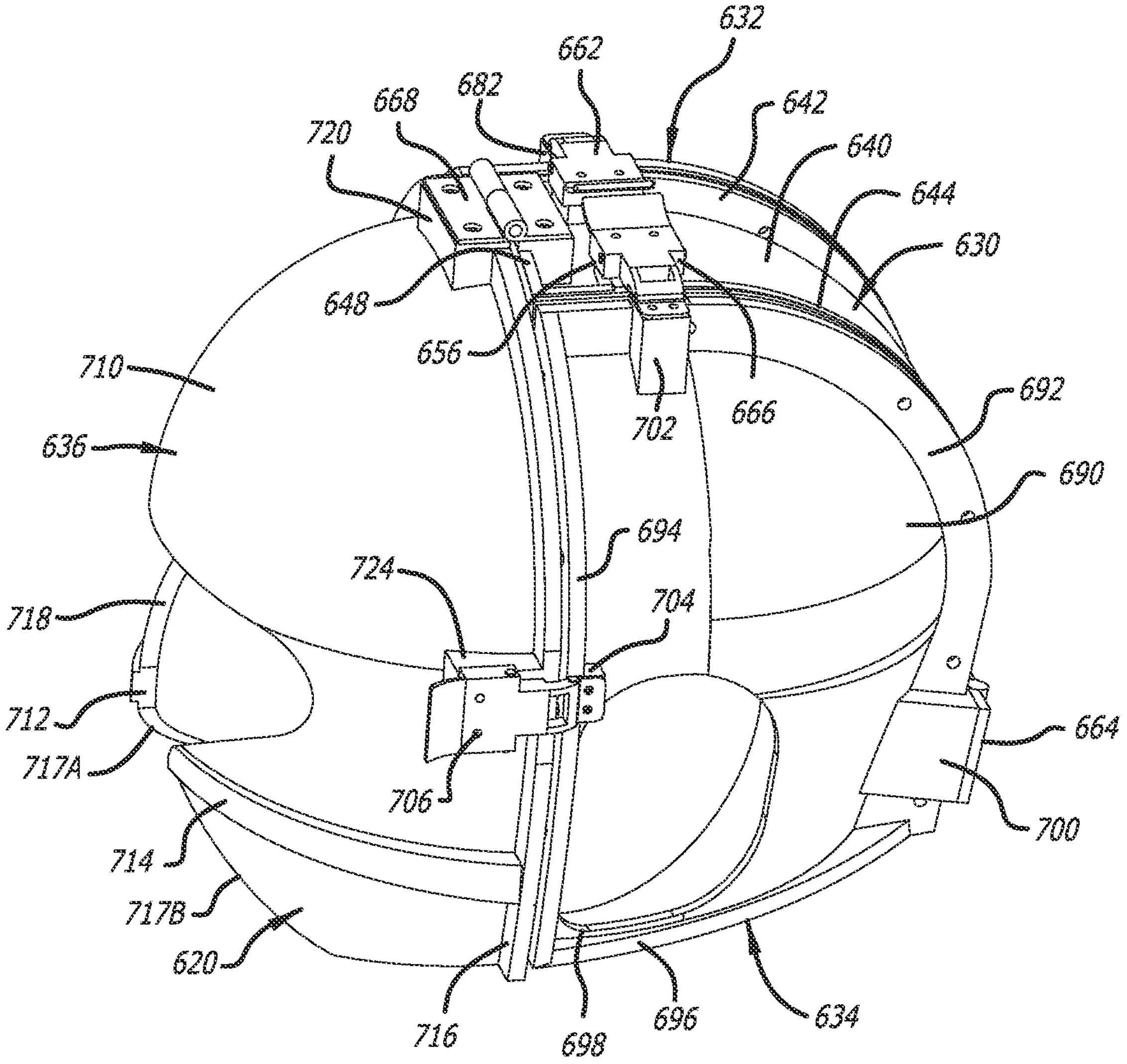
FIG. 49 is an enlarged side perspective view that illustrates the helmet portion in the closed position.

The helmet portion 620, as depicted in FIGS. 46A, 47, and 48, includes a posterior portion 630, a first lateral portion 632, a second lateral portion 634, and an anterior portion 636 that can ultimately be assembled around the head of the patient P. The posterior portion 630 is ultimately positioned adjacent the posterior portion of the patient's head, the first lateral portion 632 is ultimately positioned adjacent the right side of the patient's head, the second lateral portion 634 is ultimately positioned adjacent the left side of the patient's head, and the anterior portion 636 is ultimately positioned adjacent the patient's face. Furthermore, to facilitate attachment and removal of the helmet portion 620 from the patient's head, the posterior portion 630 can be pivotally or hingedly interconnected with the first lateral portion 632, the second lateral portion 634, and the anterior portion 636; the first lateral portion 632 and the second lateral portion 634 each can be pivotally or hingedly interconnected to the posterior portion 630; and the anterior portion 636 can be pivotally or hingedly interconnected with the posterior portion 630.

The posterior portion 630, as depicted in FIGS. 47 and 48, includes a body portion 640, a first lateral rim 642, a second lateral rim 644, a first lower rim 646 (not shown), and a second upper rim 648. The first lateral rim 642, the second lateral rim 644, the first lower rim 646, and the second upper rim 648 are positioned around the perimeter of the body portion 640, where each of the first lower rim 646 and the second upper rim 648 extend between the first lateral rim 642 and the second lateral rim 644. The body portion 640 includes a concave inner surface (not shown) for complementing the patient's head, and the first lateral rim 642, the second lateral rim 644, the first lower rim 646, and the second upper rim 648 serve in reinforcing the body portion 640.

To facilitate interconnection with the first lateral portion 632, the posterior portion 630 can include a first flange portion 650 along the first lateral rim 642 adjacent the first lower rim 646 and a second flange portion 652 along the first lateral rim 642 adjacent the second upper rim 648; the posterior portion 630 can include a third flange portion 654 along the second lateral rim 644 adjacent the first lower rim 646 and a fourth flange portion 656 along the second lateral rim 644 adjacent the second upper rim 648; and the posterior portion 630 can include a fifth flange portion 658 adjacent the second upper rim 648. To facilitate an interconnection between the posterior portion 630 and the first lateral portion 632, a first hinge 660 can be attached to the first flange portion 650, and a first latch 662 can be engaged to the second flange portion 652; to facilitate an interconnection between the posterior portion 630 and the second lateral portion 634, a second hinge 664 can be attached to the third flange portion 654, and a second latch 666 can be engaged to the fourth flange portion 656; and to facilitate a pivotal or hinged interconnection between the posterior portion 630 and the anterior portion 636, a third hinge 668 can be attached to the fifth flange portion 658.

The first lateral portion 632, as depicted in FIGS. 46A and 47, includes a body portion 670, a first mating rim 672, a second mating rim 674, and a third rim 676. The body portion 670 includes an aperture 678 for providing access to the right ear of the patient P and includes a concave inner surface (not shown) for complementing the patient's head, and the first mating rim 672, the second mating rim 674, and the third rim 676 reinforce the body portion 670. When the helmet portion 620 is assembled around the patient's head and the first lateral portion 632 is fully engaged to the posterior portion 630, the first mating rim 672 of the first lateral portion 632 interfaces with the first rim 642 of the posterior portion 630, the second mating rim 674 of the first lateral portion 632 interfaces with a corresponding rim formed on the anterior portion 636, and the third rim 676 is positioned adjacent the neck of the patient P. To facilitate an interconnection of the first lateral portion 632 with the posterior portion 630, the first lateral portion 632 includes a first flange portion 680 along the first mating rim 672 adjacent the third rim 676 for attaching the first hinge 660 thereto, and includes a second flange portion 682 along the first mating rim 672 adjacent the second mating rim 674 for attaching the first latch 662 thereto. Furthermore, to facilitate an interconnection of the first lateral portion 632 with the anterior portion 636, the first lateral portion 632 includes a third flange portion 684 along the second mating rim 674 for attaching a third latch 686 for engagement to the anterior portion 636.

The second lateral portion 634, as depicted in FIGS. 46A and 48, includes a body portion 690, a first mating rim 692, a second mating rim 694, and a third rim 696. The body portion 690 includes an aperture 698 for providing access to the left ear of the patient P and includes a concave inner surface (not shown) for complementing the patient's head, and the first mating rim 692, the second mating rim 694, and the third rim 696 reinforce the body portion 690. When the helmet portion 620 is assembled around the patient's head and the second lateral portion 634 is fully engaged to the posterior portion 630, the first mating rim 692 of the second lateral portion 634 interfaces with the second rim 644 of the posterior portion 630, the second mating rim 694 of the second lateral portion 634 interfaces with a corresponding rim formed on the anterior portion 636, and the third rim 696 is positioned adjacent the neck of the patient P. To facilitate an interconnection of the second lateral portion 634 with the posterior portion 630, the second lateral portion 634 includes a first flange 700 along the first mating rim 692 adjacent the third rim 696 for attaching the second hinge 664 thereto, and includes a second flange 702 along the first mating rim 692 adjacent the second mating rim 694 for attaching the second latch 666 thereto. Furthermore, to facilitate an interconnection of the second lateral portion 634 with the anterior portion 636, the second lateral portion 634 includes a third flange 704 along the second mating rim 694 for attaching a fourth latch 706 for engagement to the anterior portion 636.

The anterior portion 636, as depicted in FIGS. 46A, 47, and 48, includes a body portion 710, reinforcement ribs 712 and 714, a mating rim 716, a first edge portion 717A, a second edge portion 717B, and a central opening 718. The body portion 710 includes an interior surface (not shown) for complementing the patient's head, the mating rim 716 reinforces the body portion 710 and extends around a portion of the perimeter of the body portion 710, the reinforcement ribs 712 and 714 are positioned on opposite sides of the central opening 718 to further reinforce the body portion 710, the first edge 717A extends from the mating rim 716 to the central opening 718, the second edge 717B extends from the mating rim 716 to the central opening 718, and the central opening 718, when the helmet portion 620 is assembled onto the patient's head, provides at least access to the nasal and oral passages of the patient P. Furthermore, when the helmet portion 620 is assembled onto the patient's head, the mating rim 716 interfaces with the second upper rim 648 of the posterior portion 630, the second mating rim 674 of the first lateral portion 632, and the second mating rim 694 of the second lateral portion 634. To facilitate a pivotal or hinged interconnection of the anterior portion 636 with the posterior portion 630, the anterior portion 636 includes a first flange portion 720 along the mating rim 716 for permanently attaching the third hinge 668 thereto; to facilitate an interconnection of the anterior portion 636 with the first lateral portion 632, the anterior portion 636 includes a second flange portion 722 for attaching the third latch 686 thereto; and to facilitate an interconnection of the anterior portion 636 with the second lateral portion 634, the anterior portion 636 includes a third flange portion 724 for attaching the fourth latch 706 thereto.

The first hinge 660 provides for a pivotal or hinged interconnection between the posterior portion 630 and the first lateral portion 632, the second hinge 664 provides for a pivotal or hinged interconnection between the posterior portion 630 and the second lateral portion 634, and the third hinge 668 provides for a pivotal or hinged interconnection between the posterior portion 630 and the anterior portion 636. Thus, the helmet portion 620 can be moved into the opened position by pivoting the first lateral portion 632, the second lateral 634, and the anterior portion 636 away from the posterior portion 630. As depicted in FIGS. FIG. 46A, the helmet portion 620 is partially opened with the anterior portion 636 pivoted away from the posterior portion 630. With the helmet portion 620 in the opened position, the patient's head can be received between the posterior portion 630, the first lateral portion 632, the second lateral portion 634, and the anterior portion 636. The helmet portion 620 can then be moved into the closed position (FIGS. 47 and 48) by pivoting the first lateral portion 632, the second lateral portion 634, and the anterior portion 636 toward the posterior portion 630. When the helmet portion 632 is in the closed position, the first lateral rim 642 (of the posterior portion 630) abuts the first mating rim 672 (of the first lateral portion 632), the second lateral rim 644 (of the posterior portion 630) abuts the first mating rim 692 (of the second lateral portion 634), and the second upper rim 648 (of the posterior portion 630), the second mating rim 674 (of the first lateral portion 632), and the second mating rim 694 (of the second lateral portion 634) abuts the mating rim 716 (of the anterior portion 636).

Thereafter, the helmet portion 620 can be maintained in the closed position by engaging the first latch 662, the second latch 666, the third latch 686, and the fourth latch 706 to the second flange portion 652 (of the posterior portion 630), the fourth flange portion 656 (of the posterior portion 630), the second flange portion 722 (of the anterior portion 636), and the third flange portion 724 (of the anterior portion 636), respectively. The interior surfaces of the posterior portion 630, the first lateral portion 632, the second lateral portion 634, and the anterior portion 636 can include padding (not shown) for contacting the patient's head. Furthermore, the first latch 662, the second latch 666, the third latch 686, and the fourth latch 706 can include magnetic portions for facilitating engagement with the respective flange portions. Alternatively, the first latch 662, the second latch 666, the third latch 686, and the fourth latch 706 can include mechanical latch portions (not shown) provided to engage complimentary mechanical latch portions (not shown) provided on the respective flange portions. The locations of the permanent attachment positions and the magnetic portions, as well as the mechanical latch portions if mechanical interconnections are used, can be reversed for the first latch 662, the second latch 666, the third latch 686, and the fourth latch 706.

Figure 46B:
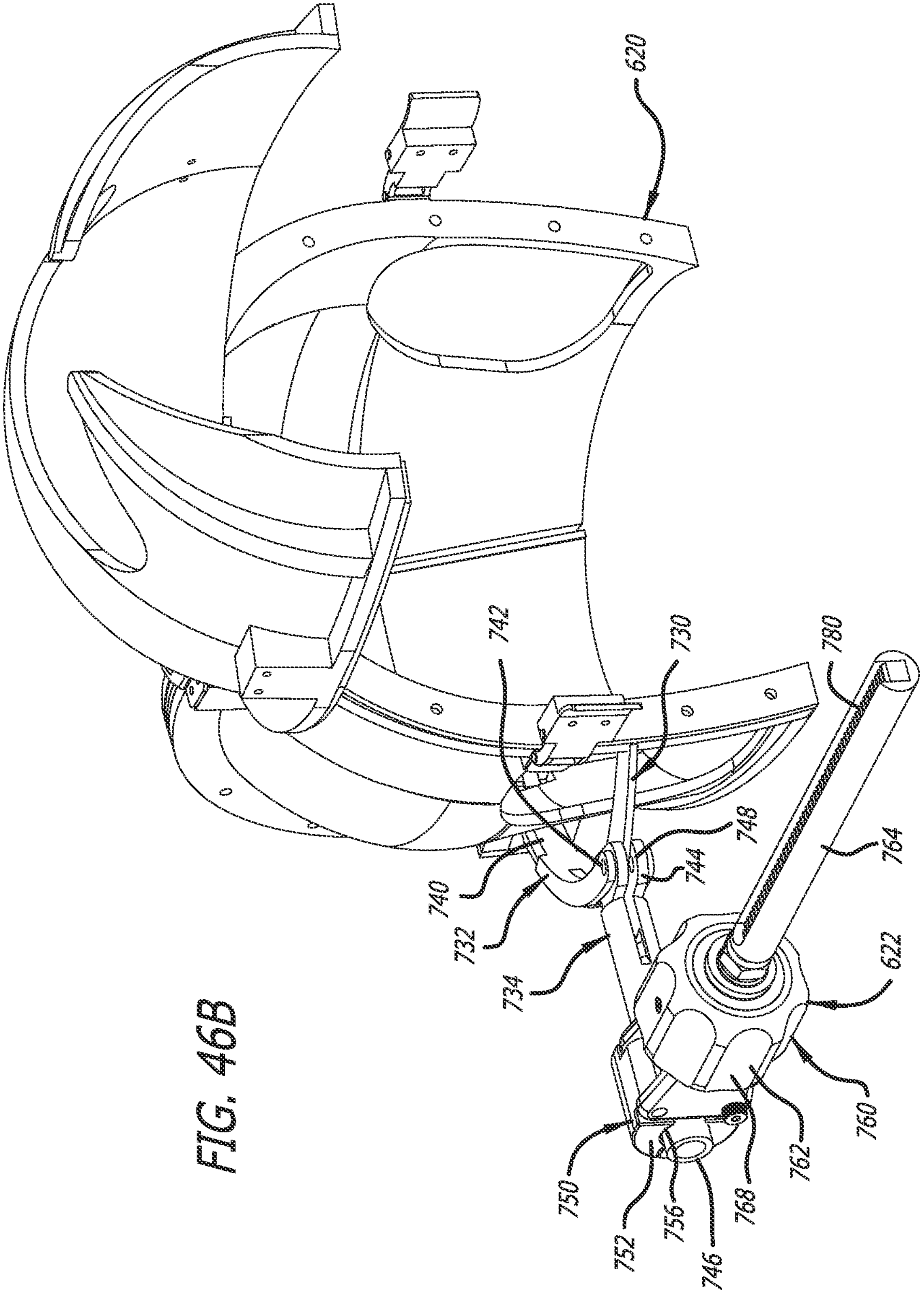
FIG. 46B is an enlarged front and side perspective view identical to FIG. 46A that illustrates a helmet portion and portions of a frame portion of the head support of FIG. 34 with portions of the helmet portion in an open position.

To facilitate attachment of the helmet portion 620 with the frame portion 622, the helmet portion 620 includes a first armature portion 730, a second armature portion 732, and a post portion 734. As depicted in FIG. 46B, the first armature portion 730 extends from the first flange 680 to the second mating rim 674, and the second armature portion 732 is hingedly connected to the first flange 680 at a hinged connection 736. The second armature portion 732 includes a first end portion 740 and a second end portion 742. The first end portion 740 of the second armature portion 732 is pivotally attached to the first flange 680 at the hinged connection 736, and the second end portion 742 is formed as clevis. Furthermore, the post portion 734 includes a first end portion 744 and a second end portion 746. The first end portion 744 of the post portion 734 is formed as a tang that engages the clevis formed by the second end portion 742 of the second armature portion 732, and the second end portion 746 is formed as a post.

The second armature portion 732 can pivotally move with respect to the first flange 680, and the post portion 734 can pivotally move with respect to the second armature portion 732. A portion of the first armature portion 730 can be received within the clevis formed by the second end portion 746 of the second armature portion 732 to limit interference of the first armature portion 730 with the pivotal movement of the first armature portion 730 relative to the first flange 680. Furthermore, the post portion 734 includes a recess 748 that is sized to receive a portion of the first armature portion 730 to limit interference by the first armature portion 730 with the pivotal movement of the post portion 734 relative the second armature portion 732. Such pivotal movement allows the post of the second end portion 746 of the post portion 734 to move outwardly from the second lateral portion 634.

Figure 37:
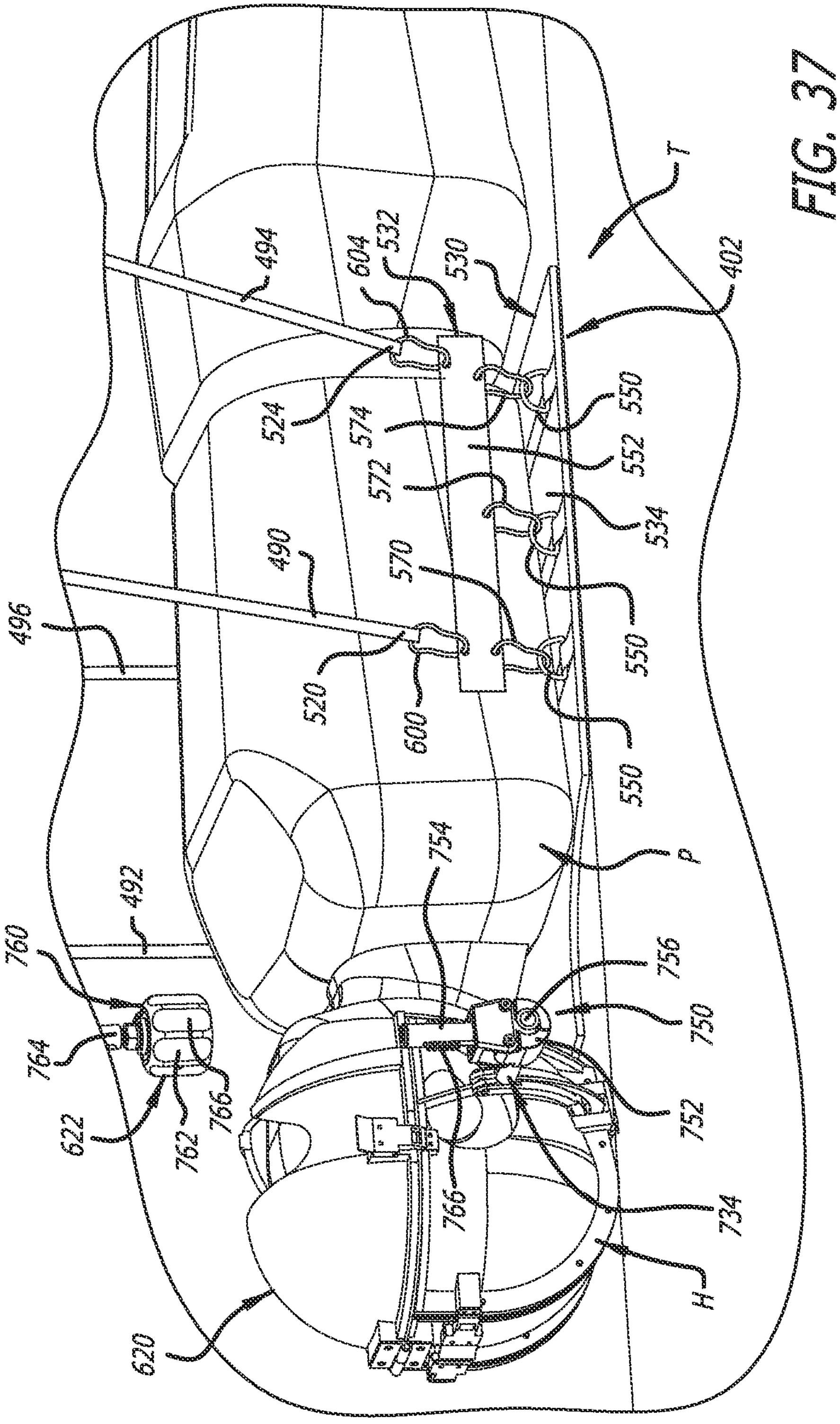
FIG. 37 is an enlarged side perspective view of FIG. 36 that illustrates the portions of the head support of FIG. 34 positioned relative to one another as the patient is being lifted from the table.

The frame portion 622, as depicted in FIGS. 37 and 46B, includes a first portion 750 that includes a collar portion 752 and a post portion 754. The collar portion 752 includes an aperture 756 for receiving the post of the second end portion 746 of the post portion 734 therein, and the post portion 754 extends outwardly from the collar portion 752. The collar portion 752 is moveable along and rotatable relative to the post portion 734 via receipt the post of the second end portion 746 of the post portion 734 in the aperture 756. Furthermore, the post portion 754 is configured to engage another portion of the frame portion 622.

Figure 38:
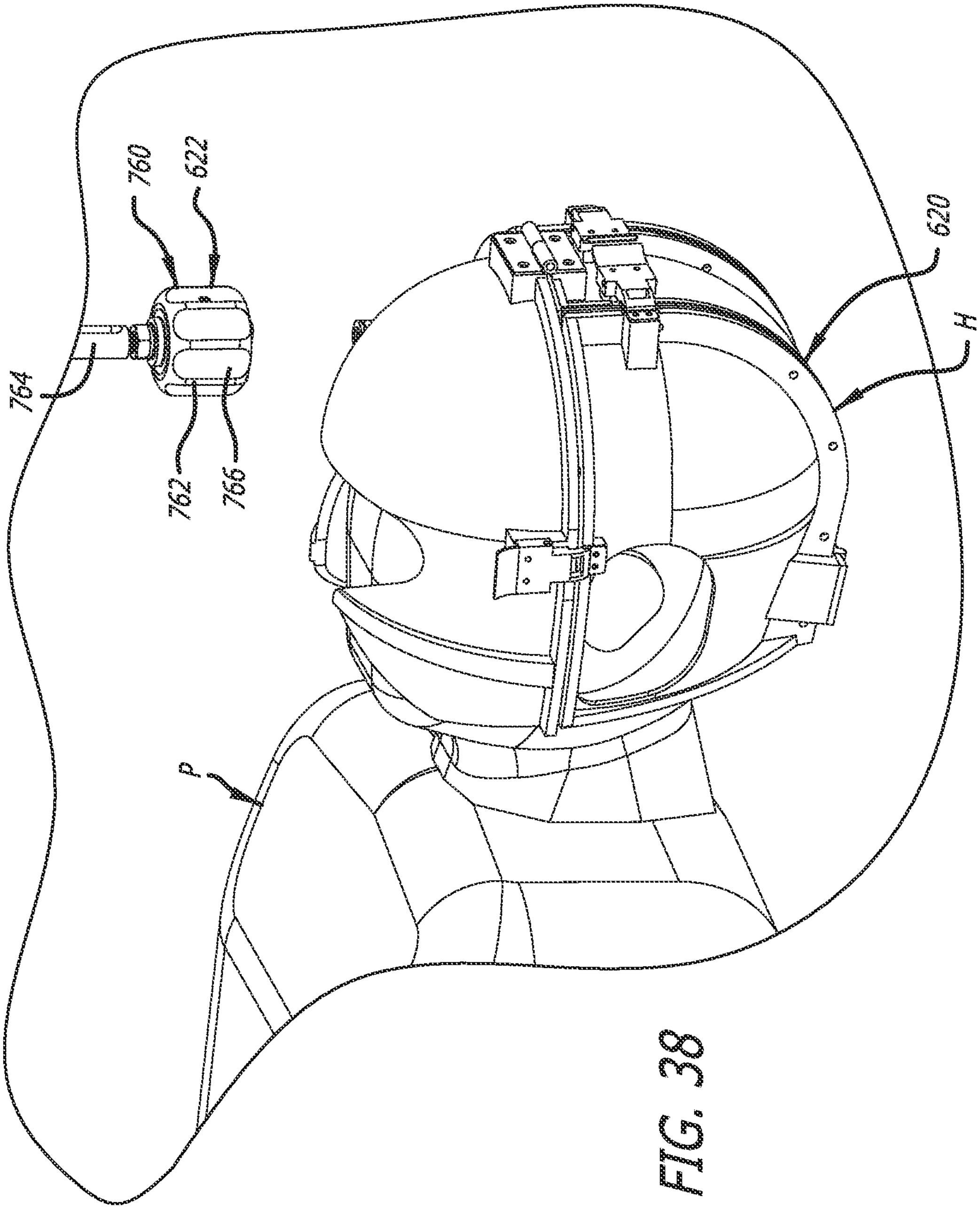
FIG. 38 is an enlarged side perspective view that illustrates the portions of the head support of FIG. 34 positioned relative to one another as the patient is being lifted from the table.

The frame portion 622, as depicted in FIGS. 37, 38, and 46B, includes a second portion 760 that includes a collar portion 762 and a post portion 764. The collar portion 762 includes an aperture (not shown) for receiving a portion of the post portion 754 (of the first portion 750), and the post portion 764 extends outwardly from the collar portion 762. The post portion 754 of the first portion 750 can include surface configurations 766 in the form of threads, partial threads, or ratchets, and the aperture formed in the collar portion 762 can include surface protrusions (not shown) complimentary to the surface protrusions 766. A rotatable portion 768 of the collar 762 can be rotatable relative to the post portion 764, and such rotation can cause interaction between the surface configurations 766 formed on the post portion 754 and the complimentary surface configurations formed in the aperture in the collar portion 762 that causes movement of the collar portion 762 along the post portion 754.

Furthermore, the post portion 764 is configured to engage another portion of the frame portion 622, and such engagement is facilitated by movement of the collar portion 762 along the post portion 754.

The frame portion 622, as depicted in FIG. 40, includes a third portion 770 that includes a collar portion 772 and a post portion 774. The collar portion 772 includes a first aperture 776 for receiving the post portion 764 (of the second portion 760), and a second aperture 778 for receiving the post portion 774. Furthermore, the post portion 774 can be fixedly attached to the chest support 430. The post portion 764 and the post portion 774 can include surface configurations 780 and 782, respectively, for engaging complimentary surface configurations (not shown) formed in the first aperture 776 and the second aperture 778, respectively. Furthermore, the collar portion 772 includes a first wheel 784 incorporated therein that via a transmission (not shown) located in the collar portion) causes interactions between the surface configurations 780 and the complimentary surface configurations in the first aperture 776 to move the post portion 764 relative to the collar portion 772, and the post portion 774 includes a second wheel 786 incorporated therein that via a transmission (not shown) located in the post portion 774 causes interactions between the surface configurations 782 and the complimentary surface configurations in the second aperture 778 to move the collar portion 772 relative to the post portion 774.

As such, when assembled, the frame portion 622 can be adjusted to move the collar portion 752 via movement of the collar portion 772 relative to the post portion 774, movement of the post portion 764 relative to the collar portion 772, movement of the collar portion 762 (attached to the post portion 764) relative to the post portion 754, which is attached to the collar portion 752. Thus, the collar portion 752 can be positioned via such movement to engage the post of the second end portion 746 of the post portion 734 via receipt of the post in the aperture 756.

When the patient P is positioned on the table/gurney T, the helmet portion 620 can be assembled onto the patient's head as described above. Thereafter, the frame portion 622 can be attached to the helmet portion 620 via receipt of the post of the second end portion 746 of the post portion 734 in the aperture 756 of the collar portion 752. The componentry of the frame portion 622 can be adjusted as the patient P is being lifted using the vest/harness 402 via action the first winch 500, the second winch 502, the third winch 504, and the fourth winch 506. Such adjustment can serve in inhibiting undue stress to the patient's head and neck as the patient P is being lifted off the table/gurney T and toward the main beam 410 to contact with the chest support 430, the upper leg support 434, and the lower leg support 436. Furthermore, the head support H can include various pressure sensors (not shown) to facilitate quantification of the stress applied to the helmet portion 620 and the frame portion 622 so that such stresses can be ameliorated.

It should be understood that various aspects disclosed herein may be combined in different combinations than the combinations specifically presented in the description and the accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspect of this disclosure are described as being performed by a single module or unit for purposes of clarity, it should be understood that the techniques of this disclosure may be performed by a combination of units or modules associated with, for example, a medical device.

What is claimed is:

1. A helmet for protecting and supporting a head of a patient during surgery, the helmet comprising:

a posterior portion including a first body portion having a first side and a second side opposite from one another, and an upper side extending between the first side and the second side;

a first lateral portion including a second body portion having a third side and a fourth side, a first mating rim portion along the fourth side for positioning adjacent an anterior portion of the helmet, and the first lateral portion being moveably interconnected to the posterior portion along the first side and the third side, and being moveable between an open position and a closed position relative to the posterior portion;

a second lateral portion including a third body portion having a fifth side and a sixth side, and a second mating rim portion along the sixth side for positioning adjacent the anterior portion of the helmet, and the second lateral portion being moveably interconnected to the posterior portion along the second side and the fifth side, and being moveable between an open position and a closed position relative to the posterior portion; and the anterior portion including a fourth body portion, an opening formed in the fourth body portion, and a third mating rim portion for positioning adjacent the first mating rim portion of the first lateral portion and the second mating rim portion of the second lateral portion, and the anterior portion being moveably interconnected relative to the upper side of the posterior portion, and being moveable between an open position and a closed position relative to the posterior portion;

wherein the first mating rim portion extends extend outwardly from the second body portion, the second mating rim portion extends outwardly from the third body portion, and the third mating rim portion extends outwardly from the fourth body portion;

wherein, when the first lateral portion is in the closed position relative to the posterior portion, and the second lateral portion is in the closed position relative to the posterior portion, the anterior portion is moveable between open positions and closed positions relative to the first lateral portion and the second lateral portion, and, when the anterior portion is moved from the open positions to the closed positions relative to the first lateral portion and the second lateral portion, the third mating rim portion interfaces with the first mating rim portion of the first lateral portion, and with the second mating rim portion of the second lateral portion; and wherein the helmet can be assembled around the head of the patient by closing the first lateral portion, the second lateral portion, and the anterior portion.

2. The helmet of claim 1, wherein, when the helmet is assembled around the head of the patient, the posterior portion can be placed adjacent a posterior portion of the head of the patient, the first lateral portion can be moved from the open position to the closed position thereof to position the first lateral portion adjacent a first lateral side of the head of the patient, the second lateral portion can be moved from the open position to the closed position thereof to position the second lateral portion adjacent a second lateral side of the head of the patient, and the anterior portion can be moved from the open post positions to the closed positions thereof to position the anterior portion adjacent a face of the patient such that a nasal cavity and an oral cavity of the patient are accessible through the opening in the anterior portion.

3. The helmet of claim 1, wherein inner surfaces of the posterior portion, the first lateral portion, the second lateral portion, and the anterior portion are each covered with padding to cushion the head of the patient when the helmet is assembled therearound.

4. The helmet of claim 1, wherein a first hinge attached to the posterior portion and the first lateral portion form a first hinged connection, a second hinge attached to the posterior portion and the second lateral portion form a second hinged connection, and a third hinge attached to the posterior portion and the anterior portion form a third hinged connection.

5. The helmet of claim 4, wherein a first latch secured between the posterior portion and the first lateral portion serves to hold the first lateral portion in the closed position relative to the posterior portion, and a second latch secured between the posterior portion and the second lateral portion serves to hold the second lateral portion in the closed position relative to the posterior portion.

6. The helmet of claim 1, wherein the opening formed in the fourth body portion of the anterior portion is sized to provide access to eyes of the patient.

7. The helmet of claim 1, wherein a first aperture for providing access to a first ear of the patient is formed in the first lateral portion, and a second aperture for providing access to a second ear of the patient is formed in the second lateral portion.

8. A helmet for protecting and supporting a head of a patient during surgery, the helmet comprising:

- a posterior portion including a first body portion having a first side and a second side opposite from one another, and an upper side;
- a first lateral portion including a second body portion and a first mating rim portion extending outwardly from the first lateral portion, the first lateral portion being hingedly connected to the posterior portion, and being moveable between an open position and a closed position relative to the posterior portion;
- a second lateral portion including a third body portion and a second mating rim portion, and the second lateral portion being hingedly connected to the posterior portion, and being moveable between an open position and a closed position relative to the posterior portion; and
- an anterior portion including a fourth body portion, an opening formed in the fourth body portion, a third mating rim portion for positioning adjacent portions of the first lateral portion and the second lateral portion, and the anterior portion being hingedly connected to the posterior portion, and being moveable between open positions and closed positions relative to the posterior portion, the first lateral portion, and the second lateral portion;
- wherein the first mating rim portion extends outwardly from the second body portion, and the second mating rim portion extends outwardly from the third body portion;
- wherein, when the first lateral portion is in the closed position relative to the posterior portion, and the second lateral portion is in the closed position relative to the posterior portion, the anterior portion is moveable from the open positions to the closed positions relative to the first lateral portion and the second lateral portion to interface the third mating rim with the first mating rim of the first lateral portion, and with the second mating rim of the second lateral portion; and
- wherein the helmet can be assembled around the head of the patient by closing the first lateral portion, the second lateral portion, and the anterior portion.

9. The helmet of claim 8, wherein, when the helmet is assembled around the head of the patient, the posterior portion can be placed adjacent a posterior portion of the head of the patient, the first lateral portion can be moved from the open position to the closed position thereof to position the first lateral portion adjacent a first lateral side of the head of the patient, the second lateral portion can be moved from the open position to the closed position thereof to position the second lateral portion adjacent a second lateral side of the head of the patient, and the anterior portion can be moved from the open positions to the closed thereof to position the anterior portion adjacent a face of the patient such that a nasal cavity and an oral cavity of the patient are accessible through the opening in the anterior portion.

10. The helmet of claim 8, wherein inner surfaces of the posterior portion, the first lateral portion, the second lateral portion, and the anterior portion are each covered with padding to cushion the head of the patient when the helmet is assembled therearound.

11. The helmet of claim 8, wherein a first hinge attached to the posterior portion and the first lateral portion form a first hinged connection, a second hinge attached to the posterior portion and the second lateral portion form a second hinged connection, and a third hinge attached to the posterior portion and the anterior portion form a third hinged connection.

12. The helmet of claim 11, wherein a first latch secured between the posterior portion and the first lateral portion serves to hold the first lateral portion in the closed position relative to the posterior portion, and a second latch secured between the posterior portion and the second lateral portion serves to hold the second lateral portion in the closed position relative to the posterior portion.

13. The helmet of claim 8, wherein the opening formed in the fourth body portion of the anterior portion is sized to provide access to eyes of the patient.

14. The helmet of claim 8, wherein a first aperture for providing access to a first ear of the patient is formed in the first lateral portion, and a second aperture for providing access to a second ear of the patient is formed in the second lateral portion.

15. The helmet of claim 8, wherein the first lateral portion includes a fourth mating rim portion for positioning adjacent the a first side mating rim portion of the posterior portion, and the second lateral portion includes a fifth mating rim portion for positioning adjacent the a second side mating rim portion of the posterior portion.

16. The helmet of claim 15, wherein the posterior portion includes an upper rim portion, and, when the anterior portion is moved from the open positions to the closed positions relative to the posterior portion, the first lateral portion, and the second lateral portion, the third mating rim portion interfaces with the upper rim portion of the posterior portion, in addition to mating with the first mating rim portion of the first lateral portion, and with the second mating rim portion of the second lateral portion.

17. A helmet for protecting and supporting a head of a patient during surgery, the helmet comprising:

- a posterior portion including an upper rim portion;
- a first lateral portion including a first body portion and a first mating rim portion extending outwardly from the first lateral portion, the first lateral portion being hingedly connected to the posterior portion;
- a second lateral portion including a second body portion and a second mating rim portion, and the second lateral portion being hingedly connected to the posterior portion; and an anterior portion including a third body portion, an opening formed in the third body portion, a third mating rim portion for positioning adjacent portions of the first lateral portion and the second lateral portion, and the anterior portion being hingedly connected to the posterior portion, and being moveable between open positions and closed positions relative to the posterior portion, the first lateral portion, and the second lateral portion;

wherein, when the first lateral portion is moved from an open position to a closed position relative to the posterior portion, and the second lateral portion is moved from an open position to a closed position relative to the posterior portion, the anterior portion is moveable from the open positions to the closed positions relative to the posterior portion, the first lateral portion, and the second lateral portion to interface the third mating portion with the upper rim portion, the first mating rim, and the second mating rim.

18. The helmet of claim 17, wherein the helmet is assembled around the head of the patient, the posterior portion can be placed adjacent a posterior portion of the head of the patient, the first lateral portion can be moved from the open position to the closed position thereof to position the first lateral portion adjacent a first lateral side of the head of the patient, the second lateral portion can be moved from the open position to the closed position thereof to position the second lateral portion adjacent a second lateral side of the head of the patient, and the anterior portion can be moved from the open positions to the closed positions thereof to position the anterior portion adjacent a face of the patient such that a nasal cavity and an oral cavity of the patient are accessible through the opening in the anterior portion.

19. The helmet of claim 18, wherein inner surfaces of the posterior portion, the first lateral portion, the second lateral portion, and the anterior portion are each covered with padding to cushion the head of the patient when the helmet is assembled therearound.

20. The helmet of claim 18, wherein a first hinge attached to the posterior portion and the first lateral portion form a first hinged connection, a second hinge attached to the posterior portion and the second lateral portion form a second hinged connection, and a third hinge attached to the posterior portion and the anterior portion form a third hinged connection.

* * * * *